United States Patent [19]

Ishibashi et al.

[11] Patent Number: 4,969,006
[45] Date of Patent: Nov. 6, 1990

[54] AUTOMATIC FOCUS CONTROL DEVICE FOR USE IN A CAMERA SYSTEM

[75] Inventors: Kenji Ishibashi, Sakai; Masataka Hamada, Osaka; Tokuji Ishida, Daito; Nobuyuki Taniguchi, Nishinomiya; Hiroshi Ootsuka, Sakai, all of Japan

[73] Assignee: Minolta Camera Kabushiki Kaisha, Osaka, Japan

[21] Appl. No.: 386,029

[22] Filed: Jul. 25, 1989

Related U.S. Application Data

[63] Continuation of Ser. No. 243,195, Aug. 18, 1988, which is a continuation of Ser. No. 121,140, Nov. 16, 1987, abandoned, which is a continuation of Ser. No. 25,813, Mar. 13, 1987, abandoned.

[30] Foreign Application Priority Data

| Mar. 15, 1986 | [JP] | Japan | 61-57397 |
| Apr. 4, 1986 | [JP] | Japan | 61-77108 |
| May 20, 1986 | [JP] | Japan | 61-117011 |
| May 20, 1986 | [JP] | Japan | 61-117012 |
| Jun. 9, 1986 | [JP] | Japan | 61-134176 |
| Oct. 16, 1986 | [JP] | Japan | 61-246805 |
| Oct. 20, 1986 | [JP] | Japan | 61-249831 |
| Oct. 20, 1986 | [JP] | Japan | 61-249832 |

[51] Int. Cl.$^5$ ............................................. G03B 13/36
[52] U.S. Cl. .................................... 354/402; 354/406; 354/195.1
[58] Field of Search ............... 354/400, 402, 406, 407, 354/195.1

[56] References Cited

U.S. PATENT DOCUMENTS

| 4,319,238 | 3/1982 | Ogasawara et al. | 354/409 |
| 4,333,007 | 6/1982 | Langlais et al. | 354/402 |
| 4,423,935 | 1/1984 | Eguchi et al. | 354/402 |
| 4,469,417 | 9/1984 | Masunaga et al. | |
| 4,500,188 | 2/1985 | Kitagishi et al. | 354/406 |
| 4,508,842 | 4/1985 | Taniguchi et al. | |
| 4,536,072 | 8/1985 | Taniguchi et al. | |
| 4,550,993 | 11/1985 | Taniguchi et al. | 354/402 |
| 4,573,735 | 3/1986 | Arakawa | 354/409 |
| 4,575,212 | 3/1986 | Kitaura et al. | 354/409 |
| 4,588,278 | 5/1986 | Horigome | 354/406 |
| 4,618,235 | 10/1986 | Ishida et al. | 354/406 |
| 4,623,238 | 11/1986 | Taniguchi et al. | 354/402 |
| 4,671,640 | 6/1987 | Akada et al. | 354/402 |

FOREIGN PATENT DOCUMENTS

| 60-91313 | 5/1985 | Japan . |
| 61165715 | 5/1985 | Japan . |
| 61165716 | 5/1985 | Japan . |

*Primary Examiner*—Russell E. Adams
*Attorney, Agent, or Firm*—Price, Gess & Ubell

[57] ABSTRACT

There is provided an automatic focus control device for use in a camera system comprising a focus detection control means for continuously driving a motor from the time when it is judged that a focus condition of a photograph lens can not be detected until it is judged that the focus condition can be detected, and a rotation number control means for controlling the rotation speed of said motor driven by said focus detection control means in accordance with a constant data designating a relationship between the rotation number of said motor and a unit of a defocus value. Accordingly, the moving speed of said photograph lens is controlled in accordance with defocus variation during the movement of said photograph lens, resulting in that the infocus position of the object can be detected by a low contrast search without overrunning the infocus position, even though the object is positioned far from an available range of the focus detection.

15 Claims, 39 Drawing Sheets

AUTOMATIC FOCUS CONTROL DEVICE FOR USE IN A CAMERA SYSTEM

This is a continuation of application Ser. No. 243,195, filed on Aug. 18, 1988, for an AUTOMATIC FOCUS CONTROL DEVICE FOR USE IN A CAMERA SYSTEM which is a continuation of application Ser. No. 121,140, filed Nov. 16, 1987, now abandoned, which is a continuation of abandoned Ser. No. 025,813, filed on Mar. 13, 1987.

BACKGROUND OF THE INVENTION

1. Field of the Invention

The present invention relates to an automatic focus control device for use in a camera system, more particularly, to an automatic focus control device for use in a camera system for detecting a focus condition and controlling an automatic focus adjustment in accordance with an output of an image sensor.

2. Description of Prior Art

There is provided a camera system comprising an automatic focus control device for detecting a focus condition such as the amount of defocus and the direction of defocus in accordance with a reflected light from an object to be photographed, and controlling an automatic focus adjustment in accordance with a result of the focus condition detection. In this sort of automatic focus control device, it is possible to detect an infocus position correctly, when the amount of defocus or a defocus value, corresponding to a difference quantity between a current position and an infocus position of a photograph lens of the camera, is only within an available range of the focus detection. On the other hand, it is impossible to detect the infocus position when the defocus value is out of the detection available range, in this case, a low contrast search control is performed as follows. That is, the focus condition is detected moving the photograph lens into another position, and the infocus position of the object is detected when the photograph lens is positioned in the detection available range. The low contrast search control is disclosed in the Japanese patent laid open No. 45212/1986.

However, in the aforementioned low contrast search control, when a cycle period of the focus detection is longer than a defocus variation during the photograph lens's moving and the moving quantity of the photograph lens during the lens's movement becomes larger than a predetermined detection available range, this leads to a problem that a lack of detecting an infocus position of the object by overrunning the infocus position during the lens's movement is caused and it is impossible to detect the focus position.

The reason why the lack of the infocus position detection for the object occurs will be described below in details, referring to FIG. 26. The left extreme position of FIG. 26 corresponds to the nearest photograph position of the camera to the object, on the other hand, the right extreme position corresponds to the infinity position, and x denotes the position of the object. Now, the photograph lens LENS1 is positioned at a position SA-1, and DFC denotes a range where the focus condition, i.e., the amount of defocus and the direction of defocus can be detected, wherein the range is referred to hereinafter as detection available range. Then, since the object is far from the detection available range of the photograph lens, the focus condition is detected moving the photograph lens in the infinity direction. Within a required time for detecting the focus condition at the point SA-1, the photograph lens is moved at a distance DFMA into a point SA-2 and the second focus detection is performed at the point SA-2. If the required time for detecting the focus condition is constant, the focus detection is performed in order at the points SA-3 and SA-4, and the infocus position of the object can be detected when the lens LENS1 is positioned within the detection available range DFC of the photograph lens LENS 1. As described above, when the moving quantity DFMA of the photograph lens LENS 1 during one unit time for the focus detection is smaller than the detection available range DFC, the focus detection can be performed.

On the other hand, when the moving quantity DFMA of the photograph lens during one unit time for the focus detection is larger than the detection available range DFC, the lack of the infocus position detection may occur. That is, when the photograph lens LENS 2 is moved from the point SB-1 in the infinity direction during the low contrast search, the focus detection is respectively performed in order at the points SB-1, SB-2, SB-3, and SB-4. However, when the photograph lens LENS 2 is positioned at the point SB-5, the infocus position detection can not be performed because the amount of defocus between the position of the photograph lens LENS 2 and the infocus position, i.e., the position of the object x is larger than the detection available range DFC. Next, when the photograph lens LENS 2 is moved by the moving quantity DFMB, the photograph lens overruns the infocus position x and is positioned at a point SB-6. In this case, the infocus position detection also can not be performed because the amount of defocus is larger than the detection available range DFC, as well as the detection at the point SB-5. Thus, when the moving quantity DFMB of the photograph lens during one unit time for the focus detection is larger than the aforementioned detection available range DFC, the lack of the infocus position may occur, resulting in that the infocus position can not be detected.

Furthermore, not only the focal point can not be detected, but also the following problem may often occur even though the image of the object may be brought into an infocus condition. That is, when the aforementioned low contrast search is performed, the photograph lens is moved from an out of focus position to an infocus position, and overruns the infocus position without stopping, resulting in that the photograph lens is positioned at another out-of-focus position. Therefore, the reliability of the automatic focus control device is reduced.

SUMMARY OF THE INVENTION

An essential object of the present invention is to overcome the aforementioned problems, more particularly, to provide an automatic focus control device for use in a camera system which can certainly detect a focus condition by a low contrast search without overrunning the infocus position of the object.

A further object of the present invention is to provide an automatic focus control device for use in a camera system which can certainly detect a focus condition without a lack of detecting an infocus position by controlling the rotation speed of a motor for moving a photograph lens.

A still further object of the present invention is to provide an automatic focus control device for use in a camera system which can detect an infocus position of an object at a higher speed without a reduction of a precision of the focus detection.

Another object of the present invention is to provide an automatic focus control device for use in a camera system which can detect an infocus position at a high speed with a high probability of detecting the focus condition by limiting a maximum integration time of an image sensor.

According to the present invention, there is provided an automatic focus control device for use in a camera system comprising: a photograph lens including a lens for the focus adjustment: an image sensor means having plural pixel for detecting a pencil of light rays reflected on an object to be photographed: a data processing means for converting the detected light quantity to data of the light quantity: a judging means for judging whether or not focus condition of said object can be detected in accordance with the data outputted by said data processing means: a calculating means for calculating a defocus value of said photograph lens in accordance with the data outputted by said data processing means, said calculating means being enabled when impossibility of the focus condition detection is judged by said judging means; a motor for moving said lens for the focus adjustment; a driving means for driving said motor in accordance with the defocus value calculated by said calculating means: a constant data outputting means for outputting constant data designating a relationship between a rotation number of said motor and a unit of the defocus value; a focus detection control means for continuously driving said motor from the time when impossibility of the focus condition detection is judged by said judging means until possibility of the focus condition detection is judged by said judging means: and a rotation number control means for controlling the rotation speed of said motor driven by said focus detection control means in accordance with the constant data outputted by said constant data outputting means.

Furthermore, according to the present invention, there is provided an automatic focus control device for use in a camera system comprising: a photograph lens including a lens for the focus adjustment: an image sensor means having plural pixel for detecting a pencil of light rays reflected on an object to be photographed: a data processing means for converting the detected light quantity to data of the light quantity: a judging means for judging whether or not a focus condition can be detected in accordance with the data outputted by said data processing means; a calculating means for calculating a defocus value of said photograph lens in accordance with the data outputted by said data processing means, said calculating means being enabled when impossibility of the focus condition detection is judged by said judging means: a motor for moving said lens for the focus adjustment; a driving means for driving said motor in accordance with the defocus value calculated by said calculating means: a focus detection control means for continuously driving said motor from the time when impossibility of the focus condition detection is judged by said judging means until possibility of the focus condition detection is judged by said judging means: and a rotation number control means for controlling the rotation speed of said motor in accordance with a defocus variation during the movement of said lens for the focus adjustment.

Furthermore, according to the present invention, there is provided an automatic focus control device for use in a camera system comprising: a photograph lens including a lens for the focus adjustment: a storage type image sensor means having plural charge storage type of pixel for detecting a pencil of light rays reflected on an object to be photographed: a data processing means for converting the detected light quantity to data of the light quantity: a judging means for judging whether or not focus condition of said object can be detected in accordance with the data outputted by said data processing means; a calculating means for calculating a defocus value of said photograph lens in accordance with the data outputted by said data processing means, said calculating means being enabled when impossibility of the defocus condition detection is judged by said judging means: a motor for moving said lens for the focus adjustment: a driving means for driving said motor in accordance with the defocus value calculated by said calculating means: a constant data outputting means for outputting constant data designating a relationship between a rotation number of said motor and a unit of the defocus value: a focus detection control means for continuously driving said motor from the time when impossibility of the focus condition detection is judged by said judging means until possibility of the focus condition detection is judged by said judging means an integration time control means for controlling an integration time of said image sensor within a predetermined maximum integration time in accordance with the brightness of said object: and an integration time limiting means for changing the predetermined maximum integration time in accordance with the constant data outputted by said constant data outputting means.

Furthermore, according to the present invention, there is provided an automatic focus control device for use in a camera system comprising: a photograph lens including a lens for the focus adjustment: a storage type of image sensor means having plural charge storage type of pixel for detecting a pencil of light rays reflected on an object to be photographed: a data processing means for converting the detected light quantity to data of the light quantity: a judging means for judging whether or not a focus condition of said object can be detected in accordance with the data outputted by said data processing means: a calculating means for calculating a defocus value of said photograph lens in accordance with the data outputted by said data processing means, said calculating means being enabled when impossibility of the focus condition detection is judged by said judging means: a motor for moving said lens for the focus adjustment: a driving means for driving said motor in accordance with the defocus value calculated by said calculating means; a focus detection control means for continuously driving said motor from the time when impossibility of focus condition detection is judged by said judging means until possibility of the focus condition detection is judged by said judging means: an integration time control means for controlling an integration time of said image sensor within a predetermined maximum integration time in accordance with a brightness of said object; and an integration time limiting means for changing the predetermined maximum integration time in accordance with defocus variation during the movement of said lens for the focus adjustment.

Accordingly, in the present invention, the moving speed of the photograph lens and the integration time of the image sensor are controlled in accordance with a defocus variation during the movement of the photograph lens, so that a moving quantity of the photograph lens for one focus detection time is not larger than an available range of the focus detection. Even though the object is positioned far from the available range of the focus detection, the infocus position of the object can be certainly detected at a higher speed by the low contrast search without overrunning the infocus position of the object, resulting in that the reliability of the automatic focus control device can be increased as compared with the prior art.

BRIEF DESCRIPTION OF THE DRAWINGS

DETAILED DESCRIPTION OF THE PREFERRED EMBODIMENTS Principle of automatic focus control First of all, the principle of the automatic focus control will be described below in details. "Automatic focus" is referred to hereinafter as AF. FIGS. 10 and 11 show an optical system of a focus condition detecting device for the automatic focus control. In FIG. 10, pencils of light rays of the object passing through the first and the second portions 2a and 2b of a photograph lens 2 symmetrical with respect to the optical axis 18 are reimaged to form two images. By determining the correlation between the two images, the amount of defocus and the direction of defocus from the expected focal point are measured.

Figure 1:
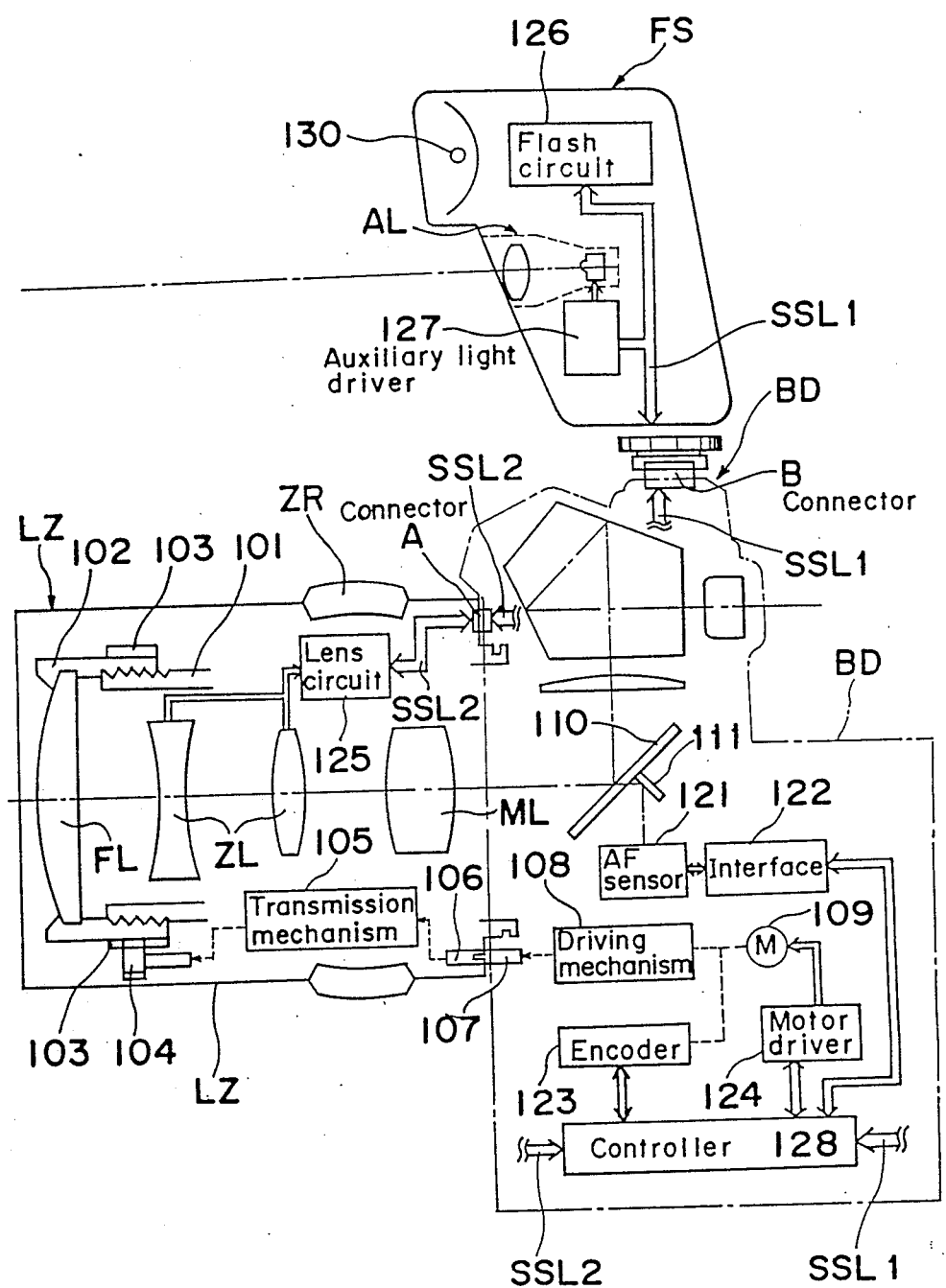
FIG. 1 is a schematic diagram of an automatic focus camera of a preferred embodiment according to the present invention.

A condenser lens 6 positioned behind the photograph lens 2 is arranged at the expected focal point surface 4, or behind the expected focal point surface 4. Image reformation lenses 8 and 10 positioned behind the condenser lens 4 are positioned symmetrically to the optical axis 18 of the photograph lens 2. A linear image sensors 12a and 12b such as charge coupled device (referred to hereinafter as CCD) are arranged respectively at the image formation surface of the image reformation lens 8 and 10.

Figure 11:
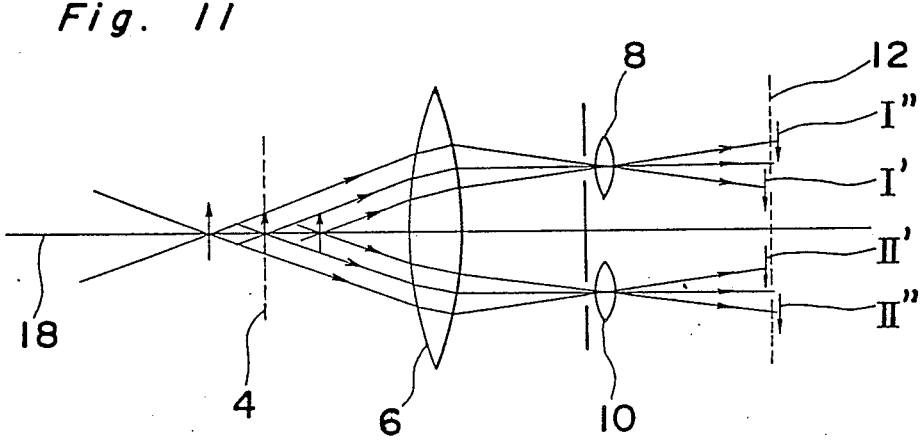

In FIG. 11, one piece of the image sensor 12 is used as the aforementioned two image sensors 12a and 12b for the convenience of the explanation.

When the image of the object is formed at the expected focal point surface 4 (referred to hereinafter as infocus condition), the distance between the two images formed on the image sensor 12 becomes a distance predetermined by the optical system for the focus condition detection. When the image of the object is formed at the forward position from the expected focal point surface 4 (referred to hereinafter as forward focus condition), the images I' and II' formed on the image sensor 12 are near the optical axis 18, resulting in that the distance between the images I' and II' is smaller than the aforementioned distance of the expected infocus condition. On the other hand, When the image of the object is formed behind the expected focal point surface 4 (referred to hereinafter as backward focus condition), the images I'' and II'' formed on the image sensor 12 are far from the optical axis 18, resulting in that the distance between the images I'' and II'' is larger than the aforementioned distance of the expected infocus condition. Therefore, the focus condition of the object can be judged by detecting the distance between the images I and II formed on the image sensor 12.

The calculation of the distance required for moving the lens to the position of the expected focal point, i.e., the defocus value DF will be described below in details.

Figure 12:
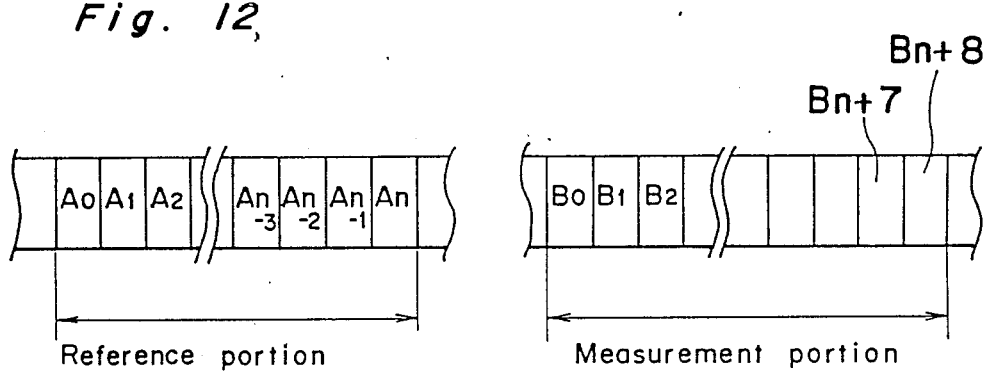
FIG. 12 is a schematic diagram showing a reference portion and a measurement portion of a CCD image sensor FLM shown in FIG. 2A, FIGS. 13A to 13C are flow charts showing an abstract of a control operation of the second preferred embodiment according to the present invention.

FIG. 12 shows pixel of the image sensor 12. In FIG. 12, the image I is formed on pixel A0 to An of a reference portion of the image sensor 12 by the image reformation lens 8, and the pixel A0 to An of the image sensor 12 output pix signals Ia0 to Ian respectively. On the other hand, the image II is formed on pixel B0 to Bn+8 of a measurement portion of the image sensor 12 by the image reformation lens 10, and the pixel B0 to Bn+8 of the image sensor 12 output pix signals Ib0 to Ibn+8 respectively. It is detected, which portion of the image I formed on the reference portion of the image sensor 12 mostly corresponds to or coincides with a portion of the image II formed on the measurement portion of the image sensor 12. By detecting the distance between the detected portion of the image I and the corresponding portion of the image II, the defocus value can be calculated from the distance between the images I and II. The calculation of the defocus value will be described below in details.

Each of the pix signal of 9 pairs of the pix signals (Ib0 to Ibn), (Ib1 to Ibn+1), ———, (Ibn to Ibn+8) outputted from 9 pairs of the pixel (B0 to Bn), (B1 to Bn+1), ———, (Bn to Bn—8) of the measurement portion of the image sensor 12 is respectively compared in order with each of a pair of the pix signals (Ia0 to Ian) outputted from the pixel (A0 to An) of the reference portion of the image sensor 12, and it is detected which pair of the pix signals of the measurement portion of the image sensor 12 mostly corresponds to a pair of the pix signals (Ia0 to Ian) of the reference portion of the image sensor 12. The detection can be performed, for example, by the following procedure.

For 9 combinations (j=0 to 8) corresponding to 9 pairs of pix signals (Ib0 to Ibn), (Ib1 to Ibn+1), ———, (Ibn to Ibn+8) outputted from 9 pairs of the pixel (B0 to Bn), (B1 to Bn+1), ———, (Bn to Bn+8) of the measurement portion of the image sensor 12, the following values Fj are calculated.

$$Fj = \sum_{i=0}^{n} |Ibi - j - Iai|$$

Next, the minimum value Fjmin of 9 values Fj is obtained, and a pair of the pixel of the measurement portion of the image sensor 12 corresponding to Fjmin is obtained, resulting in that the pix signals outputted from the obtained pair of the pixel of the measurement portion of the image sensor 12 mostly corresponds to the pix signals outputted from the pixel of the reference portion of the image sensor 12.

For example, if the pix signals Ib4 to Ibn+4 mostly corresponds to the pix signals Ia0 to Ian respectively, the distance between a pair of the pixel (B4 to Bn+4) and the pixel A0 to An can be calculated as the distance between the images I and II formed on the image sensor 12. If the pix A0 is a th pix of the image sensor 12 and the pix B0 is b th pix of the image sensor 12, the number of the pixel is (b+4−a). Therefore, the distance between the images I and II is calculated by the following equation.

$$lx = (b+4-a) \times d \quad (1)$$

where d is a pitch between the pixel of the image sensor 12.

If the distance between the images I and II is l0 in design on the infocus condition, the defocus value DF is calculated by the following equation.

$$DF = K \times \{(b+4-a) \times d - l0\} \quad (2)$$

where K is a constant of the optical system of the focus condition detecting device.

The above defocus value DP includes the information of the direction of defocus. DF=0 represents the infocus condition, the positive value DF represents the backward focus condition, and the negative value DF represents the forward focus condition. The available range of the defocus value DF which can be detected by the above calculation is as follows.

$$K \times \{(b-a) \times d - l0\} \leq DF \leq K \times \{(b+8-a) \times d - l0\} \quad (3)$$

The defocus value DF can be calculated in the above range (3) in the distance measurement, and the range (3) is referred to hereinafter as defocus cover range.

The method for calculating the distance between the images I and II more correctly by detecting the corresponding relationship between the images I and II formed on the image sensor 12 is disclosed in details in the Japanese patent laid open Nos. 126517/1984 and 4914/1985 by the applicant of the present invention. The method is not described in this specification because the subject matter of the present invention is not pertinent thereto.

A contrast value C, a correlation level value YM, and a peak value P of the pix signal used for the judgment of a reliability of the defocus value DF and the judgment of lighting of an auxiliary light will be described below in details.

The peak value P of the pix signal is defined by the following equation as the maximum value of the pix signals Ia0 to Ian outputted from the pixel of the reference portion of the image sensor 12 used for calculating the above defocus value DF.

$$P = max\{Ia0, Ia1, ———, Ian\} \quad (4)$$

The contrast value C is defined by the following equation.

$$C = \sum_{k=0}^{n-1} |Iak - Iak+1| \quad (5)$$

The correlation level value YM is defined by the following equation.

$$YM = Hmin/C \quad (6)$$

where $$Hmin = min\{H(1), H(2), ———, H(9)\} \quad (7)$$

and H(l) is defined as a correspondence function by the following equation.

$$H(l) = \sum_{k=0}^{n} |Iak - Ibk + l - 1|, \quad (8)$$

$$l = 1, 2, \ldots, 9$$

The correlation level value YM is a normalized function by the contrast value C, because the correspondence function H(l) is depend o the contrast value C. The correlation level value YM can be obtained as the unit of the pitch between the pixel of the image sensor 12, however, in practical, the correspondence function often becomes a minimum value at the middle position between the pixel. Therefore, the interpolation calculation can be performed in order to obtain a position lmin where the minimum value Hmin of the correspondence function H(l) really becomes a minimum value. Moreover, the correcter correlation level value YM can be obtained by using the above real minimum value lmin. The above interpolation calculation method is described in the Japanese patent laid open No.

126517/1984 by the applicant of the present invention, and the method is not described in this specification, because the method is not the subject matter of the present invention.

It is referred to hereinafter as low contrast condition, when the peak value P of the pixel is smaller than a predetermined threshold value or the object is dark, when the contract value C is smaller than a predetermined threshold value or the object is in a low contrast, or when the correlation level value YM is larger than a predetermined threshold value. In the case of the low contrast, the reliability of the defocus value DF is reduced.

Construction of automatic focus camera

An automatic focus camera of a preferred embodiment according to the present invention will be described below in details.

FIG. 1 shows the whole construction of the automatic focus camera. In FIG. 1, the portion surrounded by a chain line is a main body BD of the camera. At the left side of the main body BD of the camera, a zoom lens LZ which is one example of various kinds of interchangeable lenses is detachably mounted on the main body BD. An electric flash device FS enclosing an auxiliary light device AL is detachably mounted on the top surface of the main body BD.

The zoom lens LZ is mechanically connected to the main body BD by clutch members 106 and 107, and a lens circuit 125 in the zoom lens LZ is connected to an AF controller 128 of the main body BD via a connector A and a signal bus SSL2. A flash driver 126 and an auxiliary light driver 127 of the electric flash device FS are connected to the controller 128 via a connector B and a signal bus SSL1.

The light beam reflected from the object passes through a lens group FL for focus adjustment, a lens group ZL for zooming, and a master lens group ML of the zoom lens LZ. Then, one portion of the light beam is reflected on a main mirror 110 and goes to a finder portion, on the other hand, one portion of the light beam passes through a half mirror portion positioned in the center portion of the main mirror 110, and goes to an automatic focus sensor module 121 (referred to hereinafter as AF sensor module) via a submirror portion 111.

The AF sensor module 121 is connected to the AF controller 128 via an interface circuit 122, and the lens circuit 125 is connected to the AF controller 128 via the connector A and the signal bus SSL2, as described above. The AF controller 128 calculates the aforementioned defocus value DF from the information inputted from the AF sensor module 121. The AF controller 128 also converts, by receiving the lens information fed from the lens circuit 125 and the focal length value set by the manual rotation of a zoom ring ZR driven by a user of the camera, the calculated defocus value DP to the number of rotations of a motor 109 required for driving the lens group FL for focus adjustment for moving the lens group FL to the infocus position.

Moreover, the transmission mechanism for focus adjustment will be described below in details. The AF controller 128 is connected to a motor driver 124 for driving the motor 109 and a encoder 123 for detecting the speed and the number of rotations of the motor 109, and the motor 109 is driven by the motor driver 124 so that the motor 109 rotates by the number of rotations calculated by the AF controller 128. The rotation force of the motor 109 is transmitted to a big gearwheel 103 arranged at the outer portion of a focus adjustment member 102 of the lens group FL for focus adjustment via a driving mechanism 108 of the main body BD of the camera, the clutch members 106 and 107, a transmission mechanism 105, and a little gearwheel 104 in the zoom lens LZ. A female helicoid screw is formed at the inner portion of the focus adjustment member 102, on the other hand, a male helicoid screw for engaging with the female helicoid screw is formed at the fixed portion 101 which is formed as one body with the lens mount of the zoom lens LZ. The lens FL for focus adjustment is moved forward and backward by the mechanical power transmitted to the big gearwheel 103, resulting in that the focus adjustment is performed.

As described above, the flash driver 126 and the auxiliary light driver 127 are connected to the AF controller 128 via the connector B and the signal bus SSL1. Turning on and off of lighting of a flash tube 130 and the auxiliary light device AL is controlled by the AF controller 128.

Figure 2A:
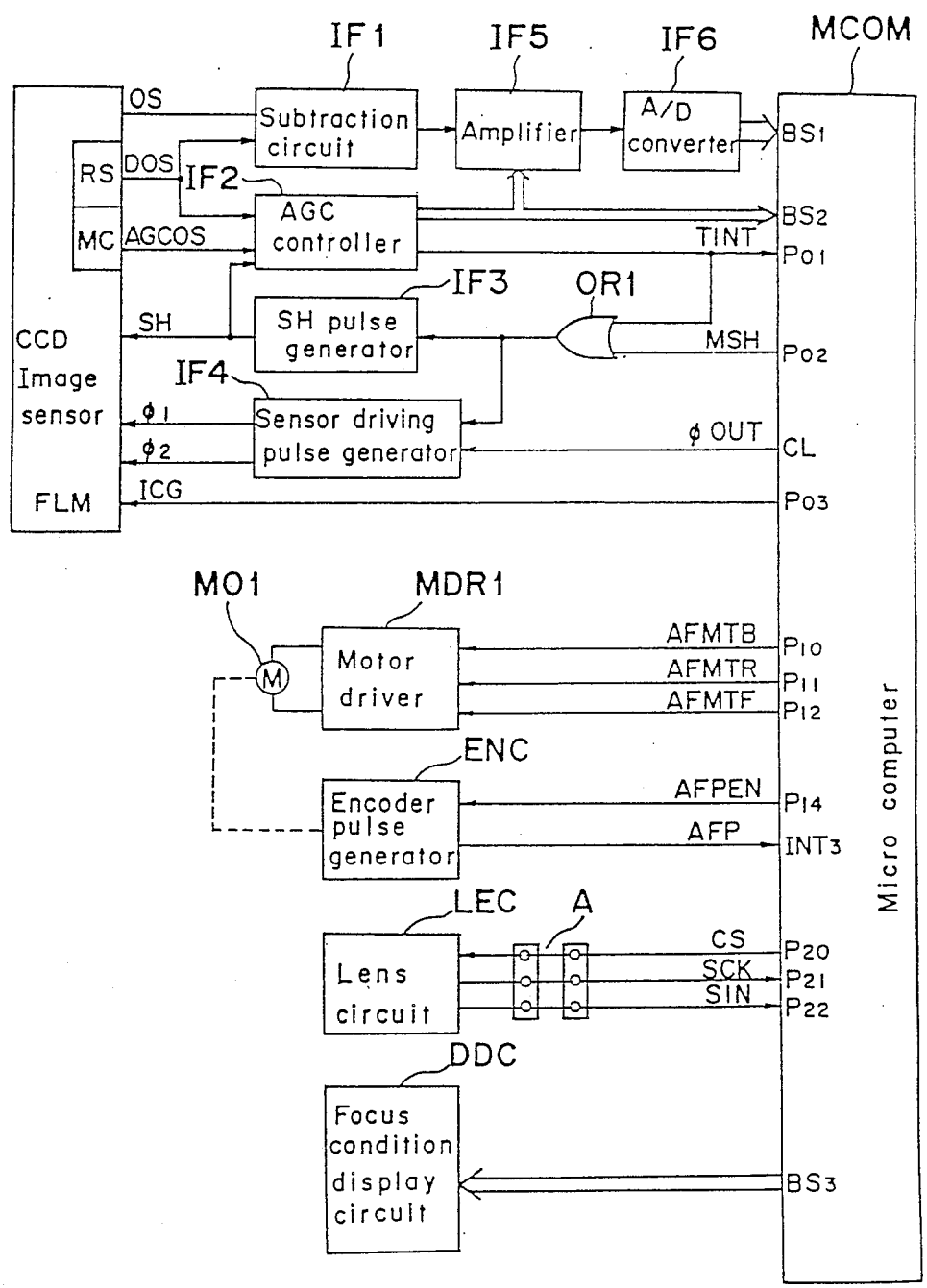
FIGS. 2A and 2B are schematic diagrams of a control circuit of the automatic focus camera shown in FIG. 1, FIGS. 3A to 3F are flow charts showing a control operation of the first preferred embodiment of the control circuit shown in FIGS. 2A and 2B according to the present invention.
Figure 2B:
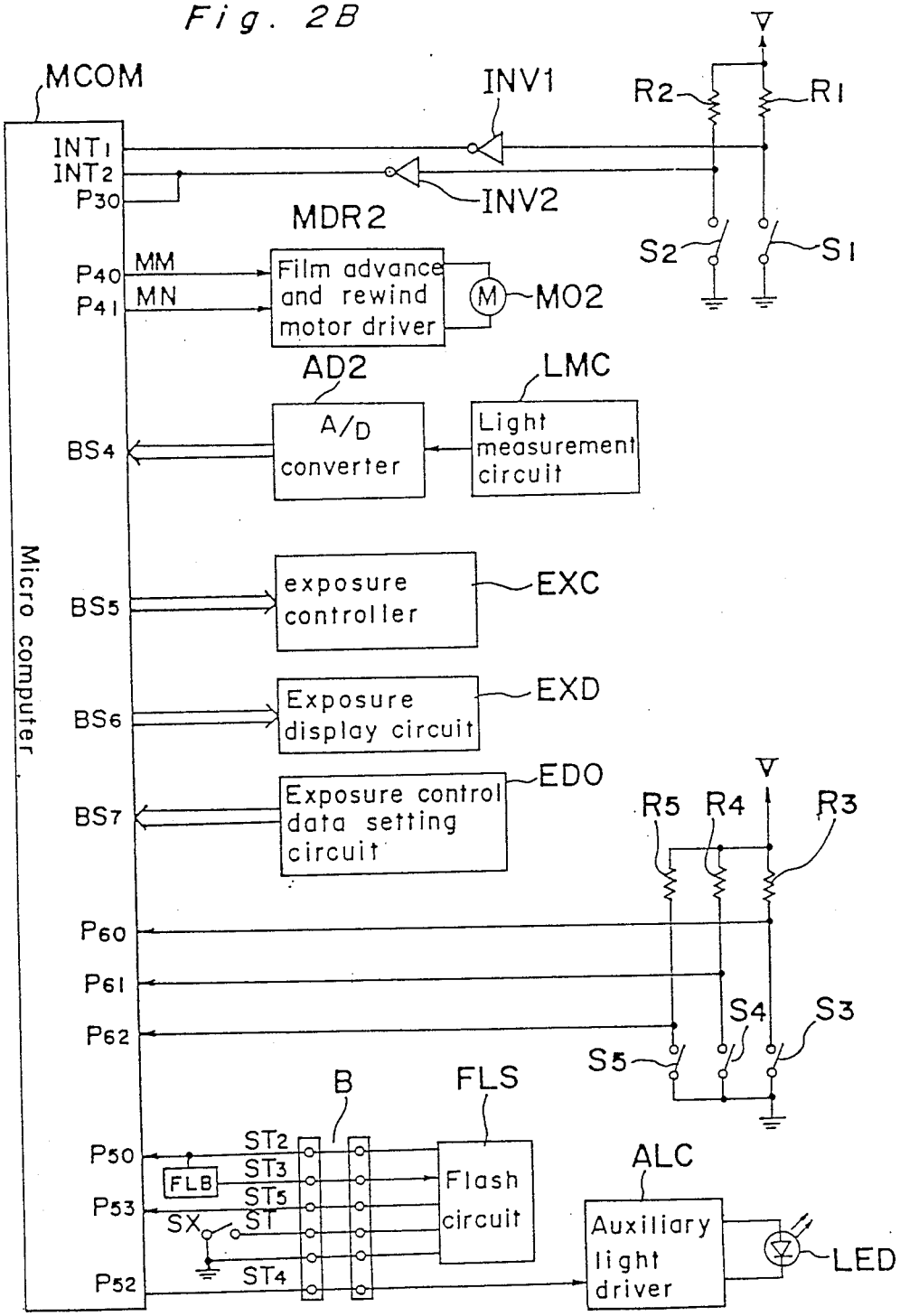
Figure 8:
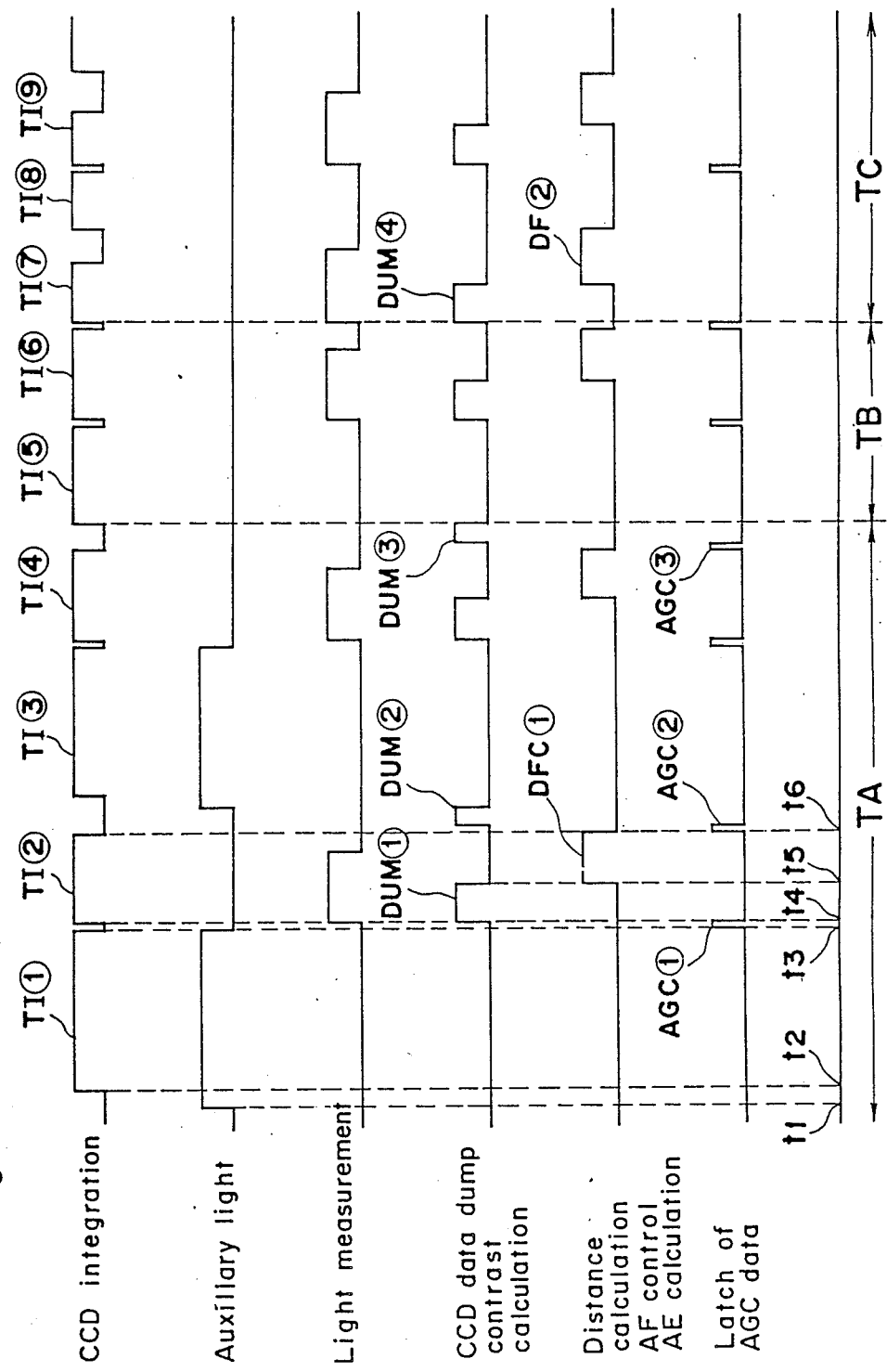
FIG. 8 is a timing chart showing timings of a CCD integration of the control circuit shown in FIGS. 2A and 2B, FIGS. 9A to 9C are graphs showing a distance measurement range during the automatic focus operation.

FIGS. 2A and 2B are schematic diagrams of a control circuit of the automatic focus camera shown in FIG. 1. In FIGS. 2A and 2B, 8 bit microcomputer MCOM is provided for controlling the whole of the camera, such as the aforementioned automatic focus adjustment and the exposure control etc., and the microcomputer MCOM corresponds to the AF controller 128 shown in FIG. 1.

S1 denotes a switch which is turned on when a shutter release button is pushed down at the first step corresponding to a so-called half push down condition, and S2 denotes a switch which is turned on when the shutter release button is pushed down at the second step corresponding to a so-called push down end condition, or when the shutter release button is pushed down more deeply than the first step. When the switch S1 is turned on, the power is supplied from a power supply V (not shown) to the control circuit shown in FIGS. 2A and 2B, and a sequence operation described below such as the focus adjustment, and the light measurement etc. starts. When the switch S2 is turned on, the exposure operation starts. Each of one terminal of the switches S1 and S2 is connected to earth respectively. Another terminal of the switches S1 and S2 is pulled up by a voltage supply V via resistors R1 and R2 respectively, and is connected to interrupt input terminals INT1 and INT2 of the microcomputer MCOM via inverters INV1 and INV2, respectively.

CCD image sensor FLM corresponds to the AF sensor module 121 shown in FIG. 1, and encloses a reference signal generator RS and a monitor circuit MC. The monitor circuit MC generates a brightness signal AGCOS designating a rate of the integration of the CCD image sensor FLM, and the reference signal generator RS generates a reference signal DOS designating the reference level of a brightness signal AGCOS and image signals OS outputted from the CCD image sensor FLM.

IF1 to IF 6 and OR1 denote circuits enclosed in the aforementioned interface circuit 122 shown in FIG. 1, and the operation of the circuits IF1 to IF6 and OR1 will be described below in details referring to the operation of the CCD image sensor FLM.

First of all, the CCD image sensor FLM is initialized and starts integrating the inputted image when a high level pulse of an integration clear signal ICG is inputted from the terminal P03 of the microcomputer MCOM to the CCD image sensor FLM. At the same time, the reference signal generator RS and the monitor circuit MC are initialized. As soon as the CCD image sensor FLM starts integrating the image, the reference signal generator RS generates the reference signal DOS, and the brightness monitor circuit MC generates the brightness signal AGCOS.

The AGC controller IF2 detects the brightness of the object by detecting the difference between the brightness signal AGCOS and the reference signal DOS, and judges the timing to stop integrating the image in the CCD image sensor FLM. If the difference between the signals AGCOS and DOS is larger than a predetermined threshold level, the AGC controller IF2 outputs an integration stop signal TINT for stopping the integration to the terminal P01 of the microcomputer MCOM, and also outputs the signal TINT to the SH pulse generator IF3 and the sensor driving pulse generator IF4 via an OR gate OR1.

When the integration stop signal TINT is inputted to the SH pulse generator IF3, the SH pulse generator generates an integration stop signal SH for stopping the integration to the CCD image sensor FLM. On the other hand, in response to the integration stop signal TINT, the sensor driving pulse generator IF4 converts a clock pulse $\phi$out outputted from the microcomputer MCOM to sensor drive pulses $\phi1$ and $\phi2$ having a different phase from each other, and outputs the clock pulses $\phi1$ and $\phi2$ to the CCD image sensor FLM.

On the other hand, after the microcomputer MCOM outputs the integration clear signal ICG, the microcomputer MCOM starts counting for a predetermined time, monitoring the terminal P01. When the object is in the low contrast condition, or the integration stop signal TINT is not inputted to the terminal P01 even though the microcomputer MCOM completes counting for a predetermined time, the microcomputer MCOM outputs a high level pulse of an integration stop signal MSH from the terminal P02 to the SH pulse generator IF3 and the sensor driving pulse generator IF4 via the OR gate OR1, so that the CCD image sensor FLM stops the integration.

As described above, when the object is in a high brightness, the AGC controller IF2 makes the CCD image sensor FLM stop the integration, on the other hand, when the object is in a low brightness, the microcomputer MCOM makes the CCD image sensor FLM stop the integration. After stopping the integration, in accordance with the aforementioned sensor drive pulses $\phi1$ and $\phi2$, the CCD image sensor FLM outputs the stored signals in each of the pixel as image information signals OS.

The subtraction circuit IF1 calculates the difference between the image information signal OS and the reference signal DOS, and outputs the subtractive signal to the amplifier IF5. The amplifier IF5 amplifies the subtractive signal outputted from the subtraction circuit IF1 so that the amplified signal becomes a suitable signal level for the analog-digital converter IF6 (referred to hereinafter as A/D converter), wherein the amplification factor of the amplifier IF5 is determined by a signal outputted from the AGC controller IF2 via an output bus, in reference with the subtractive signal between the reference signal DOS and the brightness signal AGCOS which are inputted to the AGC controller IF2 when the integration is stopped, and the amplification factor is selected from one of ×1, ×2, ×4, and ×8 and is arranged.

When the integration is stopped by the integration stop signal TINT outputted from the AGC controller IF2, the amplification factor is arranged as ×1, on the other hand, when the integration is stopped by the integration stop signal MSH outputted from the microcomputer MCOM, the amplification factor is selected from one of ×1, ×2, ×4, and ×8 in accordance with the brightness of the object. The amplification factor is referred to hereinafter as AGC data. The AGC data is outputted from the AGC controller IF2 to the amplifier IF5 and the terminals BS2 of the microcomputer MCOM via the output bus.

Each of the image information outputted from the CCD image sensor FLM is analog-digital converted by the A/D converter IF6 and is outputted to the terminals BS1 of the microcomputer MCOM.

The construction and the operation of the interface circuit 12 shown in FIG. 1 is described above, and the detailed explanation is described in the Japanese patent laid open No. 125817/1985 applied by the present applicant. The more detailed explanation is not described, because the construction and the operation of the interface circuit 12 is not the subject matter of the present invention.

Next, the construction and the operation of the control circuit for driving the photograph lens will be desribed below in details.

A motor M01 is provided for moving the lens group FL for focus adjustment. A motor driver MDR1 is provided for driving the motor M01, and the motor driver MDR1 makes the lens group FL for focus adjustment move forward and backward, and stop, in accordance with signals AFMTB, AFMTR and AFMTF respectively outputted from the terminals P10, P11, P12 of the microcomputer MCOM. An encoder pulse generator ENC is enabled by the signal AFPEN from the terminal P14 of the microcomputer MCOM, and the encoder pulse generator ENC generates a pulse signal AFP corresponding to the rotation quantity of the motor M01 to the interrupt terminal INT3 of the microcomputer MCOM. In the preferred embodiment, the encoder pulse generator ENC generates 16 pulses per one rotation of the motor M01. In accordance with the pulse signal AFP, the microcomputer MCOM detects the rotation quantity of the motor M01 and outputs the signals AFMTB, AFMTR, and AFMTF respectively from the terminals P10, P11 and P12 in order to control the motor M01, as described above. Table 1 shows the control condition of the motor M01 for the signals AFMTB, AFMTR and AFMTF.

The lens circuit LEC corresponds to the lens circuit 125 of the zoom lens LZ shown in FIG. 1, and in accordance with a start signal CS outputted from the terminal P20 of the microcomputer MCOM, and the lens circuit LEC transmits the lens data of the zoom lens LZ in serial to the terminal P22 of the microcomputer MCOM with a synchronizing signal SCK outputted from the terminal P21 of the microcomputer MCOM. The lens data outputted from the lens circuit LEC includes the conversion factor K for converting the defocus value DF of the zoom lens LZ to the rotation number of the motor M01, an infrared rays correction quantity ΔIR for correcting the focal point position of the zoom lens LZ in accordance with the wavelength of an infrared rays of an auxiliary light for the distance measurement, and an open aperture value Avo of the zoom lens LZ for calculating the exposure control value of the camera.

The conversion factor K is defined by the following equation.

$$K = N/DF$$

where N is a count number of the pulse signal AFP outputted from the encoder pulse generator ENC, and DF is the defocus value DP of the zoom lens LZ calculated by the the microcomputer MCOM from the image information output from the CCD image sensor FLM.

The infrared rays correction quantity $\Delta IR$ is defined by the following equation.

$$\Delta IR = DF700 - DFd$$

where DF700 is the defocus value of the zoom lens LZ in the case of the wave length 700 nm of the auxiliary light of the electric flash device FL, and DFd is the defocus value of the zoom lens LZ in the case of daylight.

In accordance with the high level start signal CS outputted from the terminal P20 of the microcomputer MCOM, the lens circuit LEC is enabled, and the lens circuit LEC outputs the lens data SIN in serial synchronizing to the the synchronizing signal SCK to the terminal P22 of the microcomputer MCOM.

The microcomputer MCOM calculates the defocus value DF from the image information output from the CCD image sensor FLM, and calculates the rotation quantity of the motor M01 from the calculated defocus value DF and the conversion factor K of the lens data input from the lens circuit LEC. Then, the microcomputer MCOM performs the operation of the automatic focus adjustment in accordance with the rotation quantity of the motor M01, and when the operation of the automatic focus adjustment is completed, the microcomputer MCOM outputs the completion of the automatic focus adjustment to the focus condition display circuit DDC, so that the result is displayed by a focus condition display circuit DDC.

A motor driver MDR2 is provided for driving a motor M02 for advancing and rewinding the film, the motor driver MDR2 is controlled by the signals MM and MN input from the terminals P40 and P41 of the microcomputer MCOM. Table 2 shows the control operation of the motor M02 for the signals MM and MN.

A light measurement circuit LMC is provided for control the exposure of the camera, and the light measurement circuit LMC outputs the measurement data to an A/D converter AD2. The A/D converter AD2 analog-digital converts the measurement data and outputs the A/D converted measurement data to the terminal BS4 of the microcomputer MCOM.

An exposure control data setting circuit EDO is provided for inputting a film sensitivity and an exposure control mode set by the photographer to the terminal BS7 of the microcomputer MCOM.

In accordance with the aforementioned data input from the light measurement circuit LMC, the lens circuit LEC and the exposure control data setting circuit EDO, the microcomputer MCOM calculates the exposure control value and outputs the exposure control value to the exposure control circuit EXC from the terminal BS5, and also outputs the exposure control value to the exposure display circuit EXD, so that a desired exposure control operation is performed and the exposure control value is displayed by the exposure display circuit EXD.

A film advance mode selecting switch S3 is provided for selecting one shot photograph or continuous photograph. A priority mode selecting switch S4 is provided for giving the priority to the automatic focus operation or the release operation when the release switch S2 is closed. An AF mode selecting switch S5 is provided for selecting a one shot AF mode which inhibits the AP operation after an infocus condition is attained, or a continuous AF mode which continuously performs the AF operation.

One terminal of the switches S3, S4 and S5 is connected to earth, respectively. Another terminal of the switches S3, S4 and S5 is pulled up by a voltage supply V via pull up resistors R3, R4 and R5 respectively, and is respectively connected to the terminals P60, P61 and P62 of the microcomputer MCOM. Table 3 shows the control condition for the switching condition of the switches S3, S4 and S5.

The flash driver FLS and the auxiliary light driver ALC correspond to the flash circuit 126 and the auxiliary light driver 127 of the electric flash device FS shown in FIG. 1, respectively. The flash driver FLS is connected to the terminals P50 and P53 of the microcomputer MCOM via the connector B, and the auxiliary light driver ALC is connected to the terminal P52 via the connector B. The flash driver FLS outputs a charge completion signal ST2 representing that a main capacitor of the flash device is charged up to a given lvel to the terminal P50 of the microcomputer MCOM, and outputs an auxiliary light mount signal ST5 representing that the mounted flash device has a function to emit an auxiliary light to the terminal P53 of the microcomputer MCOM. On the other hand, the microcomputer MCOM outputs a stop signal ST3 for terminating the flash light emission to the flash driver PLS via a flash light control circuit PLB for controlling the timing to interrupt or terminate the flash light emission of the electric flash device FS. The microcomputer MCOM outputs an auxiliary light control signal ST4 from the terminal P52 to the auxiliary light driver ALC, wherein the auxiliary light control signal is used for controlling turning on and off of an infrared rays light emitting diode LED used as an auxiliary light emitter detecting the focal point. SX denotes a synchro switch SX of the camera. One terminal of the switch SX connected to earth and another terminal thereof is connected to the flash driver FLS via the connector B, wherein the switching condition of the switch SX is transferred to the flash driver FLS.

First preferred embodiment of automatic focus control

Next, the control operation of the first preferred embodiment of the aforementioned automatic focus camera will be described below referring to the flow chart of FIGS. 3A to 3F.

When the shutter release button is pushed down at the first step, the switch S1 is turned on, resulting in that the high level interrupt signal is inputted into the interrupt terminal INT1 of the microcomputer MCOM. In accordance with the interrupt signal into the interrupt terminal INT1, the microcomputer MCOM executes the program for the automatic focus adjustment and the automatic exposure control etc. corresponding to the flow chart shown in FIGS. 3A to 3F starting from the step 101.

The program flow goes from the step 101 to the step 102, the CCD image sensor FLM is initialized. The initialization of the CCD image sensor FLM is described in the Japanese patent laid open No. 241007/1985, and it is not described in this specification because it is not the subject matter of the present invention. Next, at the step 105, various flags are initialized. Table 4 shows the initialized flags with their function. Moreover, the program flow goes to an integration routine CDINTA starting from the step 106.

The steps 108 and 109 are a judgment routine whether the auxiliary light is to be emitted or not. At the step 108, if an auxiliary light mode flag ALMF is "1", the program flow goes to the step 109 to judge whether or not a low contrast search inhibit flag LSIF is "1".

The meaning of the low contrast search will be described below. Even though the low contrast condition is detected at the focus condition detection, which only shows that the object is in a low contrast condition only in the defocus cover range shown in the equation (3). Therefore, the object may be in the non-low contrast condition at the lens position without the defocus cover range. It is necessary to repeatedly measure the distance moving the photograph lens from the nearest position to the infinity position and judge whether or not the object is in the low contrast condition within the whole range of the photographed distance. Therefore, it is called "low contrast search" to repeatedly measure the distance driving the lens until it is detected that the object is not in the low contrast condition.

At the step 109, if the low contrast search inhibit flag LSIF is "0" or the low contrast search is permitted, the program flow goes to the step 110. At the step 110, 50 msec is set as a maximum integration time Tmax of the CCD image sensor FLM, and at the step 111, the auxiliary light control signal ST4 is made high level. Then, the auxiliary light driver ALC is enabled and the light emitting diode LED starts lighting. Next, at the step 112, the microcomputer MC0M waits for 5 msec in order to recover the time response of the CCD image sensor FLM for a brightness change of the object after the light emitting diode LED starts lighting, and then, at the step 114, the CCD image sensor PLM starts the integration operation.

On the other hand, if the auxiliary light mode flag ALMF is "0" at the step 108, or if the low contrast search inhibit flag LSIF is "1", the auxiliary light is not turned on, and 20 msec is set as the maximum integration time Tmax at the step 113, the program flow goes to the step 114, and the CCD image sensor FLM starts the integration operation.

After the CCD image sensor FLM starts the integration operation, it is judged whether or not the high level integration stop signal TINT to be input from the AGC controller IF2 is detected at the step 115. If the high level integration stop signal TINT is detected due to the completion of the integration within the maximum integration time Tmax, the program flow goes to the step 118, on the other hand, if the high level integration stop signal TINT is not detected, the program flow goes to the step 116. At the step 116, it is judged whether or not the count time T is larger than the maximum integration time Tmax arranged at the steps 110 or 113. If the count time T is larger than Tmax, the program flow goes to the step 117, on the other hand, if the count time T is not larger than Tmax, the program flow goes back to the step 115. At the step 117, the microcomputer MCOM outputs the integration stop signal MSH to the CCD image sensor FLM via the OR gate OR1 and the SH pulse generator IF3, then the program flow goes to the step 118. At the step 118 shown in FIG. 3C, the microcomputer MCOM outputs the low level auxiliary light control signal ST4 to the auxiliary light driver ALC, so that lighting of the light emitting diode LED is stopped.

Next, at the step 119, the microcomputer MCOM latches the AGC data inputted from the AGC controller IF2, and then, at the step 120, the microcomputer MCOM makes the CCD image sensor FLM start the integration operation of the next cycle, and the microcomputer MCOM starts detecting the light measurement data from the light measurement circuit LMC via the A/D converter AD2 at the step 121. Moreover, at the step 122, the microcomputer MCOM latches the aforementioned 8 bit pixel data detected in the CCD image sensor FLM at the steps 114 to 117. The latch operation of the microcomputer MCOM is referred to hereinafter as data dump. In parallel with the data dump operation, the microcomputer MCOM calculates the pixel peak value P of the equation (4) and the contrast value C of the equation (5).

Next, at the step 123, the microcomputer MCOM communicates with the lens circuit LEC of the zoom lens LZ so that the microcomputer MCOM latches the conversion factor K, the open aperture value Avo, and the infrared rays correction value $\Delta IR$ and the auxiliary light mount signal. Moreover, at the step 124, the microcomputer MCOM calculates the defocus value DF of the equation (2) from the latched pixel data.

At the steps 125 to 127, the microcomputer MCOM performs the exposure calculation. First of all, at the step 125, the microcomputer MCOM latches the light measurement data whose detection has been started at the step 121, and then, at the step 126, after the microcomputer MCOM latches the aforementioned set exposure control data and the data of the AF mode described in Table 3, the flags designating each of the modes are arranged. Next, at the step 127, the microcomputer MCOM calculates the exposure control value, and then, at the step 128, the calculated data for the exposure control is displayed by the exposure display circuit EXD Moreover, at steps 129 and 130, it is judged whether or not lighting of the auxiliary light is performed during the integration of the CCD image sensor FLM, by judging the auxiliary light mode flag ALMF and the low contrast search inhibit flag LSIF. If the auxiliary light mode flag ALMF is "1" and the low contrast search inhibit flag LSIF is "0", or if lighting of the auxiliary light is performed during the integration of the CCD image sensor FLM, the program flow goes to the step 131.

Figure 3A:
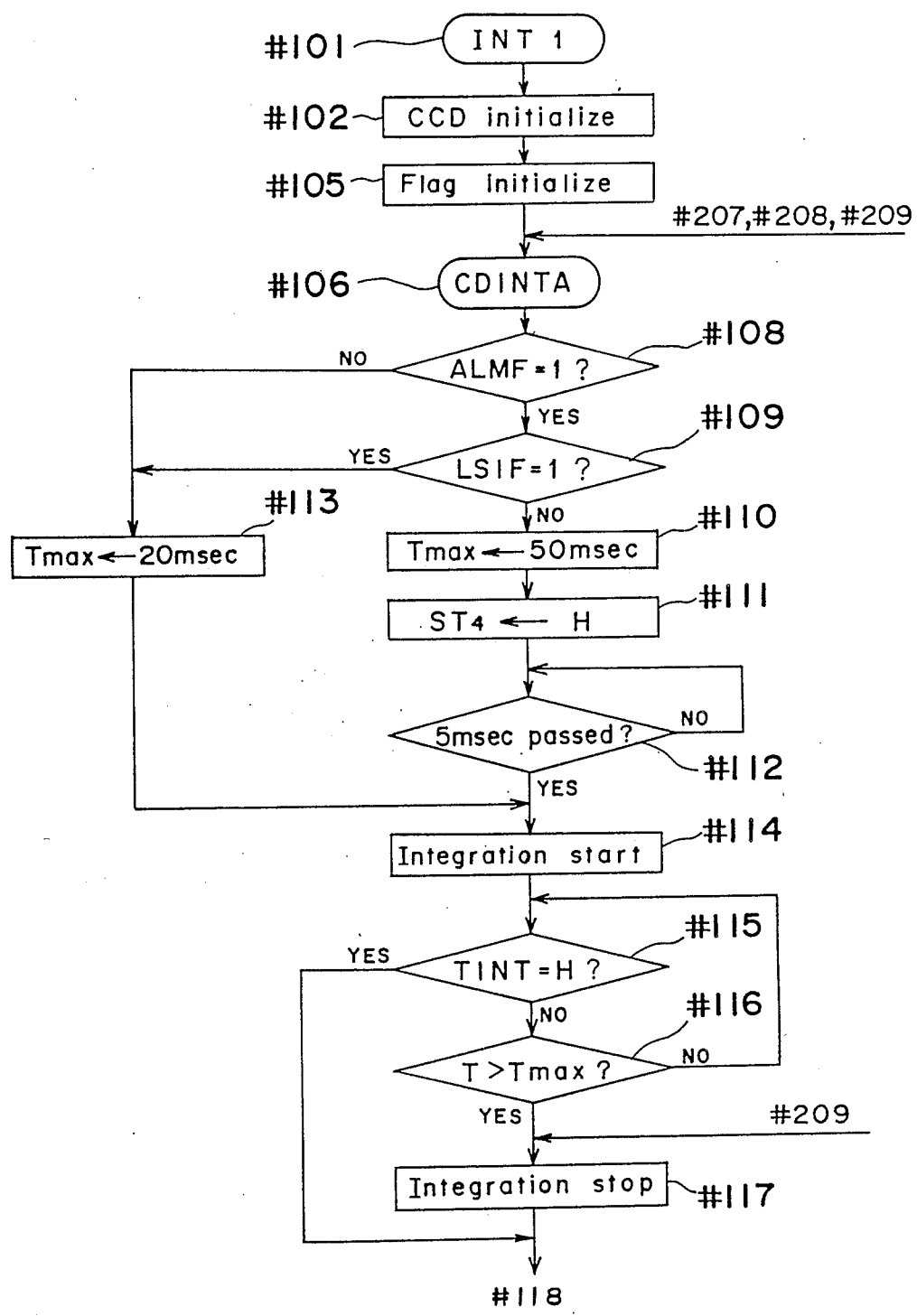
Figure 3B:
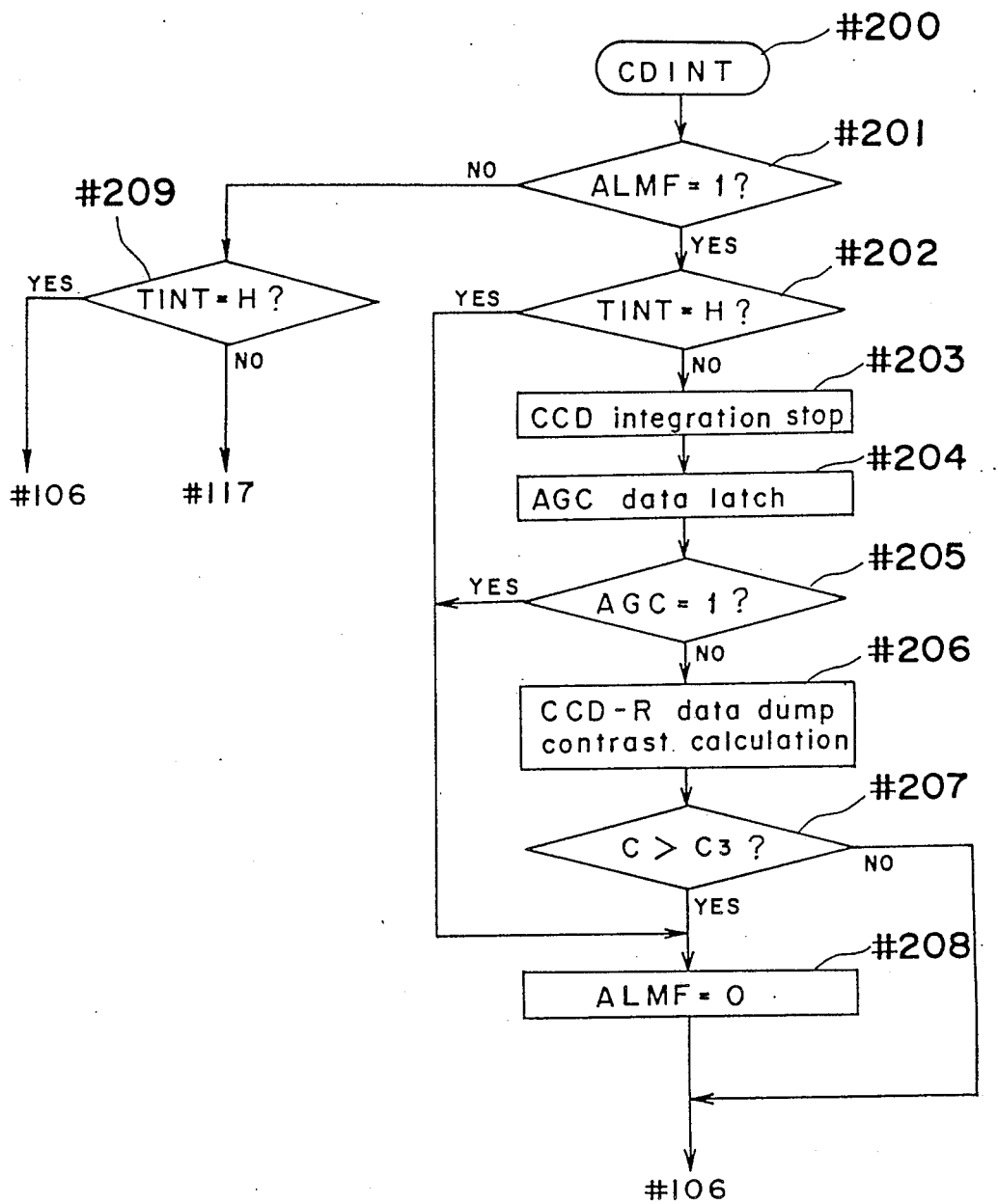
Figure 3C:
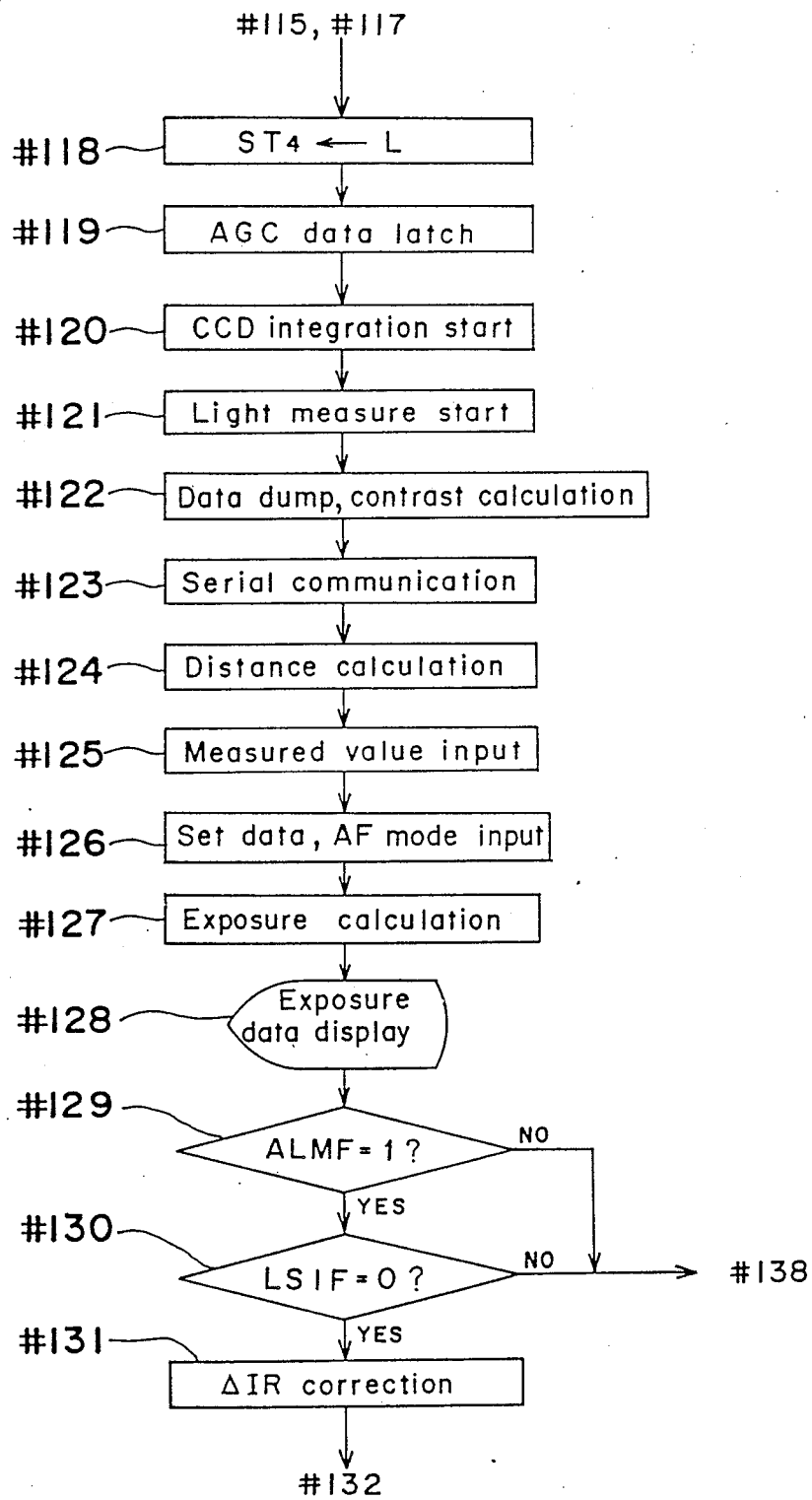
Figure 3D:
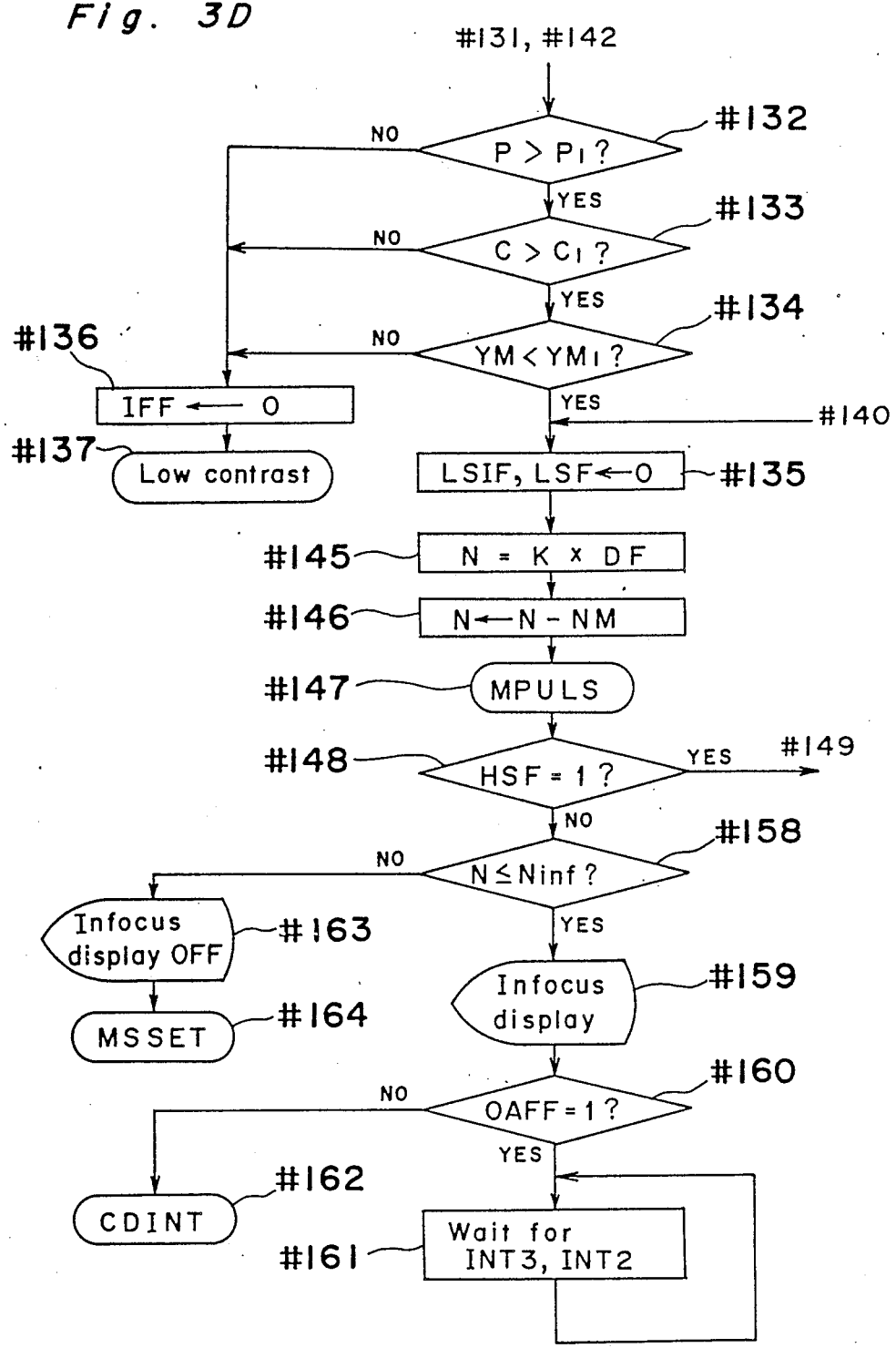

At the step 131, the correction of the infrared rays correction quantity $\Delta IR$ is performed, and then, at the next steps 132 to 134 shown in FIG. 3D, the reliability of the measured distance is checked. That is, it is judged whether or not the pixel peak value P is larger than a predetermined threshold value P1 at the step 132, it is judged whether or not the contrast value C is larger than a predetermined threshold value C1 at the step 133, and it is judged whether or not the correlation level value YM of the equation (6) is smaller than a predetermined threshold value YM1.

Larger the pixel peak value P and the contrast value C become, or smaller the correlation level value YM becomes, the reliability of the measured distance becomes higher. Therefore, if P>P1, C>C1, and YM<YM1, it is judged that the measured distance has a high reliability, then, the program flow goes to the step 135. At the step 135, the low contrast search inhibit flag LSIF and a flag LSF designating a detecting times of the extreme position of the photograph lens are reset into "0". On the other hand, when P≦P1, C≦C1, or YM≧YM1, it is judged that the reliability of the measured distance is low, and then, the program flow goes to the step 136. After the infocus flag IFF is reset into "0" at the step 136, the program flow goes to the step 137 of the low contrast process routine in the case when the distance can not be measured.

Figure 3E:
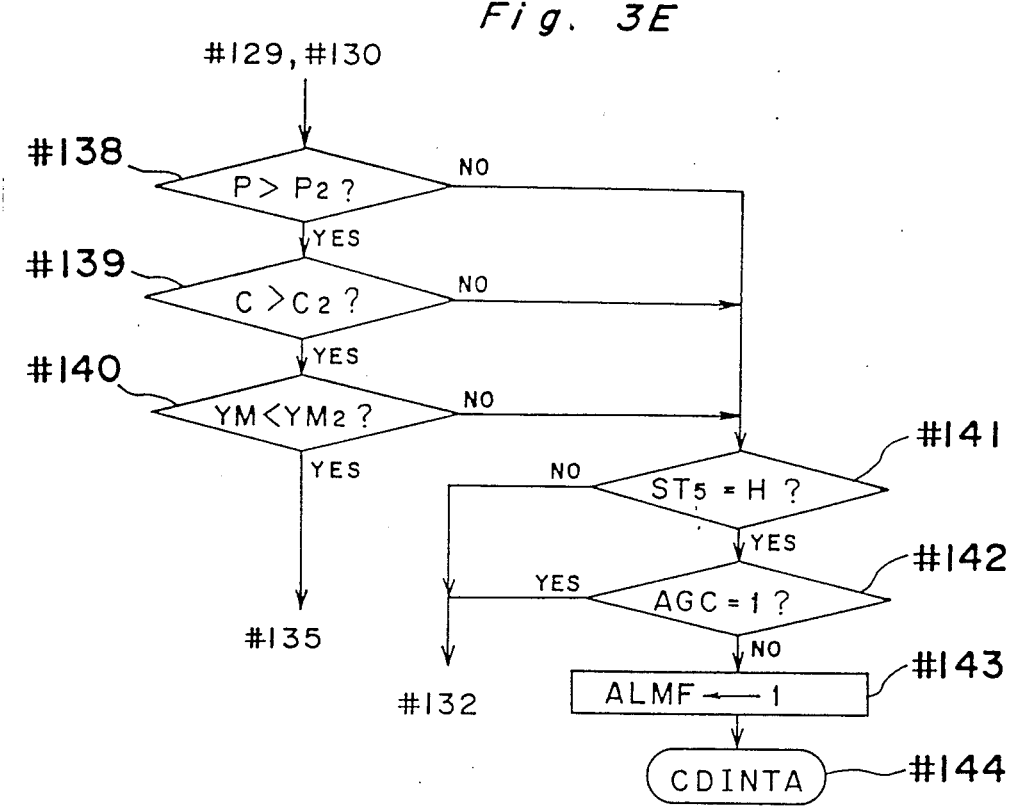

On the other hand, if it is detected that lighting of the auxiliary light is not performed during the integration of the CCD image sensor FLM at the step 129 or 130, the program flow goes to the step 138 shown in FIG. 3E, it is judged whether or not the pixel peak value P is larger than a predetermined threshold value P2. Moreover, at the step 139, it is judged whether or not the contrast value C is larger than a predetermined threshold value C2, and at the step 140, it is judged whether or not the correlation level value YM is smaller than a predetermined threshold value YM2. If P>P2, C>C2, and YM<YM2, it is judged that the reliability of the measured distance is high, and then, the program flow goes to the step 135 shown in FIG. 3D. On the other hand, if P≦P2, C≦C2, or YM≧YM2, it is judged that the reliability of the measured distance is low, and then, the program flow goes to the step 141. At the step 141, it is judged whether or not the auxiliary light mount signal ST5 is high, that is, whether or not the auxiliary light device AL is mounted. If the auxiliary light device AL is mounted, the program flow goes to the step 142, it is judged whether or not the amplification factor output from the AGC controller IF2 is "1". If the the amplification factor is not "1", or the amplification factor is "2", "4", or "8", it is judged that the object is in a dark condition, and then, at the step 143, "1" is set in the auxiliary light mode flag ALMF, and the program flow goes to the step 144 of an integration routine CDINTA starting from the step 106 shown in FIG. 3A.

On the other hand, if the auxiliary light mount signal ST5 is low at the step 141, or if the amplification factor is "1", the program flow goes to the aforementioned step 132, and then, the judgment of the pixel peak value P, the contrast value C, and the correlation level value YM are performed.

The aforementioned threshold values P1, C1, YM1, P2, C2, and YM2 are arranged so that P1<P2, C1<C2, and YM1>YM2, resulting in that the reliability of the measured distance at the steps 138, 139 and 140 is judged more severely than the judgment of the reliability of the measured distance at the steps 132, 133 and 134. When the auxiliary light is not turned on during the integration of the CCD image sensor FLM, larger reference threshold levels (at the steps 138 to 140) are arranged than the reference threshold levels at the steps 132 to 134. If the judged values are not satisfied with the larger reference threshold levels, the program flow goes to the auxiliary light mode routine starting from the step 141. At the auxiliary light mode, if the auxiliary light device is not mounted or the reliability of the measured distance is low even though the object is in an enough bright condition, the program flow goes to the steps 132 to 134 because the auxiliary light can not be turned on, and the reliability of the measured distance having one step lower reference threshold levels is judged again. Therefore, when the auxiliary light device AL is mounted, the reference threshold levels for the judgment of the reliability of the measured distance with daylight is raised, resulting in that the auxiliary light can be turned on properly without measuring the distance at a low reliability. On the other hand, when the auxiliary light is turned on during the integration of the CCD image sensor FLM, or when the auxiliary light can not be turned on, the reference threshold levels of the reliability is reduced, resulting in that the reliability of the operation of the distance measurement can be raised for various kinds of objects.

In the above preferred embodiment, the auxiliary light mode is judged at the steps 129, 130, 138, 140, 141, and 142, wherein the judgments at the steps 138 and 139, which are the judgments of the pixel peak value P and the contrast value C, are performed in parallel with the data dump of the reference portion of the CCD image sensor FLM. Therefore, it may be judged whether or not the program flow goes to the auxiliary light mode after the step 122, because the pixel peak value P and the contrast value C can be obtained at the step 122. In this case, the flow chart of steps 121 to 123 may be replaced to a flow chart shown in FIG. 4.

Figure 4:
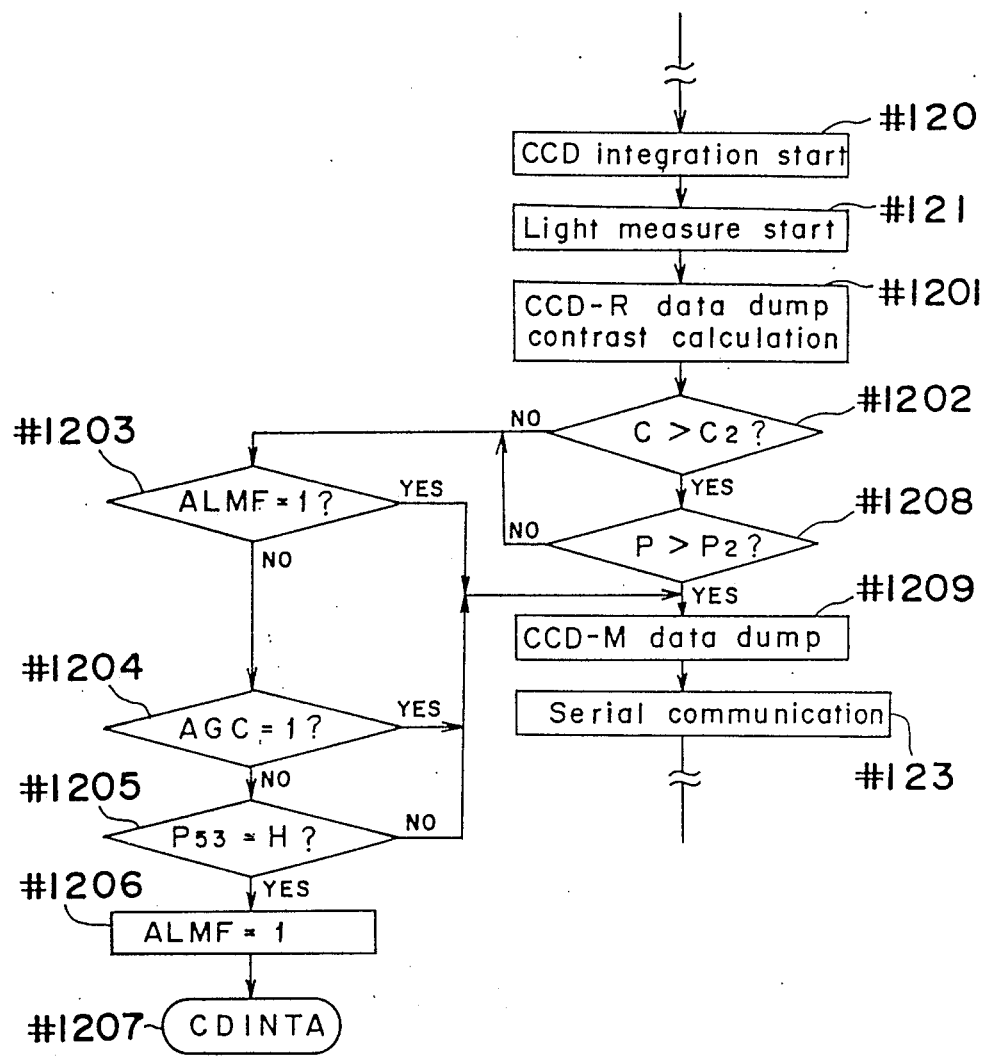
FIGS. 4 and 5 are flow charts partly showing the other modified control operations of the control circuit shown in FIGS. 2A and 2B, FIGS. 6A to 6C are flow charts showing a control operation during a low contrast searching of the control circuit shown in FIGS. 2A and 2B.

In FIG. 4, after the microcomputer MCOM starts the light measurement operation at the step 121, at the step 1201, the data dump of only reference portion of the CCD image sensor FLM is performed, and the microcomputer MCOM calculates the pixel peak value P and the contrast value C. Next, the contrast value C is compared with the aforementioned reference threshold value C2, if C>C2, the pixel peak value P is compared with the aforementioned reference threshold value P2 at the step 1208. If P>P2, the contrast value C and the pixel peak value P are satisfied with the reference threshold levels respectively, and then, the data dump of the measurement portion of the CCD image sensor FLM is performed at the step 1209, and the program flow goes to the step 123. On the other hand, if it is judged that C≦C2 at the step 1202, or if it is judged that P≦P2 at the step 1208, the program flow goes to the step 1203. If the auxiliary light mode flag ALMF is "1" at the step 1203, the program flow goes to the step 1209, on the other hand, if the auxiliary light mode flag ALMF is "0", the AGC data outputted from the AGC controller IF2 is judged at the step 1204. If the AGC data is "1", it is judged that the object is in an enough bright condition, and then, the program flow goes to the step 1209. On the other hand, the AGC data is not "1", the program flow goes to the step 1205, the auxiliary light mount signal ST5 is judged. If the auxiliary light mount signal ST5 is low, or the auxiliary light device AL is not mounted, the program flow goes to the step 1209, on the other hand, if the auxiliary light mount signal ST5 is high, or the auxiliary light device AL is mounted, the program flow goes to the step 1206. Then, "1" is set in the auxiliary light mode flag ALMF at the step 1206, and the program flow goes to the integration routine CDINTA starting from the step 1207 shown in FIG. 3A.

That is, if the auxiliary light mode is not arranged, or if C≦C2 or P≦P2 and the AGC data is not "1", and if the auxiliary light device AL is mounted, the auxiliary light mode is arranged and the program flow goes to the next integration routine. Thus, at the end of data dump of the reference portion of the CCD image sensor FLM, it may be judged by the pixel peak value P, the contrast C, and the AGC data whether or not the auxiliary light mode is to be selected.

Figure 5:
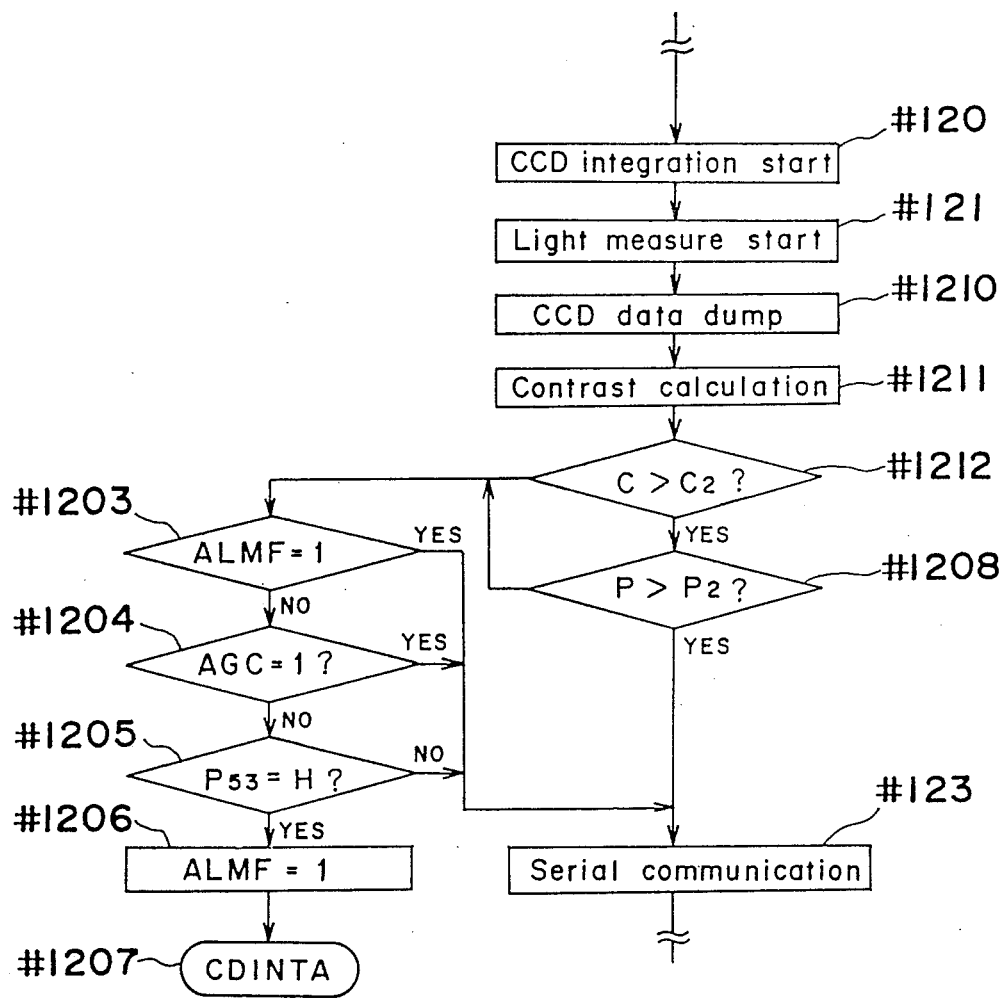

In the preferred embodiment, the contrast value C is calculated in parallel with the data dump of the reference portion of the CCD image sensor FLM, however, the contrast value C may be calculated after the data dump of the reference portion of the CCD image sensor PLM. That is, as shown in FIG. 5, the data dump of the CCD image sensor FLM is performed at the step 1210, and the contrast value C is calculated at the step 1211, and then, it may be judged by the contrast C, the pixel peak value P, the auxiliary light mode flag ALMF, the AGC data, and the auxiliary light mount signal ST5, whether or not the program flow enters the auxiliary light mode, as well as the flow chart of FIG. 4.

When it is judged that the reliability of the measured distance is high at the aforementioned routine, the program flow goes from the step 135 to the step 145 shown in FIG. 3D. At the step 145, the microcomputer MCOM calculates the encoder pulse count number N from the conversion factor K and the defocus value DF calculated at the step 124, and then, the program flow goes to the step 146. The encoder pulse count number N must be corrected, because the defocus value DF at the step 124 is calculated in accordance with the data representing the picture information during the integration period at steps 114 to 117. Therefore, the rotation number NM of the motor MO1 from the center timing of the integration period to the step 145, when the encoder pulse count number N is calculated, is subtracted from the calculated encoder pulse count number N, the subtracted value is newly set as the encoder pulse count number N at the step 146, wherein "0" is set as the rotation number of the motor M01 when the motor MO1 stops.

As described above, the encoder pulse count number N for driving the motor M01 to the infocus position of the photograph lens can be obtained, and then, the program flow goes to a motor control routine MPULS starting from the step 147.

Figure 3F:
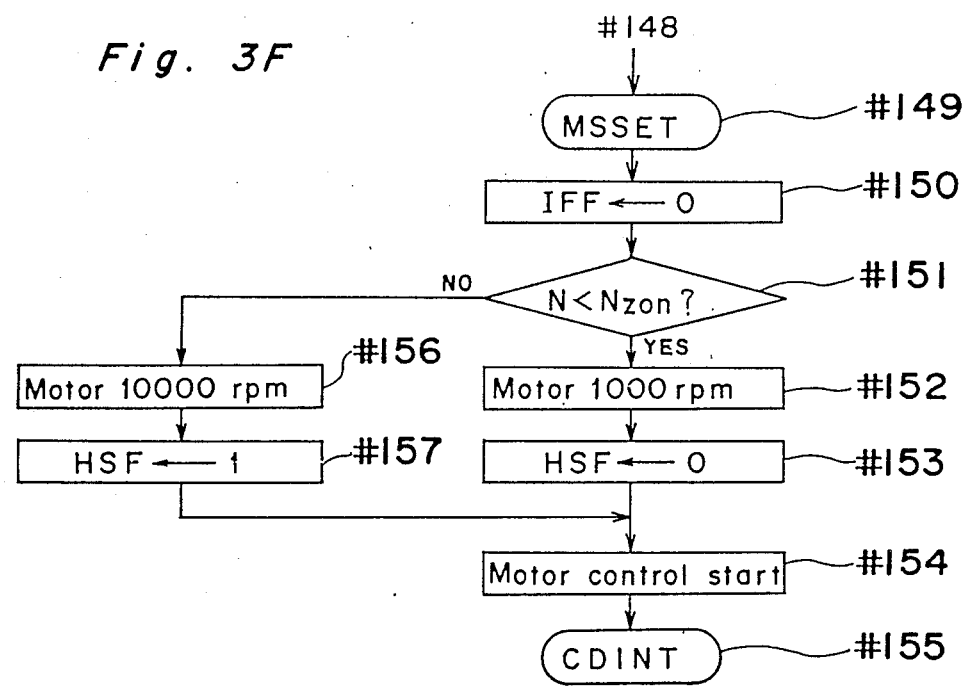

At the step 148, it is judged whether or not a high speed flag HSF is "1", if HSF is "1", or the motor MO1 rotates at a high speed of 10,000 rpm, the program flow goes to a motor control routine MSSET starting from the step 149 shown in FIG. 3F, and then, "0" is set in the infocus flag IFF. At the next step 151, the calculated encoder pulse count number N at the step 146 is compared with a predetermined near zone pulse count number Nzon, wherein the near zone count number Nzon is provided for judging the switching of the rotation speed of the motor M01. If the photograph lens is near to the infocus position, or the encoder pulse count number N is smaller than the near zone pulse count number Nzon, the rotation speed of the motor MO1 is set at a low speed of 1,000 rpm at the step 152. By the above control, the motor MO1 is correctly controlled without the photograph lens's overrunning the infocus position. After the step 152, the program flow goes to the step 153, the high speed flag HSF is set "0", and then, the control of the motor MO1 starts at the step 154, and the the program flow goes to the integration routine CDINT starting from the step 200 shown in FIG. 3B.

On the other hand, at the step 151, if the encoder pulse count number N is equal to or larger than the near zone pulse count number Nzon, the program flow goes to the step 156, the rotation speed of the motor MO1 is set at a high speed of 10,000 rpm. Then, after "1" is set in the high speed flag HSF at the step 157, the program flow goes to the step 154.

On the other hand, if the high speed flag HSF is "0" at the step 148 shown in FIG. 3D, or the motor MO1 rotates at a low speed of 1,000 rpm or the motor MO1 stops, the program flow goes to the step 158, the encoder pulse count number N calculated at the step 146 is compared with an infocus pulse count number Ninf designating a range of a predetermined infocus condition. If the encoder pulse count number N is equal to or smaller than the infocus pulse count number Ninf, it can be judged that the photograph lens is positioned at the infocus position, and then, the infocus condition is displayed at the step 159. Moreover, it is judged whether or not a one shot AF flag OAFF is "1" at the step 160, wherein "1" is set in the one shot AF flag OAFF when the photograph lens is positioned in an infocus position and the driving of the photograph lens is locked. If the one shot AF flag OAFF is "1" at the step 160, the program flow goes to the step 161, the microcomputer MCOM waits for the interrupt signal inputted into the interrupt terminal INT2 or INT3. As described above, when the motor M01 rotates at a low speed and the encoder pulse count number N calculated from the measured distance is equal or smaller than the infocus pulse count number Ninf, the motor M01 is driven until the encoder pulse count number N outputted from the encoder pulse generator ENC becomes Ninf without the distance measurement again, and the photograph lens is positioned and locked at an infocus position.

At the step 160, if the one shot AF flag OAFF is "0", or the continuous AF mode during the automatic focus operation is arranged, the program flow goes to the routine CDINT starting from the step 200 shown in FIG. 3B. On the other hand, if the encoder pulse count number N is larger than the infocus pulse count number Ninf at the step 158, the program flow goes to the step 163, the display of the infocus condition is turned off, and then, the program flow goes to the motor speed control routine MSSET starting from the step 149 shown in FIG. 3F.

As described above, the integration of the the CCD image sensor FLM and lighting of the auxiliary light are performed not only when the motor M01 stops but also when the motor M01 rotates, resulting in that the automatic focus operation is performed at a higher speed than the camera of the prior art.

Furthermore, the distance measurement routine CDINT starting from the step 200 shown in FIG. 3B will be described below in details. In the distance measurement routine CDINT, "a preliminary integration" and monitoring of the peripheral light during the auxiliary light mode described below in details are performed.

First of all, "the preliminary integration" and monitoring of the outside light during the auxiliary light mode are described below in details referring to FIG. 8. FIG. 8 shows a timing chart of the integration, lighting of the auxiliary light, the data dump from the CCD image sensor FLM, as well as the contrast value calculation, the distance calculation, the AF control, the automatic exposure (referred to hereinafter as AE) calculation and the latch of the AGC data from the AGC controller IF2, performed in parallel therewith, wherein each of the operations is performed when each of the signals is high level respectively.

In FIG. 8, TA denotes a period of the auxiliary light mode, and the steps 108 to 118 are performed during the auxiliary light mode as described above. That is, first of all, lighting of the auxiliary light starts at a time t1, and an integration TI1 of the CCD image sensor FLM starts at a time t2 after the passage of 5 msec from the time t1. The integration TI1 stops at a time t3 from the passage of the aforementioned integration time from the time t2, the integration time being shorter than 50 msec. Then, the auxiliary light is turned off and the microcomputer MCOM latches the AGC data (AGC1) from the AGC controller IF2. Immediately after the latch of the AGC data (AGC1), an integration TI2 of the CCD image sensor FLM starts and the light measurement starts at a time t4. In parallel with the light measurement operation, the data dump DUM1 of the CCD image sensor FLM obtained at the integration TI1 is performed and the contrast value C is calculated. At a time t5 corresponding to the end timing of the data dump and the calculation of the contrast value C, the process DFC1 including the distance calculation, the AF control and the AE calculation starts.

As described above, an error of the light measurement due to the lighting of the auxiliary light is not caused, because the light measurement starts at the time t4 after the time t3 when the auxiliary light is turned off. Then, the aforementioned integration TI2 stops, at a time t6 corresponding to the end of the distance measurement, the AF control, and the AE calculation of the process DFC1. That is, after the stop of the integration TI1, the next integration TI2 starts, performing in parallel with the data dump of the CCD image sensor FLM of the pixel data obtained at the previous integration TI1 and the calculation of the contrast value C (DUM1), the distance measurement, the AF control, and the AE calculation (DFC1), and then, the integration TI2 stops at the time t6 corresponding to the end of the processings DUM1 and DFC1.

As described above, a control process is referred to as the preliminary integration which is the process that the next integration starts and processing of the integrated pixel data obtained at the previous integration is performed in parallel with the next integration after the integration of the CCD image sensor FLM. The efficiency of the integration of the CCD image sensor FLM can be raised and also the automatic focus operation is performed at a higher speed than the camera of the prior art, because the cycle time of the distance measurement is shortened.

In the preferred embodiment, it takes a constant time of approximately 20 msec for the AF control operation from the end of the first integration to the beginning of the next integration for the AF control operation, resulting in that it takes approximately 20 msec to perform the preliminary integration TI2. It is apparent from the flow chart of FIG. 3 that the auxiliary light is turned off during the preliminary integration. That is, at the preliminary integration TI2, the integration is performed on the condition that the auxiliary light is not turned off, and the real brightness and the real contrast value C of the object itself can be obtained on the condition that the auxiliary light is not turned off by detecting the AGC data (AGC2) and the contrast value C during the preliminary integration.

Furthermore, the distance calculation is not performed, and the latch of the AGC data and the data dump of the CCD image sensor FLM are performed, at the preliminary integration during the auxiliary light mode. Therefore, the data dump of both of the reference portion and the measurement portion of the CCD image sensor FLM is not required. In the preferred embodiment, the data dump of only the reference portion of the CCD image sensor FLM is performed, resulting in that it takes approximately half time of the normal data dump DUM1 of the CCD image sensor FLM to perform the data dump DUM2 at the preliminary integration during the auxiliary light mode. Furthermore, the brightness and the contrast value C of the object can be quickly obtained because the contrast value C is calculated in parallel with the data dump DUM2, and also the judgment can be quickly performed whether the next integration must be performed with daylight or the auxiliary light.

In the preferred embodiment, if the object is in a bright condition, or if the AGC data is "1" and if the contrast value C is larger than a predetermined value C3, the auxiliary light mode is canceled. On the other hand, if the AGC data is "2", "4", or "8", or if the contrast value C is equal to or smaller than the predetermined threshold value C3, the auxiliary light mode is maintained and the auxiliary light is turned on at the next cycle. The predetermined threshold value C3 and its meanings will be described below in details. In the integration TI3 of FIG. 8, the auxiliary light mode is maintained by the AGC data (AGC2) and the contrast value C (DUM2), at the preliminary integration TI2, and the integration TI3 is performed with lighting of the auxiliary light.

Furthermore, the operation after the auxiliary light mode is canceled will be described above in details.

If the AGC data AGC3 at the preliminary integration TI4 is "1" or if the contrast value C calculated at DUM3 is larger than the predetermined threshold value C3, the auxiliary light mode is canceled, and the auxiliary light is not turned on during the next integration TI5. In FIG. 8, TB denotes a period when the auxiliary light mode is not arranged, in this case, the data dump (DUM4) of all the data of the the CCD image sensor FLM during the preliminary integration TI6 is performed, and the distance calculation, the AF control, and the AE calculation (DFC2) are performed.

In FIG. 8, TC denotes a period when the brightness of the object is larger than the brightness of the object during the periods TA and TB. The integration of the CCD image sensor FLM is stopped by the AGC controller IF2 before the integration time reaches the maximum integration time. That is, the processing time of the integration is shorter than 20 msec, and a preliminary integration TI7 stops before the process DFC2 corresponding the calculation of the data obtained at the integration TI6. The data of the preliminary integration TI7 is neglected, and the next integration TI8 starts after the process DFC2.

Referring back to FIG. 3B, the distance measurement routine CDINT will be described below in details, wherein the aforementioned preliminary integration and the judgment during the auxiliary light mode are performed.

First of all, at the step 201, it is judged whether or not the auxiliary light mode flag ALMF is "1", if the auxiliary light mode flag ALMF is "1", or the auxiliary light mode is arranged, the program flow goes to the step 202, it is judged whether or not the integration stop signal TINT is high. If the integration stop signal TINT is high, the program flow directly goes to the step 208, "0" is set in the auxiliary light mode flag ALMF, and then, the program flow goes to the integration routine CDINTA starting from the step 106. That is, when it is judged that the integration stops within 20 msec for the previous integration process and the object is in an enough bright condition, the auxiliary light mode flag ALMF is reset and the auxiliary light mode is canceled.

On the other hand, if the integration stop signal TINT is low at the step 202, the integration of the CCD image sensor FLM is stopped at the step 203, and then, the AGC data is latched at the step 204. Moreover, at the step 205, it is judged whether or not the AGC data is "1". If the object is in a bright condition, or the AGC data is "1", the program flow goes to the step 208, on the other hand, if the AGC data is not "1", the program flow goes to the step 206, the contrast value C is calculated in parallel with the data dump of the reference portion of the CCD image sensor FLM. Then, it is judged whether or not the contrast value C is larger than the predetermined threshold C3 at the step 207. If the contrast value C is larger than C3, it is judged that the object itself has an enough contrast, the auxiliary light mode flag ALMF is reset at the step 208. On the other hand, if the contrast value C is equal to or smaller than C3, it is judged that the auxiliary light mode is to be maintained, the program flow goes to the integration routine starting from the step 106.

The aforementioned threshold value C3 is predetermined so that C3>C2, wherein C2 is the threshold value used at the aforementioned step 139. That is, the condition for entering the auxiliary light mode is arranged more severely than the condition for going out from the auxiliary light mode, resulting in that the auxiliary light mode can not be cleared for a slightly change of the contrast value C once the auxiliary light mode is selected. Therefore, it can be prevented that the distance measurement is performed unstably because the auxiliary light mode is selected and not selected repeatedly causing a difference between the measured distance during lighting of the auxiliary light and the measured distance with daylight.

Thus, at the preliminary integration during the auxiliary light mode, the auxiliary light is not turned on, the integration of the CCD image sensor FLM is performed with daylight, and the latch of the AGC data, the data dump of the reference portion of the CCD image sensor FLM and the calculation of the contrast value C are performed. The brightness and the contrast of the object are judged from the latched AGC data and the calculated contrast value, and it is judged whether or not the auxiliary light mode is to be continued.

As described above, at the preliminary integration during the auxiliary light mode, the auxiliary light is not turned on, the auxiliary light mode is judged only by the AGC data and the contrast value C, and the calculation of the distance is not performed. Therefore, the brightness and the contrast of the object can be judged for a short time, and it can be judged quickly whether or not the auxiliary light is to be turned on for a change of the brightness and the contrast of the object.

If it is judged that the object is in a bright condition at the step 205, or if it is judged that the object has an enough contrast at the step 207, the distance may be calculated by the data of the preliminary integration, because the possibility for performing the distance measurement with daylight is high. That is, if the AGC data is "1" at the step 205, the auxiliary light mode may be canceled, and the program flow may go to the step 120. On the other hand, if C>C3 at the step 207, the auxiliary light mode may be canceled and the program flow may go to the step 122 to perform the data dump of the measurement portion of the CCD image sensor FLM because the data dump of the reference portion of the CCD image sensor FLM is completed, and then, the program flow may go to the step 123.

Figure 6A:
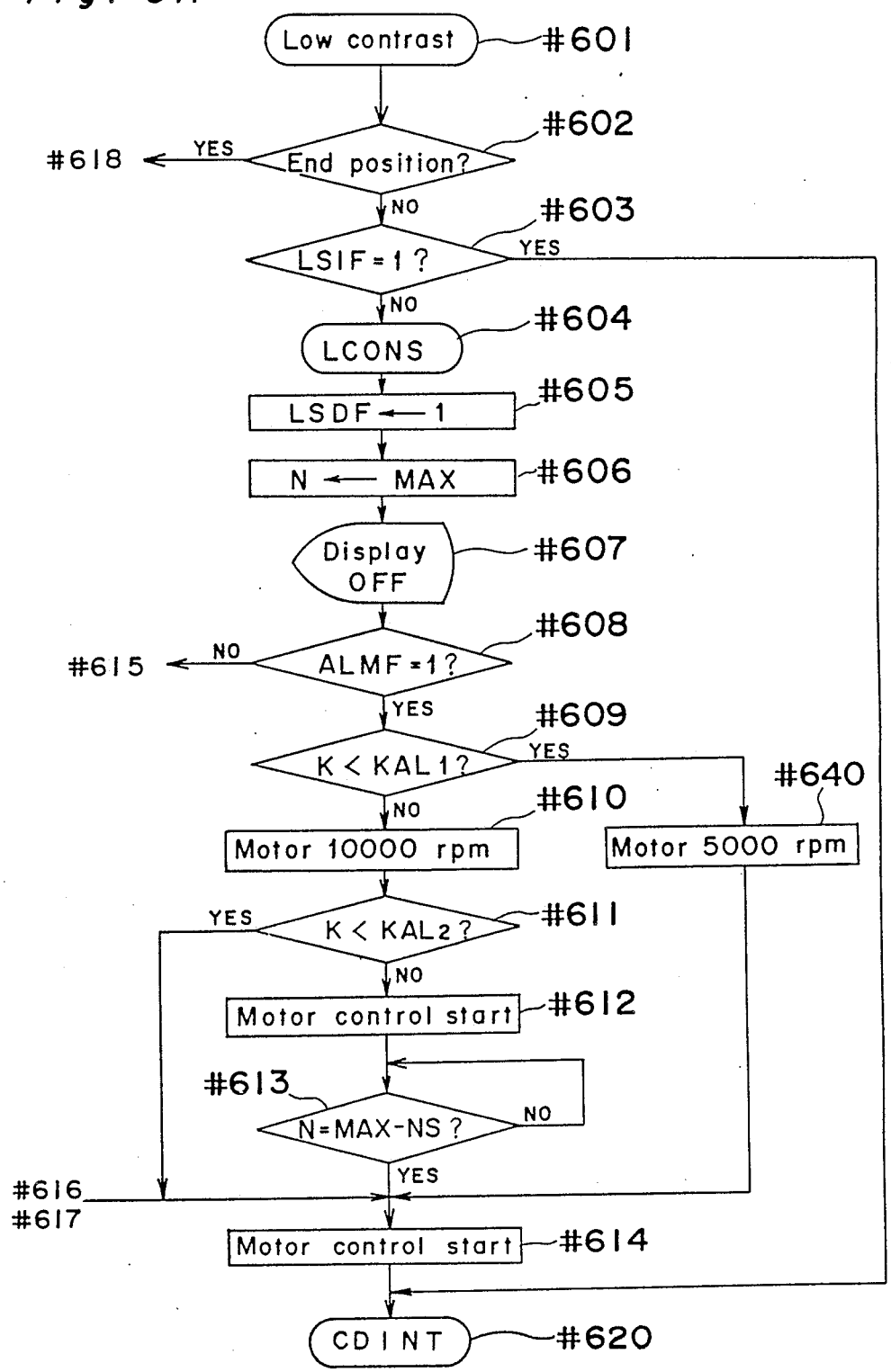
Figure 6B:
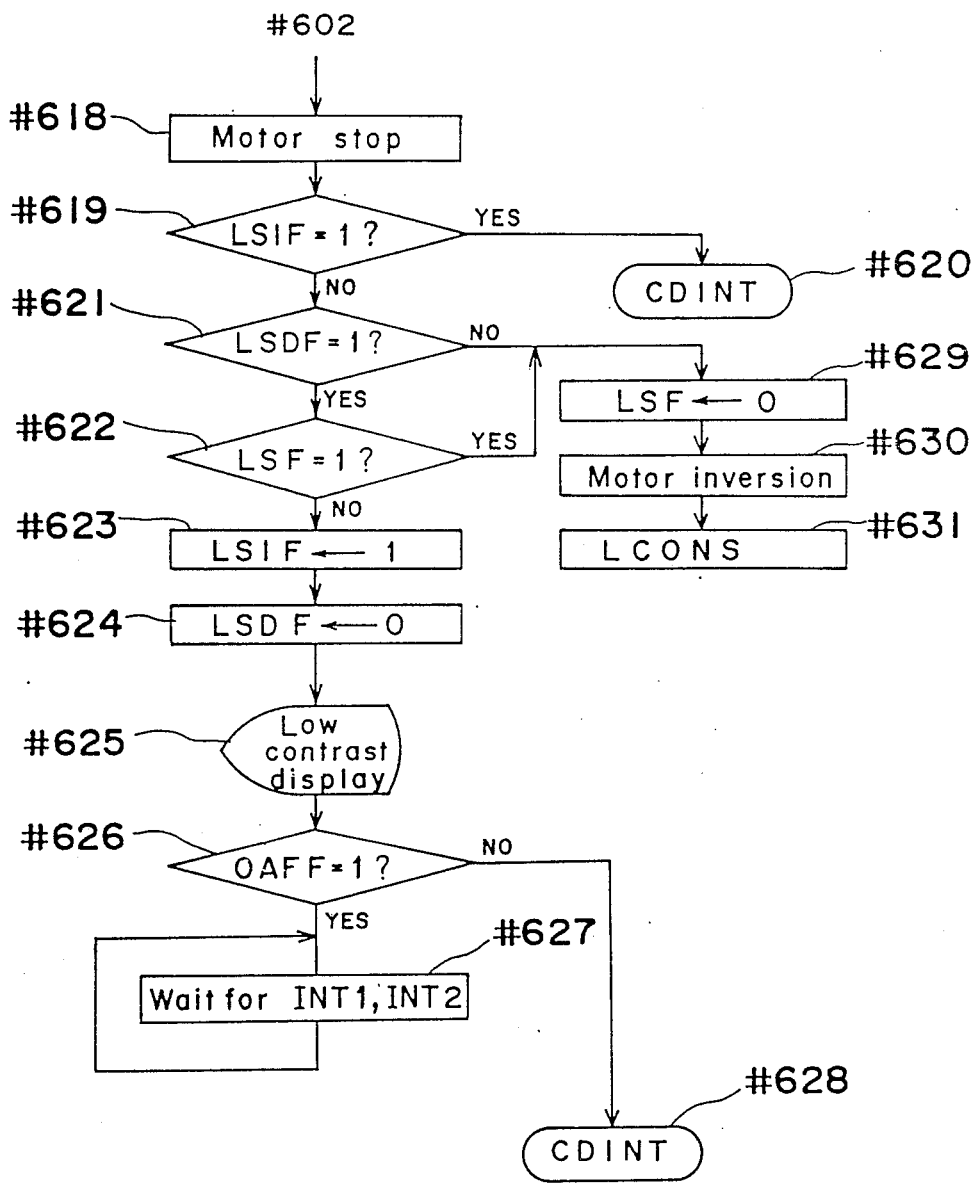
Figure 6C:
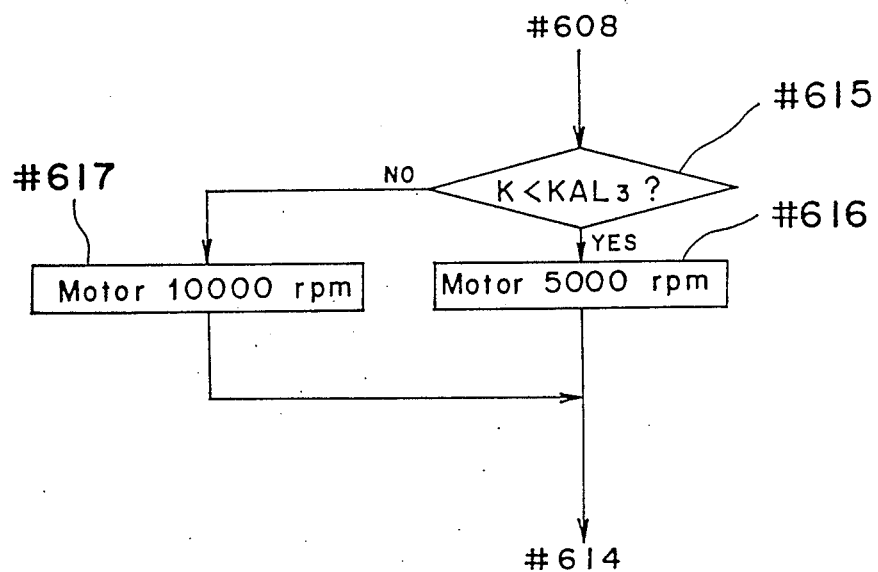

At the steps 132 to 134, if it is judged that the object is in a low contrast condition, or if it is judged that the distance can not be measured because the reliability of the measured distance is low, the program flow goes to a low contrast process routine shown in FIGS. 6A to 6C.

In FIGS. 6A to 6C, first of all, at the step 602, it is judged whether the photograph lens is positioned at the extreme position of the infinity photographing position or the nearest photographing position to the object, and the judgment is referred to hereinafter as the the extreme position detection. The extreme position detection is judged by detecting whether or not the encoder pulse outputted in accordance with the movement of the photograph lens is outputted within a predetermined constant time. If the photograph lens is not positioned at the extreme position, the program flow goes to the step 603, it is judged whether or not the low contrast search inhibit flag LSIF is "1". If the low contrast search is inhibited, or the flag LSIF is "1", the program flow goes to the aforementioned distance measurement routine CDINT starting from the step 620, on the other hand, if the low contrast search is permitted, or the flag LSIF is not "1", the program flow goes to the low contrast process routine LCONS starting from the step 604.

In the low contrast process routine LCONS, the program flow goes from the step 604 to the step 605, "1" is set in a low contrast searching flag LSDF, and then, the maximum value MAX is set in the encoder pulse count number N, wherein the maximum value MAX is a maximum value which can be set in the encoder pulse counter, such as FFFF in hexadecimal.

At the next step 607, the display is turned off, and then, it is judged whether or not the auxiliary light mode flag ALMF is "1" at the step 608. If the auxiliary light mode flag ALMF is "1", the program flow goes to the step 609. At the steps 609 to 613, switching of the rotation speed of the motor M01 and switching of the cycle of the distance measurement during the auxiliary light mode are performed by judging the conversion factor K for converting the defocus value DF to the rotation quantity of the motor M01, and the switching control will be described below in details referring to FIGS. 9A to 9C.

Figure 9A:
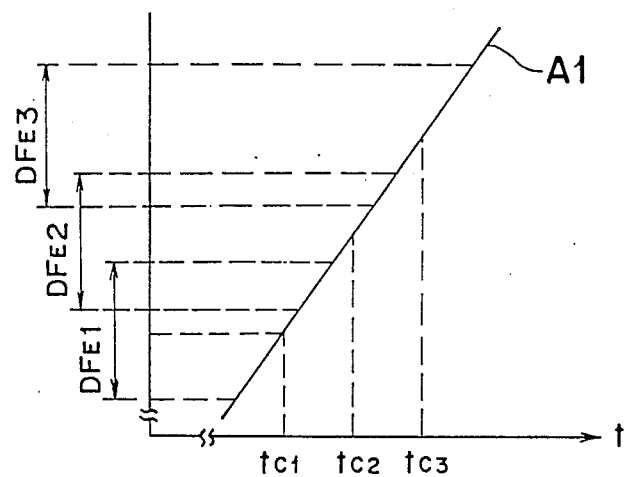
Figure 9B:
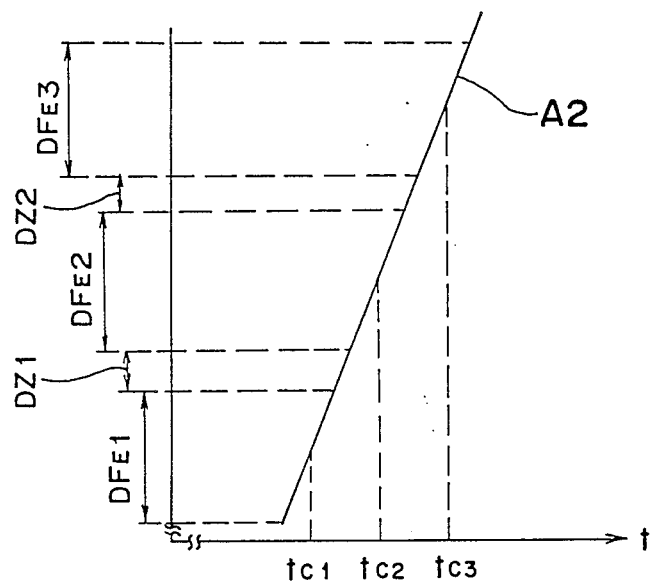
Figure 9C:
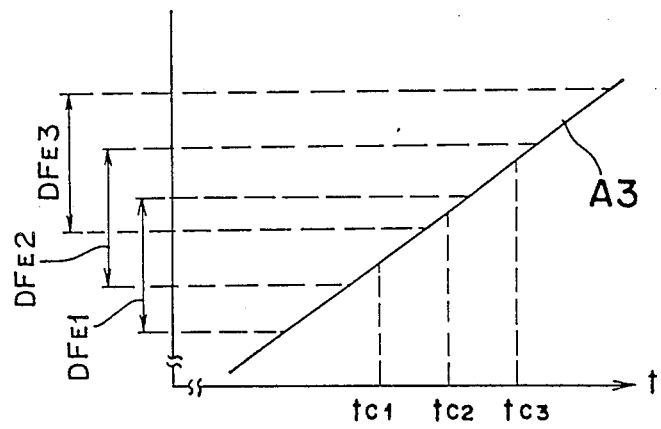
Figure 10:
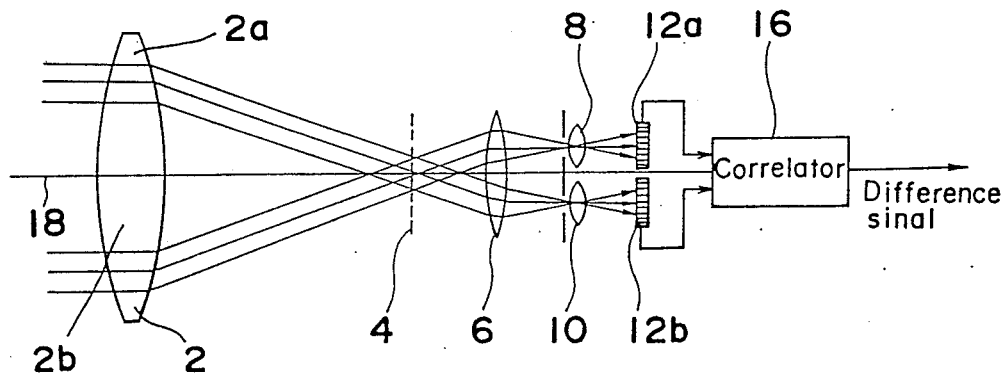
FIGS. 10 and 11 are schematic diagrams showing a principle of focus condition detection.

FIG. 9A shows a characteristic of the movement of a position of the photograph lens to time t with respect to the defocus cover range when the low contrast search is performed properly. The distance measurement is performed at time tc1, tc2 and tc3. The change of the position of the photograph lens can be determined by the aforementioned conversion factor K on the condition of a constant rotation speed of the motor M01, and the position linearly varies for time t as shown in a direct line A1 of FIG. A1. In FIGS. 9A to 9C, the distance can be measured in the range DFE1 at the time tc1, the distance can be measured in the range DFE2 at the time tc2, and the distance can be measured in the range DFE3 at the time tc3, wherein the ranges DFE1, DFE2, and DFE3 are the defocus cover range of the defocus value DF determined by the equation (3). It is apparent from FIG. 9A, since the ranges DPE1 and DFE2 and the ranges DFE2 and DPE3 are respectively overlapped, the distance can be properly measured by one of the ranges, even though the object is at any corresponding position.

FIG. 9B shows a characteristic of the movement of a position of the photograph lens for time t when the conversion factor K is smaller than K of the case of FIG. 9A. As shown in a direct line A2 of FIG. 9B, the slope factor of the direct line A2 is larger than the slop factor of the direct line A1 of FIG. 9A, resulting in that the moving distance of the photograph lens per a unit time is longer than the moving distance in the case of FIG. 9A. Therefore, the ranges DFE1, DFE2, and DPE3 at the time tc1, tc2 and tc3 do not respectively continue, and there are two ranges DZ1 and DZ2 where the distance can not be measured. In the preferred embodiment, when the conversion factor K is small, the speed of the motor M01 is reduced, and the ranges DZ1 and DZ2 can be prevented from occurring where the distance can not be measured.

FIG. 9C shows a characteristic of the movement of a position of the photograph lens for time t when the conversion factor K is larger than K of the case of FIG. 9A. As shown in a direct line A3 of FIG. 9C, the slope factor of the direct line A3 is smaller than the slope factor of the direct line A1 of FIG. 9A, resulting in that the moving distance of the photograph lens per a unit time is shorter than the moving distance in the case of FIG. 9A. Therefore, the ranges DFE1, DFE2 and DFE3 at the time tc1, tc2 and tc3 are overlapped each other so that the overlapped portions ar longer than the overlapped portions in FIG. 9A. That is, the range DFE2 is not required, and the distance between the camera and the object can be measured even though the distance measurement at the time tc2 is omitted. In the preferred embodiment, when the conversion factor K is larger than a predetermined value, after the photograph lens is moved by a constant distance, the next distance measurement starts, resulting in that the lighting times of the auxiliary light can be reduced without the range of the measured distance where the distance can not be measured, the power consumption of the auxiliary light can be reduced, and the dazzling times to men as the object can be reduced.

Referring back to the flow chart of FIG. 6A, the aforementioned low contrast search during the auxiliary light mode will be described below.

At the step 609, it is judged whether or not the conversion factor K is larger than a predetermined threshold value KAL1. If the conversion factor K is equal to or larger than KAL1, the program flow goes to the step 610, the rotation speed of the motor MO1 is set at a speed of 10,000 rpm, and then, the conversion factor K is compared with a predetermined threshold value KAL2 at the step 611, wherein the value KAL2 is arranged so that KAL2>KAL1. If the conversion factor K is smaller than KAL2, i.e., KAL1≦K<KAL2, and this case correspond to FIG. 9A. Then, the program flow goes to the step 614, the control of the motor MO1 starts, and the program flow goes to the distance measurement routine CDINT at the step 620. On the other hand, the conversion factor K is equal to or larger than KAL2 at the step 611, and this case corresponds to FIG. 9C. In this case, an unnecessary distance measurement may be performed, as described above. Therefore, after the control of the motor M01 starts at the step 612, at the step 613, the photograph lens is moved until the encoder pulse count number N arranged at the step 606 becomes the value (MAX-NS) from the maximum value MAX, that is, the photograph lens is moved by NS pulses, and then, the program flow goes to the step 614.

On the other hand, if the conversion factor K is smaller than KAL1 at the step 609, this case corresponds to FIG. 9B, the ranges which can not be measured may occur as described above. Therefore, the rotation speed of the motor MO1 is reduced into 5,000 rpm at the step 640, and then, the program flow goes to the step 614.

If it is judged at the step 608 that the auxiliary light mode is not arranged, the conversion factor K is compared with a predetermined threshold value KAL3 at the step 615 shown in FIG. 6C. If K<KAL3, the motor MO1 is set at a rotation speed of 5,000 rpm at the step 616, on the other hand, if K≦KAL3, the motor MO1 is set at a rotation speed of 10,000 rpm at the step 617, and then, the program flow goes from the steps 616 and 617 to the step 614.

The predetermined threshold value KAL3 is arranged so that KAL3<KAL1. Because the period time of the auxiliary light mode is longer than the cycle of the distance measurement with daylight, and the conversion factor K is generally large during the distance measurement with daylight, resulting in that there is not a problem that the power consumption is raised during the distance measurement with the auxiliary light, and men of the object is dazzled by the auxiliary light. Therefore, when K≦KAL3, the motor MO1 rotates at a high speed of 10,000 rpm, and the distance measurement is repeatedly performed.

As described above, when the defocus value DF of the photograph lens for the distance between the object and the camera is too large and the defocus value DF is not within the defocus cover range, the distance measurement moving the photograph lens is repeatedly performed. The distance measurement is performed correctly and efficiently by switching the rotation speed of the motor MO1 depend upon the conversion factor K. That is, during the auxiliary light mode, even though the conversion factor K is small, the range where the distance can not be measured is not caused by driving the motor MO1 at a lower rotation speed. On the other hand, when the conversion factor K is large, the lighting times of the auxiliary light can be reduced to a minimum times, resulting in that the power consumption can be reduced and feeling for using the camera can be improved.

Next, the case will be described below when it is detected at the step 602 that the photograph lens is positioned at the extreme position.

The program flow goes from the step 602 to the step 618 shown in FIG. 6B, the motor MO1 is stopped, and then, it is judged whether or not the low contrast search inhibit flag LSIF is "1" at the step 619. If the flag LSIF is "1", or the low contrast search is inhibited, the program flow goes to the distance measurement routine CDINT of the next cycle at the step 620, on the other hand, if the flag LSIF is "0", or the low contrast search is permitted, it is judged whether or not the low contrast searching flag LSDF is "1" at the step 621. If the flag LSDF is "0", or the low contrast search starts from the extreme position of the photograph lens, "0" is set in a flag LSF designating the first extreme position detection during the low contrast search at the step 629, and then, the direction of rotation of the motor MO1 is inverted at the step 630, and the program flow goes to the low contrast search process routine LCONS at the step 631.

On the other hand, at the step 621, if the low contrast searching flag LSDF is "1" or the low contrast search process is being performed, with the photograph lens being positioned at the extreme position during the low contrast search, it is judged whether or not the aforementioned flag LSF is "1" at the step 622, if the flag LSF is "1" or this is the first extreme position detection, the program flow goes to the step 629, and then, the low contrast search is continued. On the other hand, if the flag LSF is "0", or this is the second extreme position detection, "1" is set in the low contrast inhibit flag LSIF at the step 623, and then, "0" is set in the low contrast searching flag LSDF at the step 624. Next, the display of the low contrast condition is turned on, and then, the program flow goes to the step 626, where it is judged whether or not the one shot AF flag OAFF is "1", wherein the one shot AF flag OAFF is provided for locking the photograph lens at the position and inhibiting the automatic focus operation once it is judged that the image is in an infocus position. If the one shot AF flag OAFF is "1", or the one shot AF mode is arranged, the microcomputer MCOM waits for the interrupt signal again inputted into the interrupt terminal INT1 or INT2. On the other hand, the one shot AF flag OAFF is "0", or the one shot AF mode is not arranged, the program flow goes to the distance measurement routine CDINT at the step 628.

In the preferred embodiment, at the above steps 618 to 622, if the extreme position of the photograph lens is detected twice during the low contrast search, lighting of the auxiliary light is inhibited when the low contrast search is inhibited. This process is performed for the following reason. That is, even though the distance measurement is performed with the auxiliary light after the end of the low contrast search, the possibility of detecting the focus condition is low, the power consumption is raised, and also a larger unpleasant feeling is given as men of the object. That is, if the distance can not be measured during the low contrast search, even though the extreme position detection is performed twice, the next low contrast search is inhibited and lighting of the auxiliary light is inhibited, resulting in that no meaning lighting of the auxiliary light can not be performed, and also the power consumption is reduced, feeling of using the camera can be improved.

Figure 7:
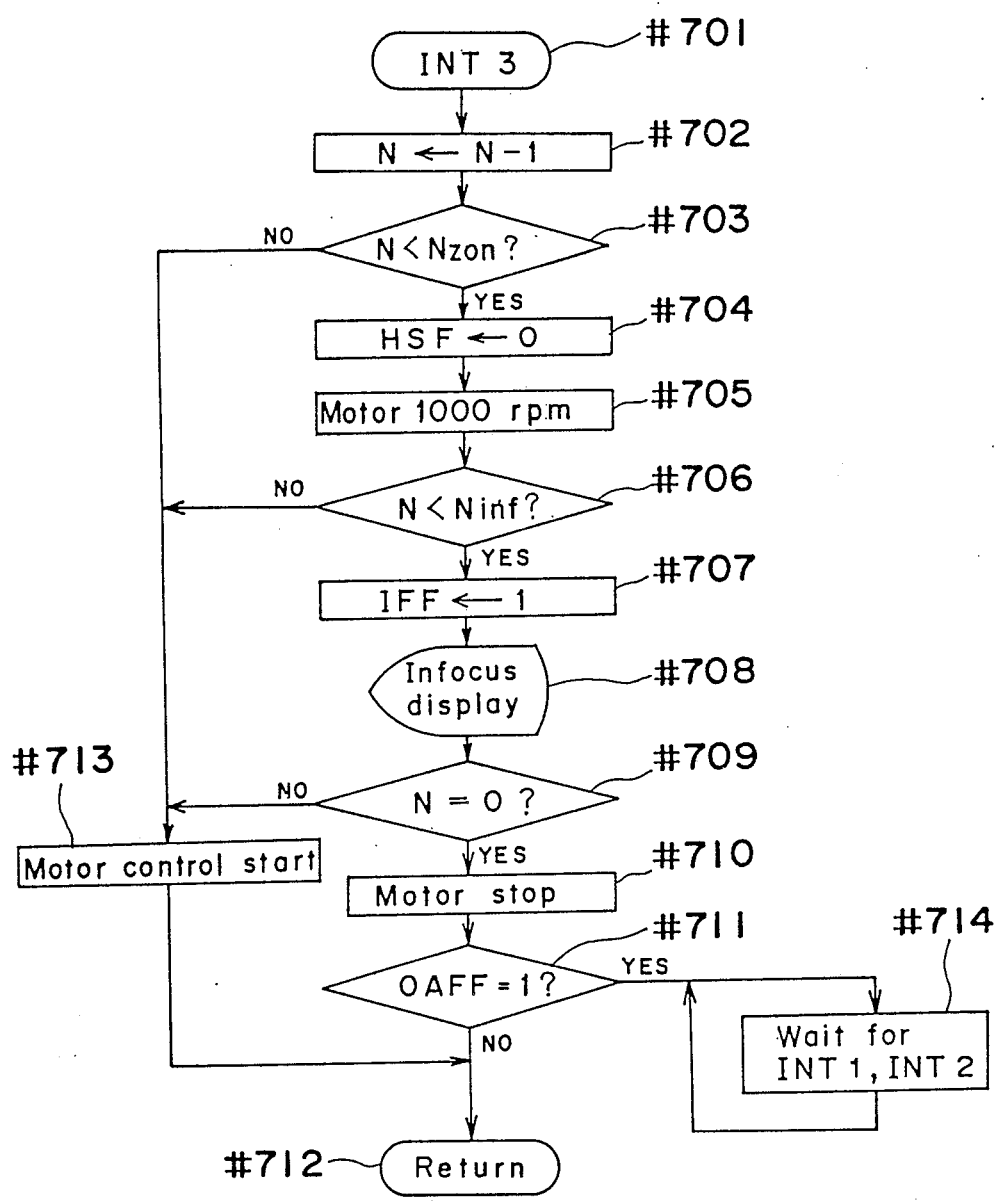
FIG. 7 is a flow chart showing a control operation of the control circuit shown in FIGS. 2A and 2B when an INT3 interruption occurs.

Next, when the rotation quantity of the motor MO1 is detected by the encoder pulse generator ENC and a predetermined pulse signal AFP is inputted into the interrupt terminal INT3 of the microcomputer MCOM, the interrupt routine INT3 is performed shown in FIG. 7.

First of all, at the step 702, 1 is subtracted from the encoder pulse count number N and the subtracted value (N−1) is newly set in the encoder pulse count number N, and then, it is judged whether or not the the encoder pulse count number N is smaller than a predetermined threshold value Nzon at the step 703. If the encoder pulse count number N is equal to or larger than Nzon, this is the case when the motor MO1 is driven at a high speed, the control of the motor MO1 starts at the step 713, and then, the program flow returns back to the main routine at the step 712. On the other hand, if the encoder pulse count number N is smaller than Nzon, the program flow goes to the step 704, "0" is set in the high speed flag HSF, and then, the motor MO1 is set at a rotation speed of 1,000 rpm. As a result, the speed of the motor MO1 can be properly controlled, and the photograph lens can be prevented from overrunning the infocus position. Moreover, it is judged whether or not the encoder pulse count number N is smaller than Ninf, if N≧Ninf at the step 706, it is judged that the photograph lens is not positioned within the infocus range, and then, the program flow goes to the step 713 to continue the driving of the motor MO1.

On the other hand, if the encoder pulse count number N is smaller than the predetermined threshold value Ninf, it is judged that the photograph lens is positioned within the infocus range, "1" is set in the infocus flag IFF at the step 707, and then, the display of the infocus condition is turned on at the step 708. When "1" is set in the infocus flag IFF, the release operation is permitted during the AF priority mode, and the release operation is inhibited when the infocus flag IFF is reset.

The program flow goes from the step 708 to the step 709, it is judged whether or not the encoder pulse count number N is "0", if N is not "0", the program flow goes to the step 713, the motor MO1 is driven at a rotation speed of 1,000 rpm. On the other hand, if the encoder pulse count number N is "0", the motor MO1 is stopped at the step 710, and then, it is judged whether or not the one shot AF flag OAFF is "1" at the step 711. If the one shot AF mode is arranged, or the flag OAFF is "1", the microcomputer MCOM waits for the interrupt signal inputted into the interrupt terminal INT or INT2 at the step 714, without performing the next distance measurement. On the other hand, if the one shot AF mode is not arranged, or the flag OAFF is "0", the program flow returns to the main routine at the step 712.

As described above, in the first preferred embodiment, the auxiliary light mode is continuously arranged after the auxiliarY light mode flag ALMF is arranged at the step 143 until the flag ALMF is reset at the step 208. That is, during the one shot AF mode, after the program flow enters the auxiliary light mode at the step 143, the distance measurement with the auxiliary light is performed until it is judged that the photograph lens is in tbe infocus range, except when the flag ALMF is canceled at the step 208.

During the continuous AF mode, the distance can be correctly measured at a quick response when the auxiliary light mode is arranged. The cancellation of the auxiliary light mode is judged by the AGC data and the contrast value at the preliminary integration, resulting in that the judgment of the auxiliary light mode can be efficiently performed without a long cycle of the distance measurement.

Moreover, in the low contrast search, the speed of the motor MO1 and the period of lighting of the auxiliary light are changed by the conversion factor K, resulting in that the distance can be correctly measured at a low power consumption. Lighting of the auxiliary light is inhibited during the low contrast search inhibition time, resulting in that the auxiliary light can be prevented from lighting unnecessarily, and unpleasant feeling for the photographer of the object can be reduced.

In the first preferred embodiment, the auxiliary light device AL is enclosed in the electric flash device FS, however, the present invention is not limited to this, the auxiliary light device AL may be arranged outside of the main body BD of the camera. Moreover, the auxiliary light device AL may be arranged in the main body BD of the camera behind the photograph lens, as described in the Japanese patent laid open No. 208512/1984, and in this case, the light beam of the auxiliary light passes through the photograph lens and reaches the object.

As described above, in the first preferred embodiment according to the present invention, in order to certainly detect the infocus position of the photograph lens independent of the moving quantity of the photograph lens, the moving speed of the photograph lens is switched in accordance with the conversion factor K for converting the defocus value into the moving quantity of the photograph lens. Therefore, a focus condition detection can be simply and certainly performed without another specific calculation. This control is effective in a lens-interchangeable-type single lens reflex camera comprising an automatic focus control device for performing AF operation to various sorts of interchangeable lenses such as a macro lens, a super telephoto lens, a high magnification zoom lens. That is, the conversion factors for each of interchangeable lenses are enclosed therein, and the conversion factors are transmitted into the main body of the camera, resulting in that the moving speed of the photograph lens during the low contrast search can be controlled simply and properly for any interchangeable lens in accordance with the conversion factors.

The camera of the first preferred embodiment comprising the auxiliary light device has a following advantage in the low contrast search for detecting the focus condition by lighting of the auxiliary light. That is, when the focus condition is detected with the auxiliary light, the brightness of the object is generally low, therefore, it is necessary for the AF control device of the camera to have a longer integration time than an integration time when the brightness of the object is high, in order to get a high resolution for the CCD image sensor FLM. As a result, the longer integration time leads to a longer cycle period for the focus condition detection, and the lack of detecting the infocus position of the object may occur, as described above. However, in the automatic focus control device of the first preferred embodiment, the photograph lens is moved at a low speed in accordance with the conversion factor, resulting in that the focal point can be certainly detected without the aforementioned lack of detecting the infocus position.

Moreover, as described above, in the first preferred embodiment, the integration of the CCD image sensor FLM and the processing of the integrated pixel data of the previous cycle are performed in parallel with the aforementioned preliminary integration, resulting in that the CCD image sensor FLM can be efficiently used. On the other hand, in the preliminary integration during the auxiliary light mode, the infocus detection with daylight is performed inhibiting lighting of the auxiliary light, and it is judged whether or not the auxiliary light is turned on in accordance with the result of the detection at the preliminary integration, resulting in that the infocus detection can be certainly performed even though a large change of the brightness of the object is caused. Furthermore, the data dump of only the reference portion of the CCD image sensor FLM is performed during the aforementioned preliminary integration, therefore, the time for the data dump is reduced to approximately half the time, and the cycle period for the infocus detection is reduced, resulting in that an automatic focus control device having a high speed response for a change of the brightness of the object can be provided.

Furthermore, in the judgment of turning on or not of the auxiliary light of the first preferred embodiment, the condition for entering the auxiliary light mode is more sever than the condition for canceling or going out from the auxiliary light mode. Therefore, once the auxiliarY light mode is selected, the auxiliary light mode can not be canceled even though a slightly change of the brightness or the contrast of the object is caused. As a result, the automatic focus control device can overcome the aforementioned problem that the infocus condition is unstably detected by a difference between the infocus detection with the auxiliary light and the infocus detection with daylight when the program flow often enters and goes out from the auxiliary light mode.

As described above, in the first preferred embodiment, if the reliability of the result of the focus condition detection with daylight is lower than the predetermined judgment level which is higher than the predetermined limit judgment level for the focus condition detection, the focus condition detection of the next cycle is performed with the auxiliary light. Therefore, the focus condition detection with the auxiliary light can be performed more certainly than the detection with only daylight. Moreover, if the result of the detection with the auxiliary light is lower than the limit judgment level, it is judged as the condition that the focus condition can not be detected in order to prevent an error detection.

As described above, in the distance measurement of the first preferred embodiment, it is judged before the correlation calculation having a relatively long processing time whether or not the program flow enters the auxiliary light mode. That is, at the end of the calculation of the pixel peak value P and the contrast value C which are performed in parallel with the data dump of the reference portion of the CCD image sensor FLM at the step 122 of FIG. 3C, it is judged by the pixel peak value P and the contrast value C whether or not the program flow enters the auxiliary light mode, resulting in that the automatic focus control can be performed at a higher speed than the prior art.

As described above, in the first preferred embodiment, if the extreme position of the photograph lens is detected twice by the low contrast search, it is judged as the condition that the distance can not be measured, the operation of the next low contrast search is inhibited, and also lighting of the auxiliary light is inhibited. Therefore, no meaning distance measurement having a low possibility of the focus condition point detection is not performed, and the power consumption can be reduced by inhibiting no meaning lighting of the auxiliary light. Moreover, the low contrast search may be inhibited when the extreme position of the photograph lens is detected once.

Second preferred embodiment of automatic focus control

Figure 13A:
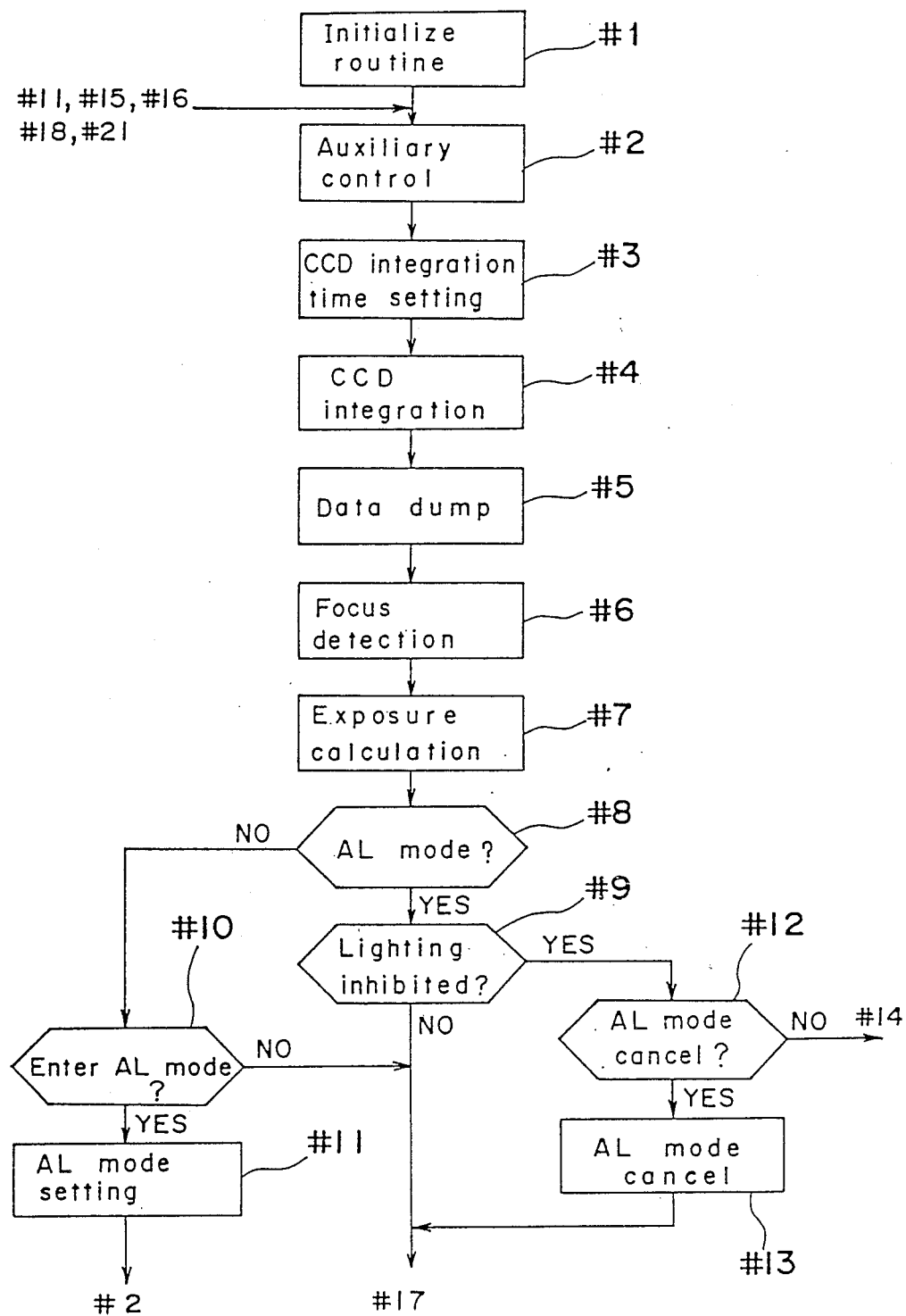

First of all, the abstract of the second preferred embodiment of the automatic focus control according to the present invention will be described below, referring to flow charts of FIGS. 13A to 13C. The portion which does not correspond to the subject matter of the second preferred embodiment is omitted in FIGS. 13A to 13C.

At the step 1, the microcomputer MCOM, all of the flags, and the CCD image sensor FLM etc. are initialized, and then, at the step 2, the control of turning on or off of the auxiliary light is performed. At the step 3, the integration time of the CCD image sensor FLM is set, and then, the integration of the CCD image sensor FLM is performed at the step 4. Moreover, the data dump is performed for latching the data of the CCD image sensor FLM into the microcomputer MCOM at the step 5, and then, the focus condition is detected in reference with the latched data at the step 6 and the exposure calculation is performed at the step 7. Then, it is judged whether or not the auxiliary light mode is arranged at the step 8. If the auxiliary light mode is not arranged, the program flow goes to the step 10, it is judged whether or not the program flow is to be entered the auxiliary light mode. If the program flow does not enter the auxiliary light mode, it is judged whether or not the focus condition can be detected at the step 17 shown in FIG. 13C. If it is possible to detect the focus condition, the program flow goes to the step 19, it is judged whether or not the image is in an infocus condition, and then, the control of driving the motor MO1 is performed at the step 21, and the program flow goes back to the step 2. When not being in the auxiliary light mode, the process for setting the predetermined lighting inhibit count number is no meaning. The above process loop is performed again, the automatic focus adjustment is repeatedly performed.

On the above loop, if it is judged that the focus condition can not be detected at the step 17, the low contrast process is performed at the step 18, which is a process for the case when the focus condition can not be detected. When the brightness or the contrast of the object is reduced and the program flow enters the auxiliary light mode at the step 10, and the program flow goes to the step 11, after the auxiliary light mode is arranged, the program flow goes back to the step 2.

Once the auxiliary light mode is arranged, it is judged at the step 8 that the auxiliarY light mode is arranged, the program flow goes to the step 9, it is judged whether or not lighting of the auxiliary light is inhibited. If lighting of the auxiliary light is not inhibited, the program flow goes to the step 17, and then, if the focus condition can be detected, the program flow goes to the step 19. At the step 19, it is judged whether or not the image is in an infocus condition, if the image is in an focus condition, the predetermined lighting inhibit count number of the auxiliary light is set at the step 20. That is, when it is judged that the image is in an infocus condition during the auxiliary light mode, lighting of the auxiliary light is inhibited for a predetermined times for the focus detection, wherein the predetermined times of the detection is arranged in a counter.

Figure 13B:
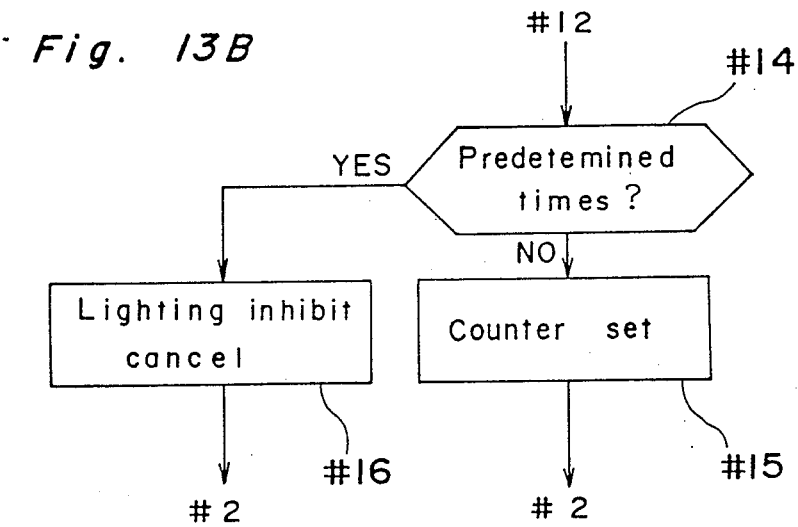
Figure 13C:
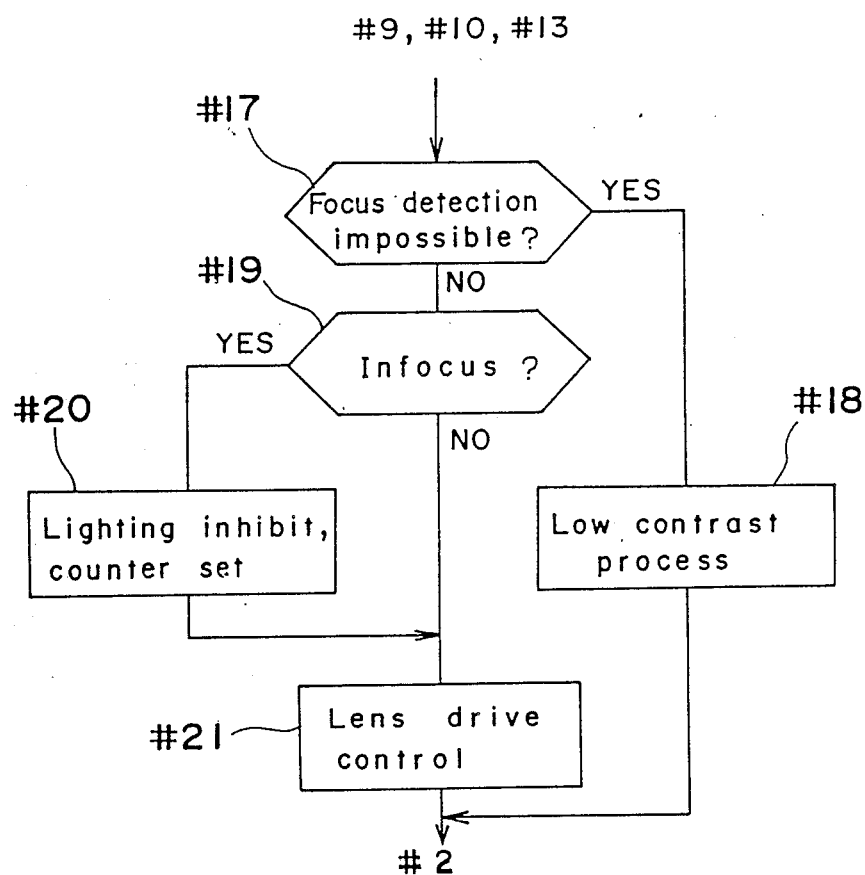

When the lighting inhibit counter is set at the step 20, the program flow goes to the step 12 by the judgment of the step 9, it is judged whether or not the auxiliary light mode should be canceled If the auxiliary light mode should not be canceled, the program flow goes to the step 14 shown in FIG. 13B, the number of the detection count times is measured and it is judged whether the number of the detection count times is equal to or larger than a predetermined value at the step 14. If the number of the detection count times is equal to or larger than the predetermined value, the program flow goes to the step 16, the lighting inhibition of the auxiliary light is canceled, and then, the program flow goes back to the step 2. On the other hand, if the number of the detection count times is smaller than the predetermined value at the step 14, the stored value at the counter is increased by 1 at the step 15, and then, the program flow goes back to the step 2.

On the other hand, if the auxiliary light mode should be canceled at the step 12, the auxiliary light mode is canceled at the step 13, and then, the program flow goes to the step 17.

The aforementioned loop of the automatic focus adjustment is repeatedly performed, if the image is in an infocus condition at the step 19 during the auxiliary light mode, the predetermined times of the lighting inhibition is arranged at the step 20, and then, after the program flow passes through the step 15 the predetermined times, lighting of the auxiliary light is permitted.

Figure 14A:
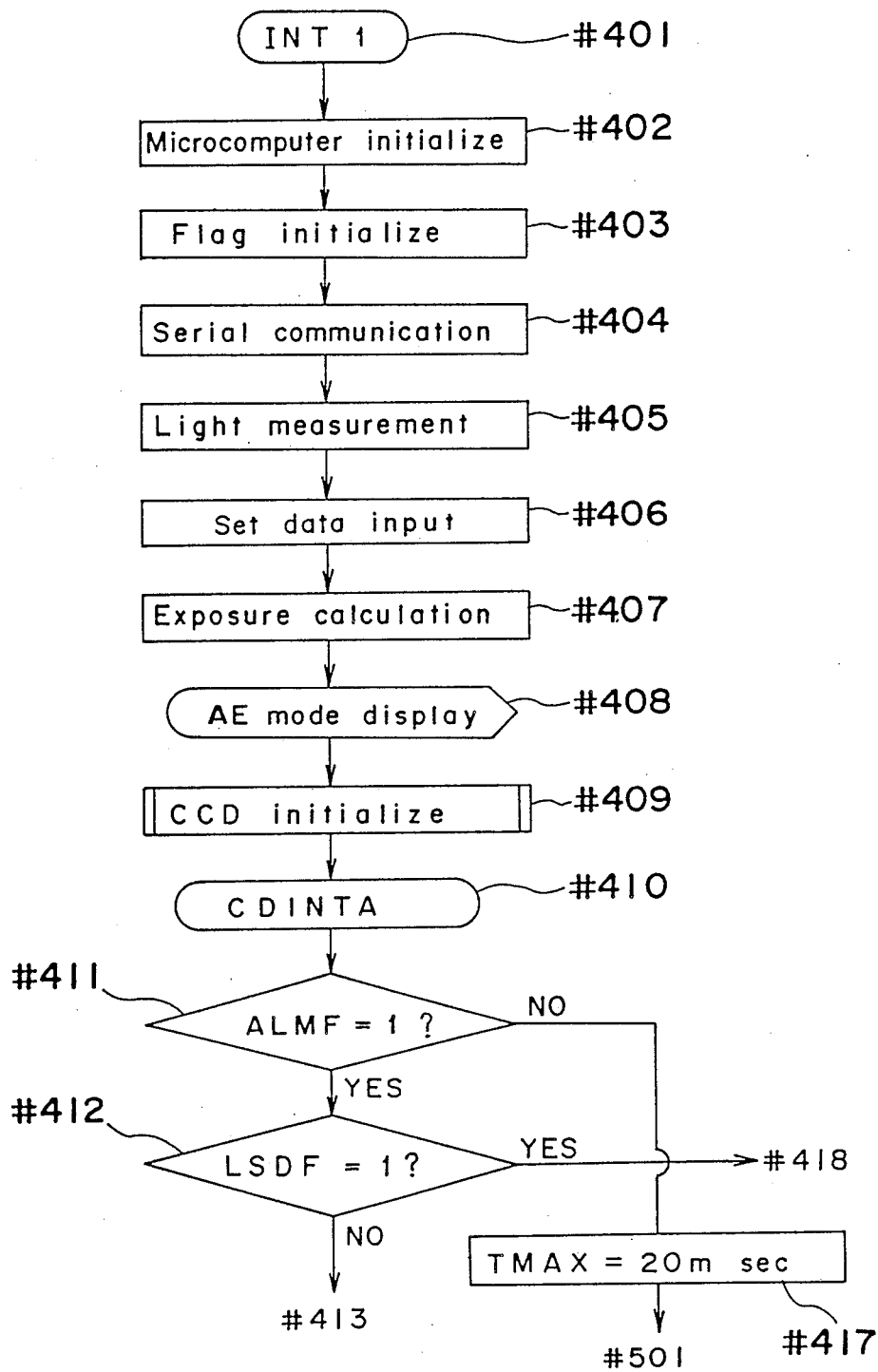
FIGS. 14A, 14B, 15A, 15B, 16A to 16D, 17A to 17D, 18, and 19A to 19C are flow charts showing a control operation of the second preferred embodiment according to the present invention.
Figure 14B:
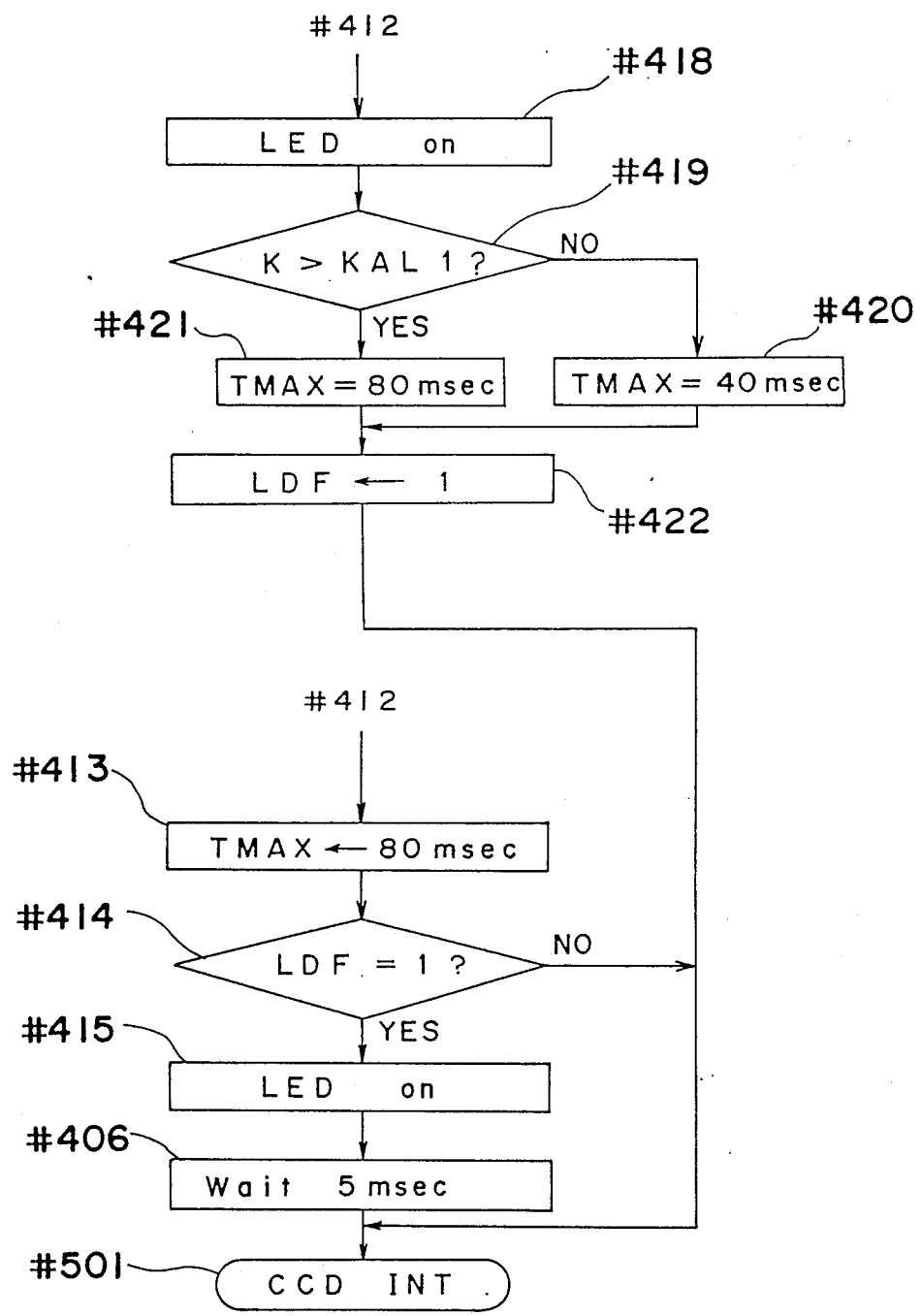

Next, the initialization, the lighting control of the auxiliary light and the integration time arrangement of the CCD image sensor FLM in the automatic focus adjustment of the second preferred embodiment will be described above in details, referring to the FIGS. 14A and 14B.

The control process starts when the shutter release button is pushed down at the first step, and then, the interrupt signal is inputted into the interrupt terminal of the microcomputer MCOM. At the step 402, the microcomputer MCOM is reset and initialized so that the stack is arranged and each of the ports is arranged as an input terminal or an output terminal. Then, all of the flag used in the flow charts of the second preferred embodiment are initialized and "0" is set in all of the flags. Next, at the step 404, the microcomputer MCOM communicates with the lens circuit LEC, so that the focal length, the conversion factor K, the infrared rays correction quantity $\Delta IR$, and the open aperture value Avo of the mounted photograph lens are inputted into the the microcomputer MCOM. Additionally, the microcomputer MCOM communicates with the flash device so that the auxiliary light mount signal and the charge completion signal are input into the microcomputer MCOM. At the step 405, the light measurement is performed, so that 8 bit digital data of the brightness information is latched from the light measurement circuit LMC via the A/D converter AD2 into the microcomputer MCOM. After the exposure control mode selected by an operator is inputted from the exposure control data setting circuit EDO into the microcomputer MCOM at the step 406, the exposure control value is calculated from the above inputted data at the step 407, and then, the calculated exposure value and the arranged exposure control mode are displayed at the step 408.

Next, at the step 409, the CCD image sensor FLM is initialized in order to eliminate the stored charge. The initialization of the CCD image sensor FLM is described in details in the Japanese patent laid open No. 241007/1985, it is not described in this specification because it is not the subject matter of the present invention. After the initialization of the CCD image sensor FLM at the step 409, the program flow goes to the CDINTA routine starting from the step 410 for controlling the integration of the CCD image sensor FLM and lighting of the auxiliary light.

The program flow goes from the step 410 to the step 411, it is judged whether or not the auxiliary light mode flag ALMF is "1", or the auxiliary light mode is arranged. If the auxiliary light mode flag ALMF is "0", the distance between the object and the camera is measured with daylight (this case is referred to hereinafter as daylight mode), the program flow goes to the step 417, 20 msec is set as the maximum integration time Tmax. That is, the integration time of the CCD image sensor FLM is limited to 20 msec during the daylight mode. On the other hand, if the auxiliary light mode flag ALMF is "1", or the auxiliary light mode is arranged, the program flow goes from the step 411 to the step 412, it is judged whether or not the low contrast searching flag LSDF is "1", or the low contrast search process is being performed. The low contrast searching is a process for repeatedly performing the detection of the focus condition moving the photograph lens to the other positions in case the focus condition can not be detected, as described above. If the low contrast searching flag LSDF is "0", or the low contrast search process is not being performed, the program flow goes to the step 413 shown in FIG. 14B, 80 msec is set as the maximum integration time Tmax, because the object is often in a low brightness condition, and then, it is judged whether or not the lighting flag LDF is "1" at the step 414. If the lighting flag LDF is "0", the program flow goes to the CCDINT routine starting the integration of the CCD image sensor FLM, in order to inhibit from lighting of auxiliary light, even though the auxiliary light mode is arranged. On the other hand, at the step 414, if the lighting flag LDF is "1", or lighting of auxiliary light is permitted, the program flow goes from the step 414 to the step 415, the light emitting diode LED as the auxiliary light emitter starts lighting, and then, the microcomputer MCOM waits for a time of 5 msec for the integration of the CCD image sensor FLM at the step 416, and the program flow goes to the CCDINT routine starting from step 501.

On the other hand, at the step 412, if the low contrast searching flag LSDF is "1", or the low contrast searching process is being performed, the program flow goes to the step 418. In the following process, the integration time of the CCD image sensor PLM is arranged in order to prevent the lack of the detection of the infocus position for the object.

First of all, at the step 418, the light emitting diode LED starts turning on, and then, it is judged whether or not the conversion factor K is larger than the predetermined threshold value KAL1 at the step 419. If the conversion factor K is larger than KAL1, it is judged that the defocus variation is smaller than the cycle of the focus detection when the photograph lens is moved, and then, 80 msec is set as the maximum integration time of the CCD image sensor FLM at the step 421, "1" is set in the lighting flag LDF at the step 422, and then, the program flow goes to the CCDINT routine starting from the step 501. On the other hand, if the conversion factor K is equal to or smaller than KAL1, it is judged that the defocus variation is larger than the cycle of the focus detection, the maximum integration time of the CCD image sensor FLM is limited to 40 msec at the step 420, and then, the program flow goes to the step 422.

The predetermined threshold value KAL1 can be determined by the moving speed of the photograph lens during the low contrast search and the cycle of the focus condition detection. That is, the moving quantity DFM of the photograph lens changing by the low contrast searching for one focus condition detection is defined by the following equation, as described above.

$$DFM = A \times Vlens \times TAF/K$$

where A is a constant, TAF is a required time for detecting one focus condition, and Vlens is a moving speed of the photograph lens during the low contrast search. Vlens is depend on a speed of the motor MO1 for driving the photograph lens enclosed in the main body BD of the camera. In the second preferred embodiment, the motor MO1 rotates at a constant speed of 2,000 rpm, independent of the interchangeable lens, resulting in that the moving quantity DFM depends on the conversion factor K if the TAF is determined. In the predetermined value TAF, if the interchangeable lens or the zoom lens has the focal length which requires a conversion factor K ($K \leq KAL1$) and the moving quantity DFM is out of the detection available range defined by the equation (3), the time TAF is reduced. Moreover, if the infocus position is detected at the opposite direction to the driving direction of the photograph lens during the low contrast search, the photograph lens is stopped once and then inverted to reach the infocus position, resulting in that there is a problem that an unpleasant feeling for operating a smooth focus adjustment is given to the operator. In order to overcome the problem, the time TAF is arranged so that the moving quantity DFM is within the detection available range at the driving direction of the photograph lens during the low contrast search. In this arrangement of the time TAF, the focus condition is detected until the photograph lens reaches the infocus position by the low contrast searching, resulting in that the photograph lens can be stopped at the infocus position without an inversion of the motor MO1. In the second preferred embodiment, an enough short time is set in the time TAP when the object is photographed with daylight, resulting in that the integration time is arranged so that the aforementioned problems does not occur for the conversion factor K of all the interchangeable lens, and the aforementioned judgment is performed only during the auxiliary light mode requiring a longer integration time. However, when a longer integration time may be arranged not during the auxiliary light mode, and also the photograph lens has a very small conversion factor K, the integration time during the low contrast search ma be changed depending on the conversion factor K as well as the aforementioned method.

Figure 15A:
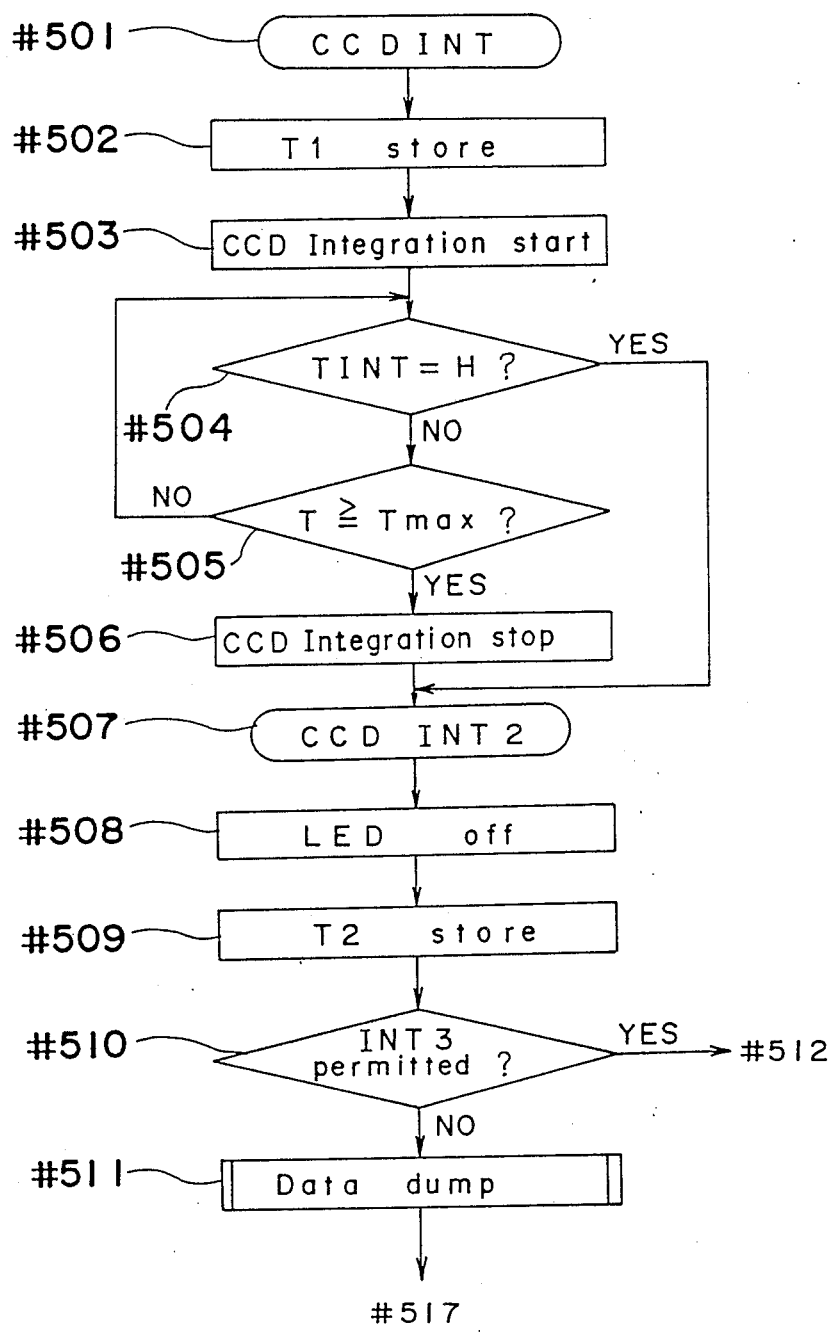

Next, the CCDINT routine starting the integration of the CCD image sensor FLM will be described below in details, referring to FIGS. 15A and 15B.

First of all, at the step 502, the count value of the timer enclosed in the microcomputer MCOM is stored as a time T1 in a RAM of the microcomputer MCOM, and then, the integration of the CCD image sensor FLM starts at the step 504. After the integration starts, it is judged whether or not the integration stop signal TINT is high at the step 505, and it is judged whether or not the integration time is equal or larger than the maximum integration time Tmax at the step 505, wherein Tmax is arranged at the step 417, 413, 420, or 421 of FIGS. 14A and 14B. If the integration stop signal TINT is high at the step 504, it is judged that the integration of the CCD image sensor FLM is completed, and then, the program flow goes to the CCDINT2 routine starting from the step 507. On the other hand, if the count time of the timer is equal or larger than the maximum integration time Tmax at the step 505, the integration of the CCD image sensor FLM is stopped at the step 506, and the program flow goes to the CCDINT2 routine starting from the step 507. If the integration stop signal TINT is low at the step 504 and the count time of the timer is smaller than the maximum integration time Tmax at the step 505, the loop of the steps 504 and 505 is continuously performed.

The program flow goes from the step 507 to the step 508, lighting of the auxiliary light is stopped, and then, the counting time of the timer is stored as a integration end time T2. Next, it is judged whether or not the interruption INT3 from the encoder pulse generator ENC into the interruption terminal INT3 of the microcomputer MCOM is permitted at the step 510. If the interruption INT3 is not permitted, the data dump of the CCD image sensor FLM is performed at the step 511 because the interruption INT3 and the timer interruption for controlling the speed of the motor MO1 are not inputted into the the microcomputer MCOM during the data dump of the CCD image sensor FLM, and then, the program flow goes to the step 517. On the other hand, if the interruption INT3 is permitted at the step 510, the interruption INT3 and the timer interruption are inhibited at the step 512, the motor MO1 is turned off driving the motor MO1 with an inertia force the step 513, and the data dump of the CCD image sensor FLM is performed at the step 514. Because the timer interruption for controlling the speed of the motor MO1 may occur when the interruption INT3 is permitted, in this case, the data of the CCD image sensor FLM outputted synchronizing to the clock may not be properly into the microcomputer MCOM. After the data dump, the motor MO1 is turned on again at the step 515, and then, the interruption INT3 and the timer interruption are permitted at the step 516. The encoder pulse during the data dump, for example, may be counted by another counter (not shown), and the encoder pulse count number is corrected by the counted value or may be corrected by a predetermined value. The speed control of the motor MO1 performed by the interruption INT3 and the timer interruption will be described below in details.

Figure 20A:
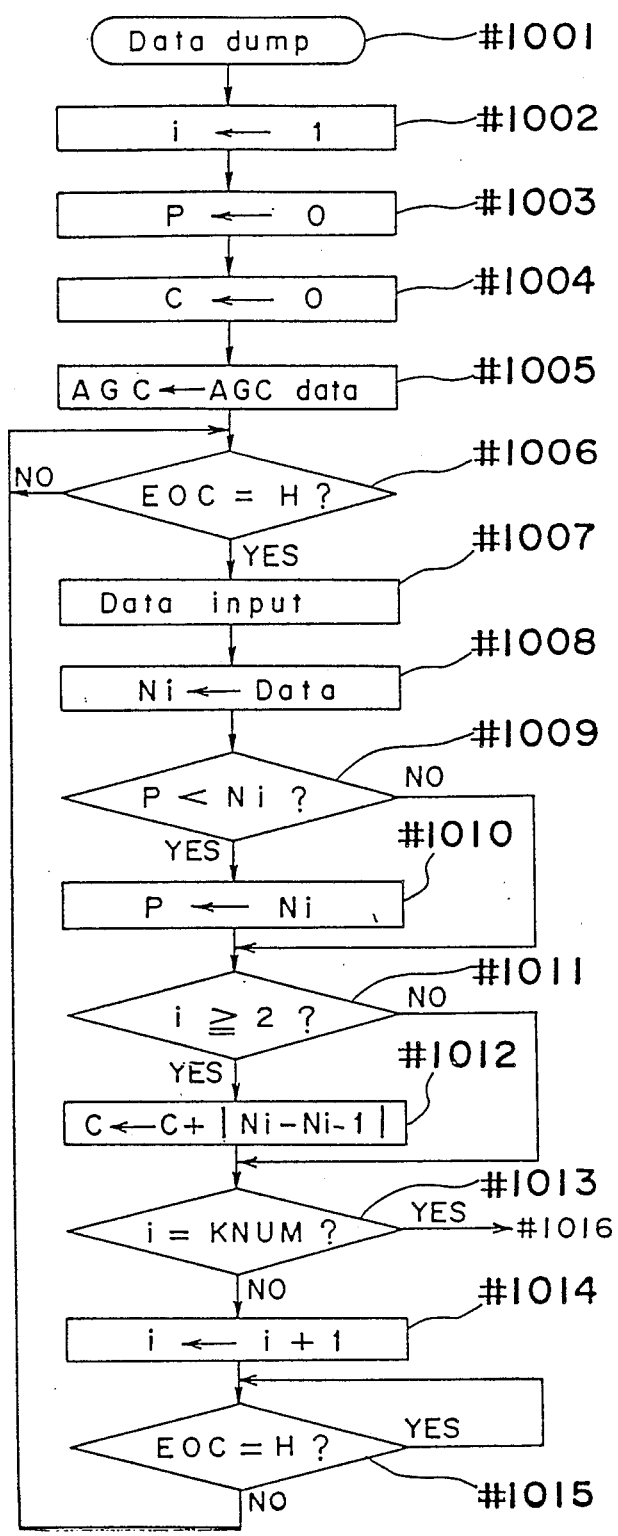
FIGS. 20A and 20B are flow charts showing a data dump operation of the control operation of the second preferred embodiment.
Figure 20B:
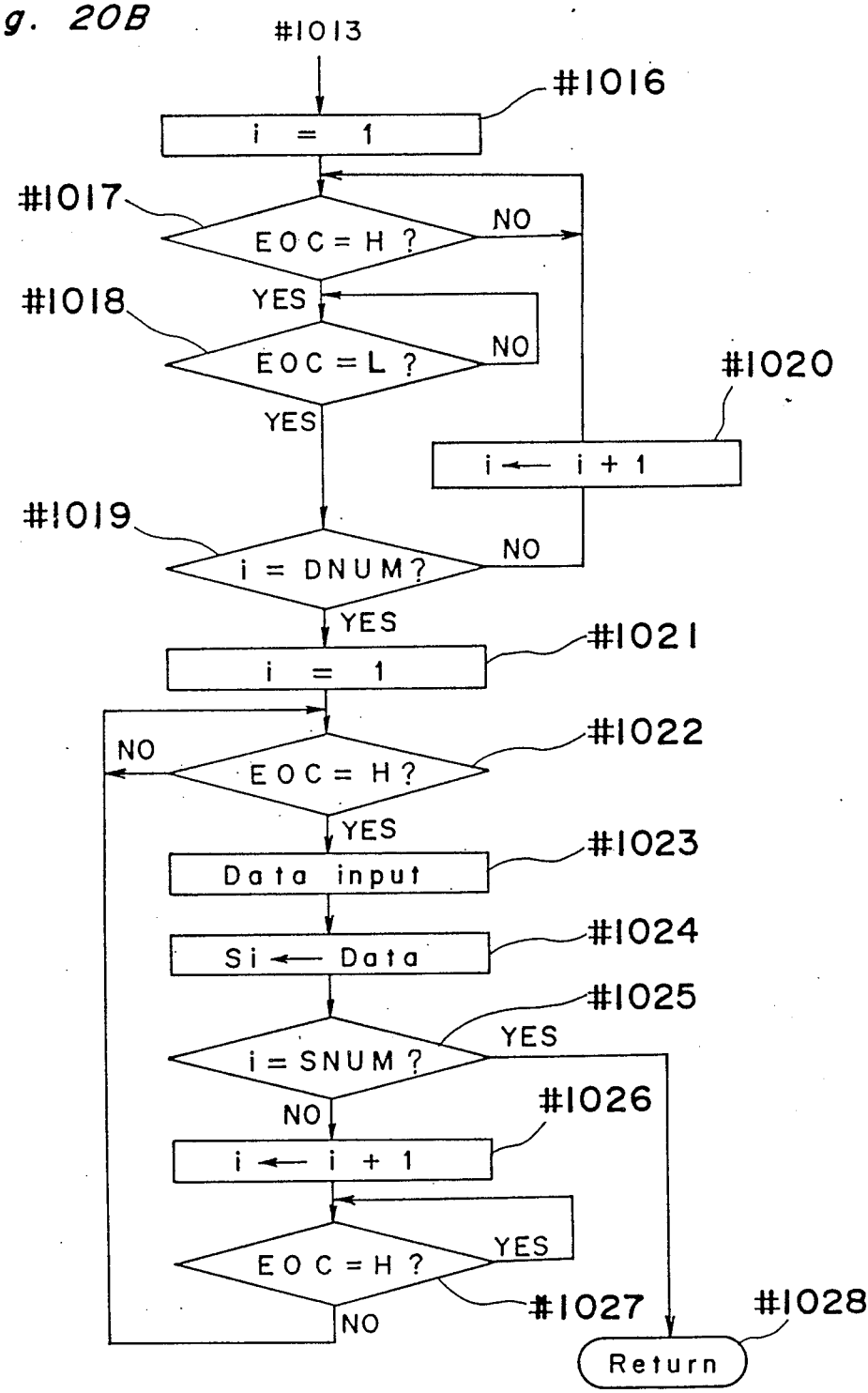

The aforementioned data dump at steps 511 or 514 is a subroutine, wherein the pixel information of the CCD image sensor FLM integrated at the steps 503 to 507 is latched, and the latch of the AGC data, the calculation of the contrast value C, and the calculation of the pixel peak value P are performed. The data dump process will be described below in details referring to FIGS. 20A and 20B.

In the data dump process, the program flow goes from the step 1001 to the step 1002, "1" is set in a counter i for counting the pixel number of the CCD image sensor FLM, and then, the pixel peak value P and the contrast value C are initialized at the steps 1003 and 1004. Next, the AGC data is latched and set in a register AGC at the step 1005, and then, the program flow goes to the step 1006, it is judged whether or not an EOC signal is high, wherein the high EOC signal outputted from the A/D converter IF6 designates the end of the A/D conversion. If the A/D conversion is completed, or the EOC signal is high, 8 bit data of one pix of the CCD image sensor FLM is latched at the step 1007, and the data is stored as data Ni in the RAM of the microcomputer MCOM at the step 1008. Next, the peak value P is compared with the latched data Ni at the step 1009. If $P \geq Ni$, the peak value is not updated, and the program flow goes to the step 1011. On the other hand, If $P < Ni$, the peak value P is updated at the step 1010 so that the data Ni is set as the peak value P, and the program flow goes to the step 1011. At the step 1011, it is judged whether or not the number i of the latched data is equal to or larger than 2, if $i \geq 2$, the following value Ca is calculated.

$$Ca = C + |Ni - Ni - 1|$$

The calculated value Ca is set as the contrast value C at the step 1012, and then, the program flow goes to the step 1013. On the other hand, if $i = 1$, or the latched data is the first data, the program flow goes to the step 1013 because data $Ni - 1$ does not exist. At the step 1013, it is judged whether or not the count number i of the pixel is equal to a pixel number KNUM which is the pixel number of the reference portion of the CCD image sensor FLM. If i is not KNUM, the counter value i is increased by 1 at the step 1014, and the microcomputer MCOM waits for the low EOC signal at the step 1015, when the EOC signal is low, the program flow goes back to the step 1006. The aforementioned loop of the steps 1006 to 1015 is repeatedly performed, resulting in that the peak value P and the contrast value C can be obtained when the data dump of all the pixel of the reference portion of the CCD image sensor FLM is completed.

After the data dump of the reference portion of the CCD image sensor FLM is completed, the program flow goes from the step 1013 to the step 1016. At the steps 1016 to 1020 of FIG. 20B, the number of the pixel positioned between the reference portion and the measurement portion of the CCD image sensor FLM is counted which are not used for detecting the focus condition. At the step 1016, "1" is set in the counter value i for initializing the counter, and the EOC signal is monitored for one cycle thereof at the steps 1017 and 1018, on the other hand, the pixel number is counted at the steps 1019 and 1020. Then, if the counter value i is equal to a predetermined value DNUM, the program flow goes to the step 1021.

At the steps 1021 to 1028, the data of the pixel of the measurement portion of the CCD image sensor FLM is latched. "1" is set in the counter value i for initialing the counter value i at the step 1021, and it is judged whether or not the EOC signal is high at the step 1022. After the EOC signal is high at the step 1022, the pixel data of the measurement of the CCD image sensor FLM is latched at the step 1023, and then, the latched data is set as Si, and it is judged whether or not the counter value i is a predetermined value SNUM corresponding to the pixel data number of the measurement portion of the CCD image sensor FLM at the step 1025. If the counter value i is not SNUM, the program flow goes to the step 1026, the counter value i is increased by 1 at the step 1026, and it is judged whether or not the EOC signal is high at the step 1027. When the EOC signal becomes low, the program flow goes back to the step 1022, and the aforementioned process is repeatedly continued. On the other hand, if the counter value i is SNUM at the step 1025, the program flow returns to the main routine. As described above, in the data dump subroutine, the pixel data of the reference portion and the measurement portion of the CCD image sensor FLM and the AGC data are inputted, and also the peak value P and the contrast value C are calculated.

Figure 15B:
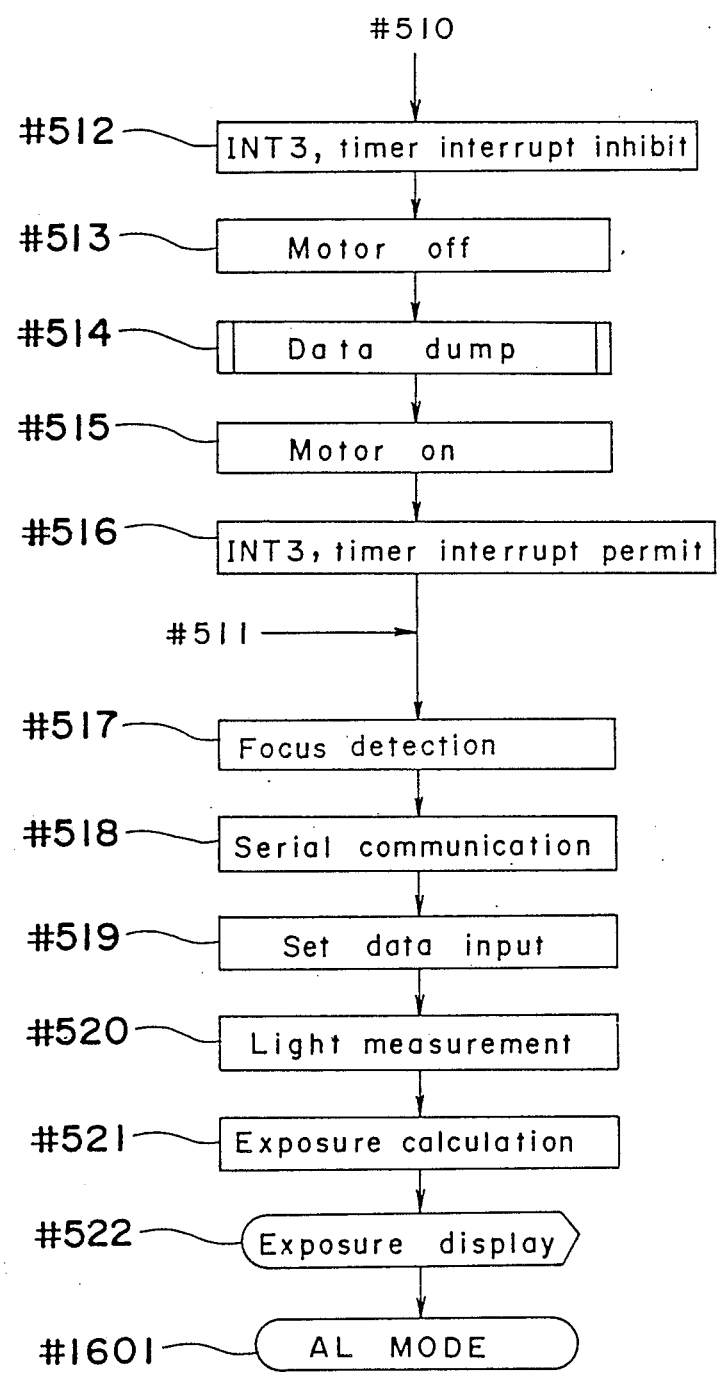

After the data dump, the program flow goes back to the step 517 of FIG. 15B, the calculation for detecting the focus condition is performed. The calculation for the focus detection is not be described below in details, because it is described in the principle of the automatic focus adjustment. At the step 517, the defocus value DF, the defocus direction, and the correlation level signal YM for the object can be obtained. Next, at the step 518, the microcomputer MCOM communicates in serial with the lens circuit LEC and the flash circuit FLS, so that the aforementioned lens data and the flash data are inputted into the microcomputer MCOM, and then, at the step 519, the mode data for the AE control arranged by the operator in the exposure control data setting circuit EDO is inputted into the microcomputer MCOM. Then, the light measurement is performed at the step 520, and the exposure control value is calculated at the step 521 in accordance with the exposure control mode and the light measurement. Next, the exposure control information is displayed at the step 522, and the program flow goes to an ALMODE routine starting from the step 1601 of FIG. 16A for judging the auxiliary light mode and judging whether or not the focus condition can be detected.

Figure 16A:
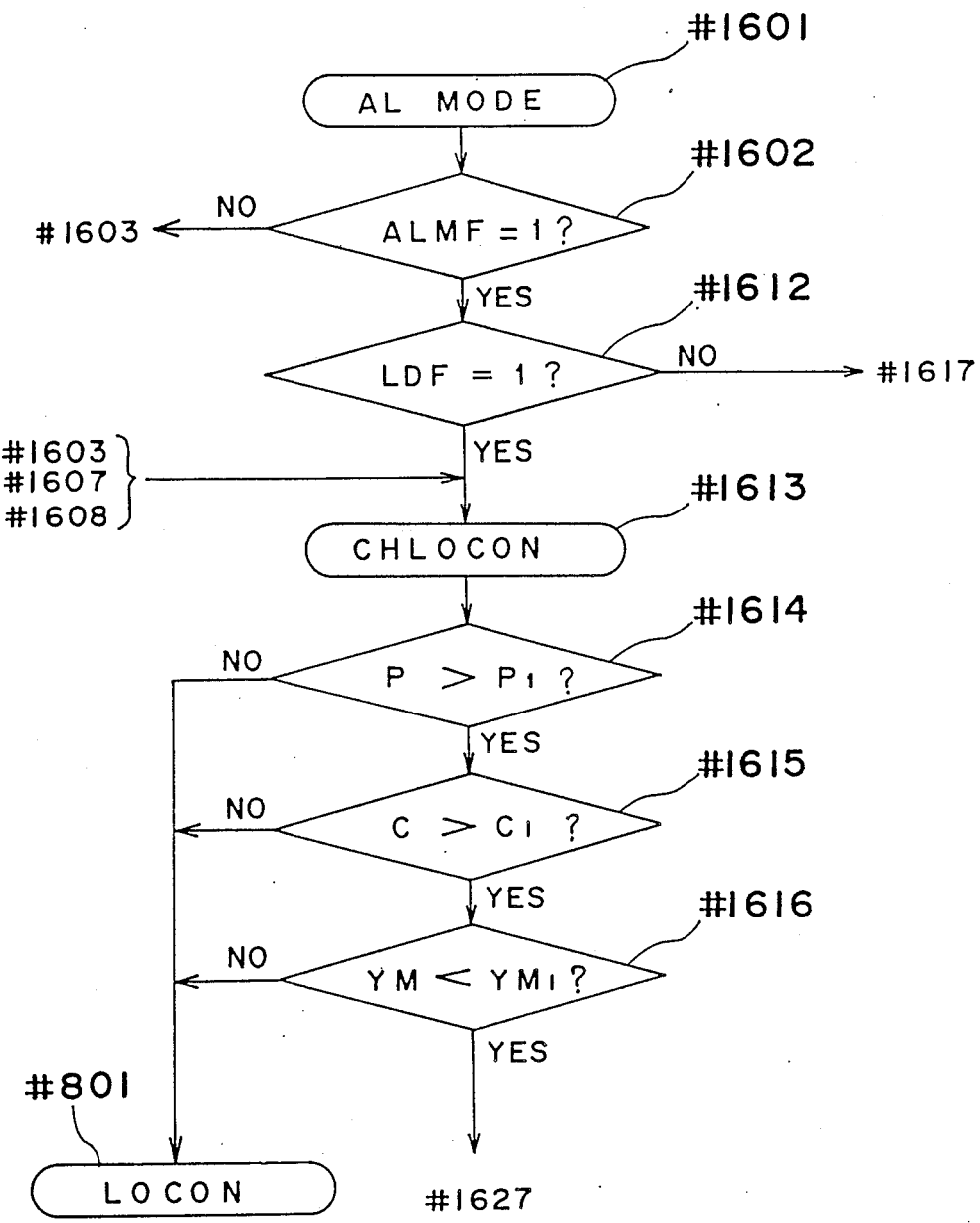
Figure 16B:
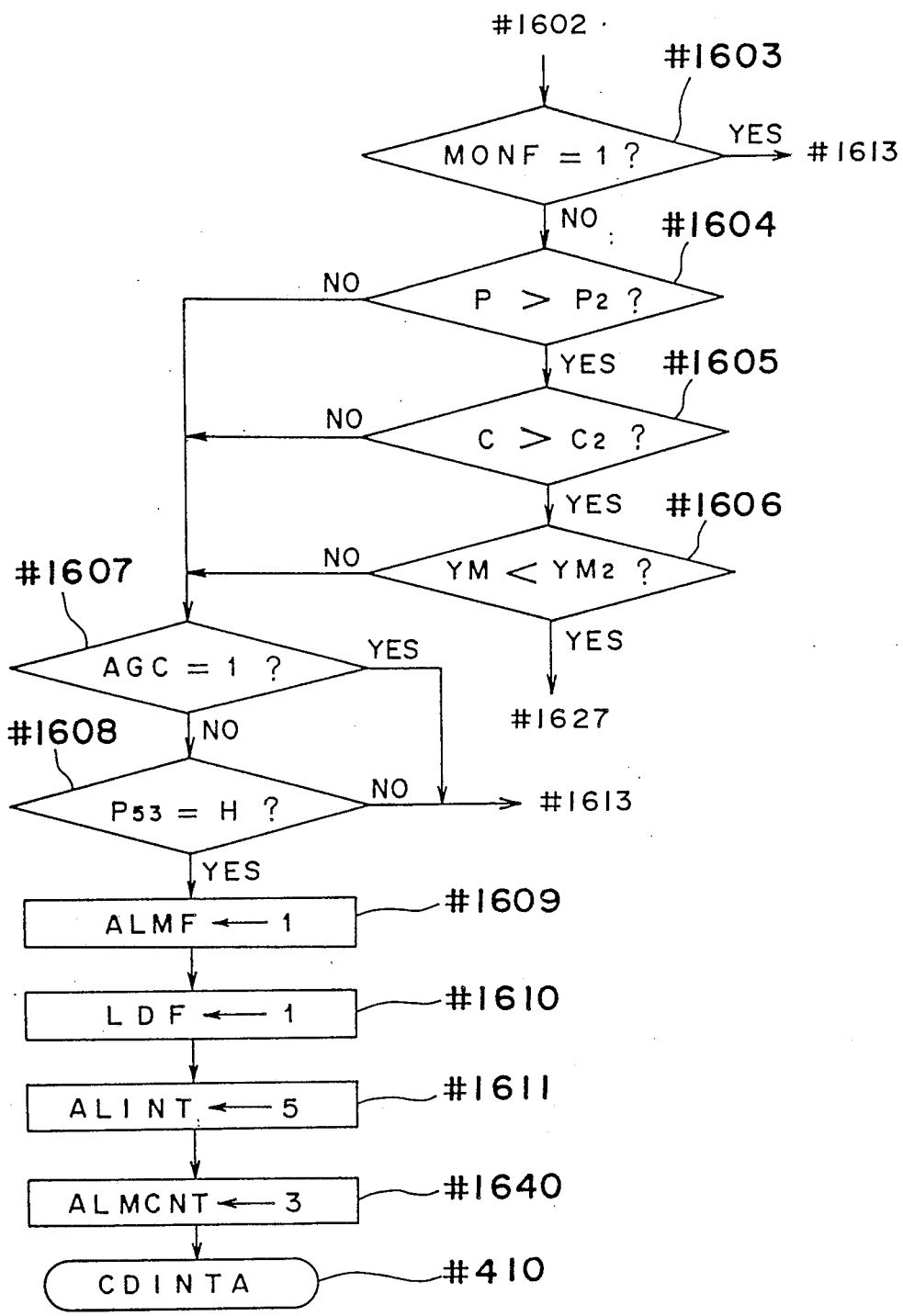

In FIG. 16A, first of all, at the step 1602, it is judged whether or not the auxiliary light mode flag ALMF is "1", or the auxiliary light mode is arranged. If the auxiliary light mode flag ALMF is "0", the auxiliary light mode is not arranged, the program flow goes to the step 1603 of FIG. 16B, it is judged whether or not a monitor flag MONF is "1", or the photograph lens is being moved. If the monitor flag MON is "1", the program flow goes to the step 1613, on the other hand, if the monitor flag MONF is "0", or the photograph lens stops, the program flow goes to the step 1604. At the steps 1604 to 1606, it is judged whether or not the program flow enters the auxiliary light mode. It is judged whether or not the peak value P is larger than a predetermined threshold value P2 at the step 1604, the contrast value C is larger than a predetermined threshold value C2 at the step 1605, and the correlation level signal YM is smaller than a predetermined threshold value YM2 at the step 1606. At the steps 1604 to 1606, if $P \leq P2$, $C \leq C2$, or $YM \geq YM2$, or it is judged that the focus detection with the auxiliary light is more advantageous than the focus detection with daylight, the program flow goes to the step 1607, it is judged whether or not the AGC data is "1". If the AGC data is not "1", it is judged whether or not the terminal P53 of the microcomputer MCOM is high, or the auxiliary light device AL is mounted to the camera body at the step 1608. If the terminal P53 is high, "1" is set in the auxiliary light mode flag ALMF at the step 1609, "1" is set in the lighting flag LDF at the step 1610, "5" is set in a register value ALINT at the step 1611, and "3" is set in a register value ALMCNT at the step 1640, and then, the program flow goes to the CDINTA routine starting from the step 410 for the integration of the CCD image sensor FLM at the auxiliary light mode.

On the other hand, if the monitor flag MONF is "1", or the photograph lens is being moved, the program flow goes to the CHLOCON routine starting from the step 1613 of FIG. 16A for judging whether or not the infocus condition can be detected, without judging the auxiliary light mode. If $P > P2$, $C > C2$, and $YM < YM2$ at the steps 1604 to 1606, it is judged that reliability of the focus detection with daylight is high, the program flow goes to the step 1627 of FIG. 16D. If the AGC data is "1" at the step 1607, or if the terminal P53 of the microcomputer MCOM is low at the step 1608, the program flow goes to the step 1613 of FIG. 16A. In the above flow, when the AGC data is "1", the program flow does not enter the auxiliary light mode, because daylight is too bright and the effect of lighting the auxiliary light is low, resulting in that the power consumption is raised by unnecessarily turning the auxiliary light on and the auxiliary light is dazzled to the object to be photographed.

On the other hand, at the step 1602 of FIG. 16A, if the auxiliary light mode flag ALMF is "1", or the auxiliary light mode is arranged, the program flow goes to the step 1612, it is judged whether or not the lighting flag LDF is "1". If the lighting flag LDF is "1", or the auxiliary light is turn on during the auxiliary light mode, the program flow goes to the CHLOCON routine starting from the step 1613.

The program flow goes from the step 1613 to the step 1614, the reliability of the focus detection is checked and it is judged whether or not the focus detection can be detected at the steps 1614 to 1616. It is judged whether or not the peak value P is larger than a predetermined threshold P1 at the step 1614, it is judged whether or not the contrast value C is larger than a predetermined threshold value C1 at the step 1615, and it is judged whether or not the correlation level signal YM is smaller than a predetermined threshold value YM1 at the step 1616. If $P \leq P1$, $C \leq C1$, or $YM \geq YM1$, it is judged that the reliability of the focus detection is low and the focus detection can not be detected, the program flow goes to the LOCON routine starting from the step 801, so that the process when the focus detection can not be detected is performed. On the other hand, if $P > P1$, $C > C1$, and $YM < YM1$, it is judged that the focus detection has an enough high reliability, the program flow goes to the step 1627 of FIG. 16D. The predetermined threshold values P1, C1, and YM1 are arranged so that $P1 < P2$, $C1 < C2$, and $YM1 > YM2$, wherein P2, C2, and YM2 are the predetermined threshold values used at the steps 1604 to 1606. That is, it is arranged that the judgment level of the reliability whether or not the program flow enters the auxiliary light mode at the steps 1604 to 1606 is larger than the judgment level of the reliability whether or not the focal point can be detected at the steps 1614 to 1616. That is, the focus detection with daylight is not performed until the reliability level is dropped to the predetermined threshold level, resulting in that the auxiliary light can be properly turned on and the focus detection having a high reliability can be performed.

Figure 16C:
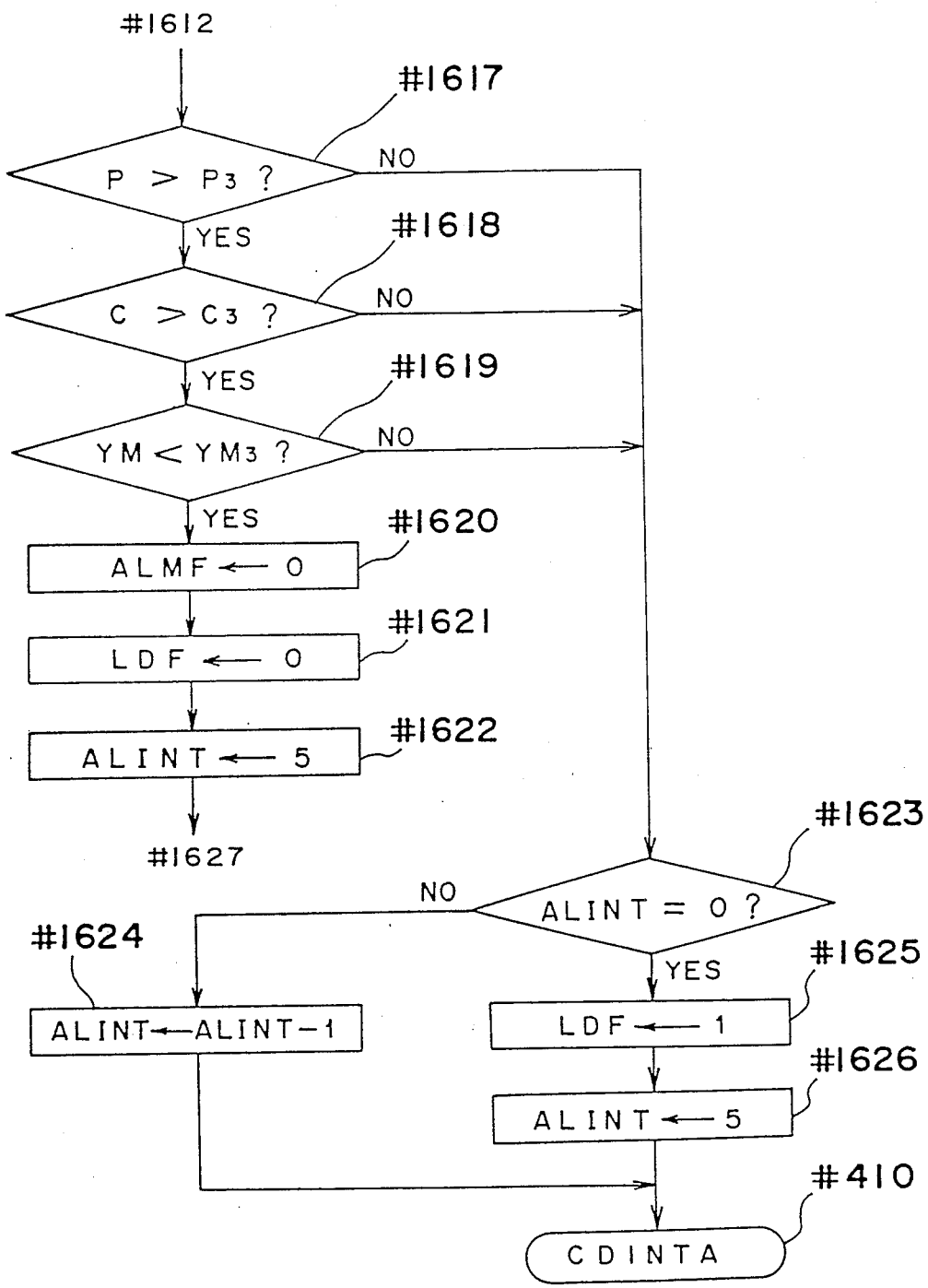

On the other hand, at the step 1612, if the lighting flag LDF is "0", or lighting of the auxiliary light is inhibited event though the auxiliary light mode is arranged, the program flow goes to the step 1617 of FIG. 16C. At the steps 1617 to 1619, the reliability of the focus detection is judged for judging whether or not the auxiliary light mode should be canceled. That is, if the lighting flag LDF is "0", even though the auxiliary light mode is arranged, the focus condition with daylight is detected, as described in the judgment of step 411 of FIG. 14A. It is judged by the reliability of the focus detection with daylight whether or not the auxiliary light mode should be canceled. If the peak value P is larger than a predetermined threshold value P3 at the step 1617, the contrast value C is larger than a predetermined threshold value C3, and the correlation level signal YM is smaller than a predetermined threshold value YM3, it is judged that the focus detection with daylight has a high reliability, and then, the auxiliary light mode is canceled and "0" is set in the auxiliary light mode flag ALMF at the step 1620. Thus, when the brightness and the contrast of the object are raised at a high speed, the AF control mode can be switched into the daylight mode. Next, the program flow goes from the step 1620 to the step 1621, the lighting flag LDF is reset, "5" is set in the register ALINT at the step 1622, and then, the program flow goes to the step 1627 of FIG. 16D.

On the other hand, at the steps 1617 to 1619, if P≦P3, C≦C3, or YM≧YM3, the auxiliary light mode is maintained, and then, the program flow goes to the step 1623. It is judged whether or not ALINT is "0" at the step 1623, if ALINT is "0", "1" is set in the lighting flag LDF at the step 1625, the inhibition of lighting of the auxiliary light is canceled, and then, "5" is set in the register ALINT, the program flow goes to the routine CDINTA starting from the step 410 for detecting the next cycle of the focus condition. If ALINT is not "0" at the step 1623, (ALINT-1) is set in the register ALINT at the step 1624, and then, the program flow goes to the CDINTA routine starting from the step 410.

In the above process of steps 1612, 1617 to 1626, if the lighting flag LDF is reset even though the auxiliary light mode is arranged, the lighting flag LDF is "0" continuously for six times of focus detection, and the auxiliary light can not be turned on. Therefore, it is judged whether or not the auxiliary light mode is canceled at the steps 1617 to 1619. Moreover, when the focus condition is detected during the auxiliary light inhibit mode, the photograph lens is not moved except for a case when the auxiliary light mode is canceled. When the auxiliary light mode is not canceled, six times of the focus detection are performed during the auxiliary light inhibit mode, and then, and the inhibition from lighting of the auxiliary light is canceled.

Moreover, the predetermined threshold values P3, C3 and YM3 respectively used at the steps 1617 to 1619 are arranged so that P2<P3, C2<C3, and YM2>YM3, wherein P2, C2, and YM2 are used respectively at the steps 1604 to 1606. That is, it is arranged that the reliability level, for judging whether or not the auxiliary light mode is canceled at steps 1617 to 1619, is larger than the reliability level for judging whether or not the program flow enters the auxiliary light mode at the steps 1604 to 1606. That is, when it is arranged that the judgment whether or not the program flow leaves the auxiliary light mode is performed more severely than the judgment whether or not the program flow enters the auxiliary light mode, the auxiliary light mode can be prevented from canceling as soon as the auxiliary light mode is selected, resulting in that the auxiliary light mode can be stably maintained, and a stable AF control can be performed even though there is a difference between the focus detection with the auxiliary light and the focus detection with daylight.

Figure 16D:
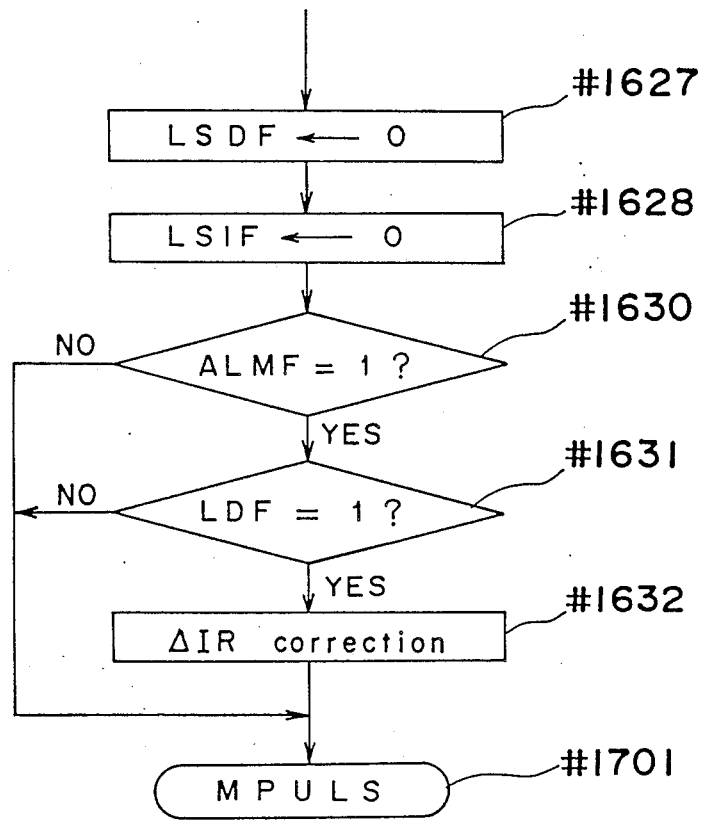

The program flow goes from the steps 1606, 1616, and 1622 to the step 1627 of FIG. 16D, the low contrast searching flag LSDF is reset at the step 1627, the low contrast search inhibit flag LSIF is reset and the inhibition of the low contrast searching is canceled at the step 1628, because it is judged that the focus condition point can be detected at the step 1627. Next, at the steps 1630 and 1631, it is judged whether or not the auxiliary light is turned on at this cycle of focus condition detection. If the auxiliary light mode flag ALMF is "1" and the lighting flag LDF is "1", the ΔIR correction is performed at the step 1632, because the auxiliary light is turned on, and then, the program flow goes to the MPULS routine starting from the step 1701 for moving the photograph lens and judging whether or not the photograph lens is within an infocus range. The ΔIR correction is described in the Japanese patent laid open No. 43620/1985 in details. It is not described in this specification because it is not the subject matter of the present invention.

In the MPULS routine of FIGS. 17A to 17D, first of all, the defocus value DP is converted into the count number N of the encoder pulses outputted from the encoder pulse generator ENC at the step 1702. As described above, the encoder pulse count number N can be obtained by performing the calculation K×DF, wherein K is the aforementioned conversion factor outputted from the lens circuit LEC of the interchangeable lens. Next, it is judged whether or not the monitor flag MONF is "1" at the step 1703, or the photograph lens is being moved. If the photograph lens is stopped, or the monitor flag MONF is "0", it is judged whether or not the photograph lens is moved in the opposite direction to the previous moving direction of the photograph lens at the step 1704. If the moving direction of the photograph lens is inverted, the backlash which occurs due to the driving of the driving mechanism 108 and the transmission mechanism 105 is corrected at the step 1705, and then, the program flow goes to the step 1712. On the other hand, if the monitor flag MONF is "1", or the photograph lens is being moved, the program flow goes to the step 1706 of FIG. 17B, and then, the moving quantity of the photograph lens is corrected by the quantity moved from the center timing of the integration of the CCD image sensor FLM to the step 1706. The program flow goes from the step 1706 to the step 1707, it is judged whether or not the current moving direction of the photograph lens is the opposite direction to the previous direction. If the moving direction of the photograph lens is inverted, it is judged that the photograph lens overruns the infocus position, and then, the motor MO1 is braked at the step 1709. Next, the microcomputer MCOM waits for 50 msec until the motor MO1 stops completely at the step 1710, the monitor flag MONF is reset at the step 1711, and then, the program flow goes to the CDINTA routine starting from the step 410. On the other hand, if the moving direction of the photograph lens is not inverted at the step 1707, the program flow goes to the step 1708 for judging whether or not the photograph lens is positioned at the extreme position which is the nearest photographing point or the infinity photographing point.

Figure 24:
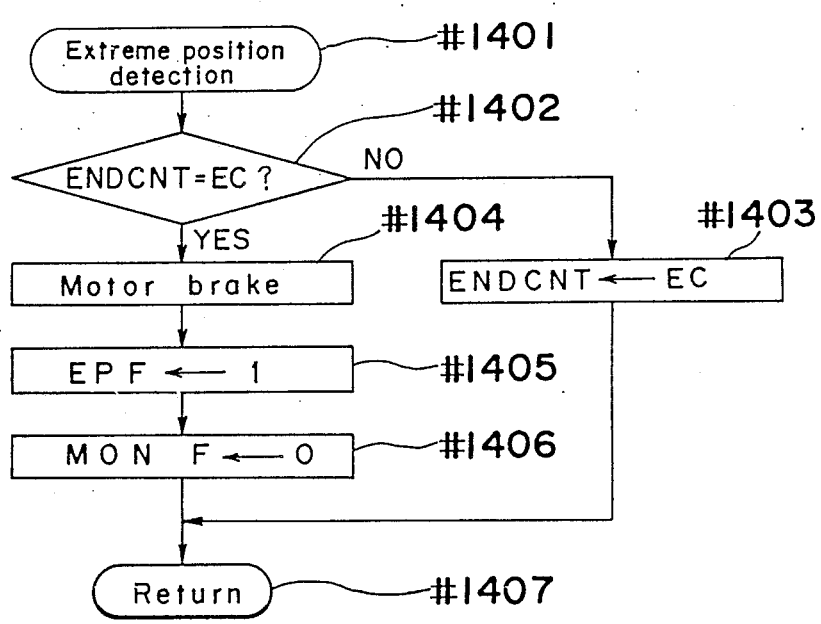
FIG. 24 is a flow chart showing an extreme position detection operation of the control operation of the second preferred embodiment.

The extreme position detection executed at the step 1708 will be described below in details referring to FIG. 24. The program flow goes from the step 1401 to the step 1402, first of all, the event counter value EC is compared with an end counter value ENDCNT for detecting that the photograph lens is driven to the extreme position thereof. As described above, since the event counter value is decreased by 1 every time when the encoder pulse is inputted from the encoder pulse generator ENC, the event counter value varies in accordance with moving of the photograph lens. If both of the counter values EC and ENDCNT are not equal to each other, it is judged that the photograph lens is not positioned at the extreme position, and then, the program flow goes to the step 1403, the event counter value EC is set in the end counter ENDCNT, and then, the program flow returns to the main routine at the step 1407. On the other hand, if both of the counter values EC and ENDCNT are equal to each other at the step 1402, the photograph lens is positioned at the extreme position and stops, and the encoder pulse is not generated because the clutch between the motor MO1 and the photograph lens is slid. In this case, the motor MO1 is braked at the step 1404, "1" is set in the extreme position flag EPF designating that the photograph lens is positioned at the extreme position, and the monitor flag MONF is reset at the step 1406, and then, the program flow returns to the main routine at the step 1407. In the extreme position detection routine of the steps 1401 to 1407, it can be judged whether or not the photograph lens is positioned at the extreme position.

Figure 17A:
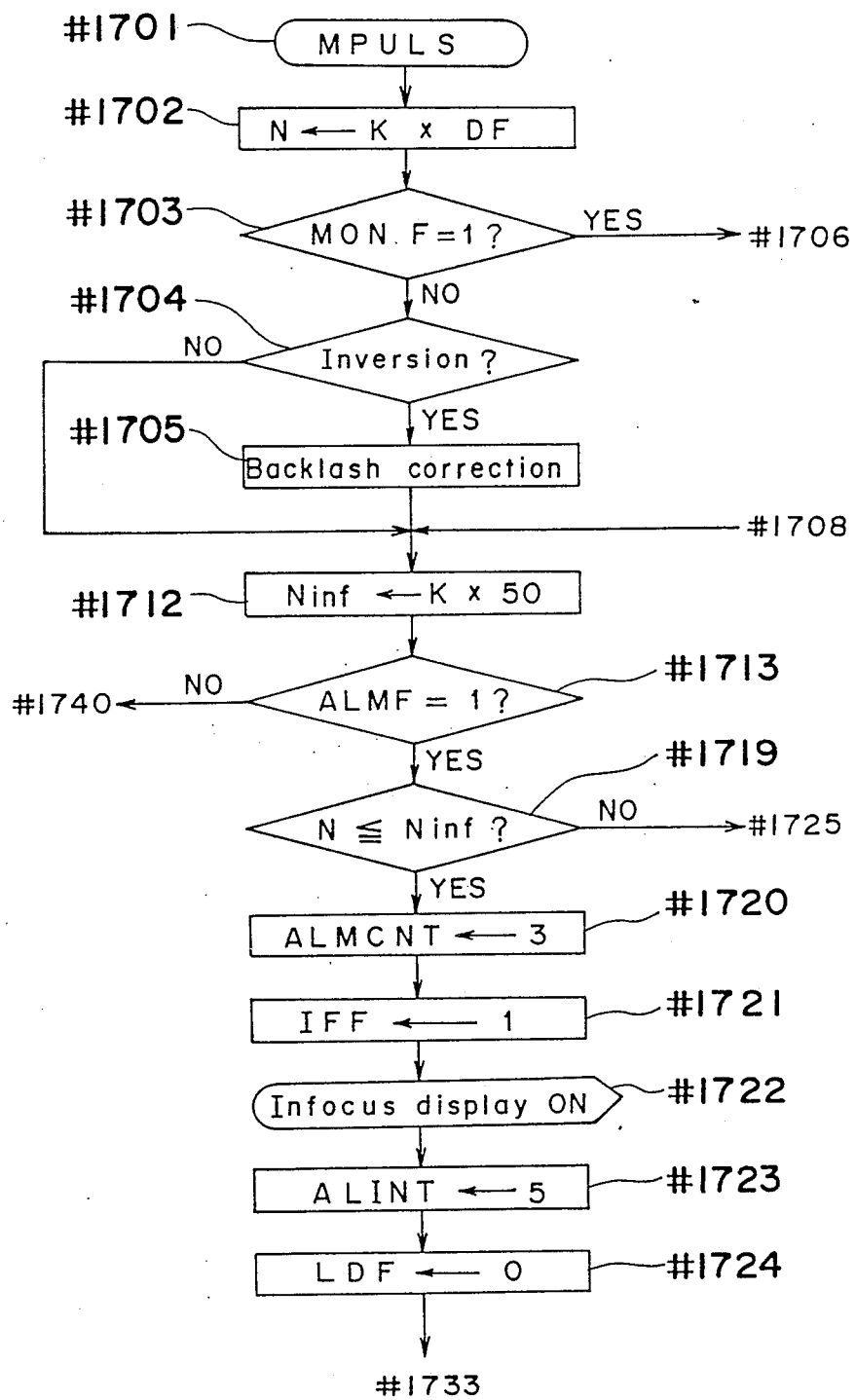
Figure 17B:
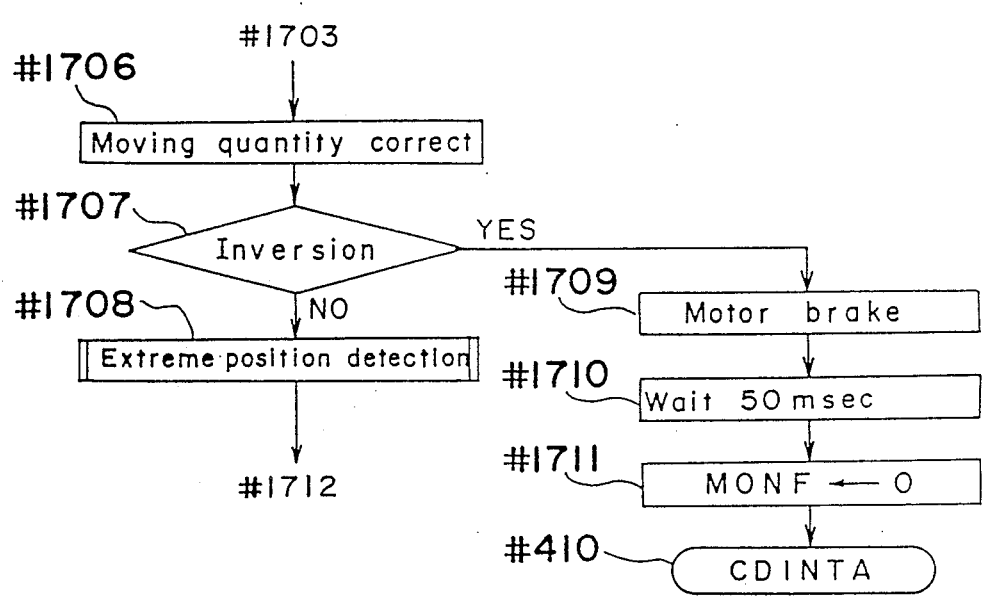

After the extreme position detection of the photograph lens, the program flow goes back to the step 1712 of FIG. 17A, the pulse count number Ninf in the infocus zone is calculated. The infocus zone is a range where it can be judged that the photograph lens is positioned in the infocus range, and 50 μm is predetermined as the defocus value DF in the infocus zone in the second preferred embodiment. The pulse count number Ninf is calculated by the following equation.

$$Ninf = K \times 50$$

where K is the aforementioned conversion factor

Figure 17C:
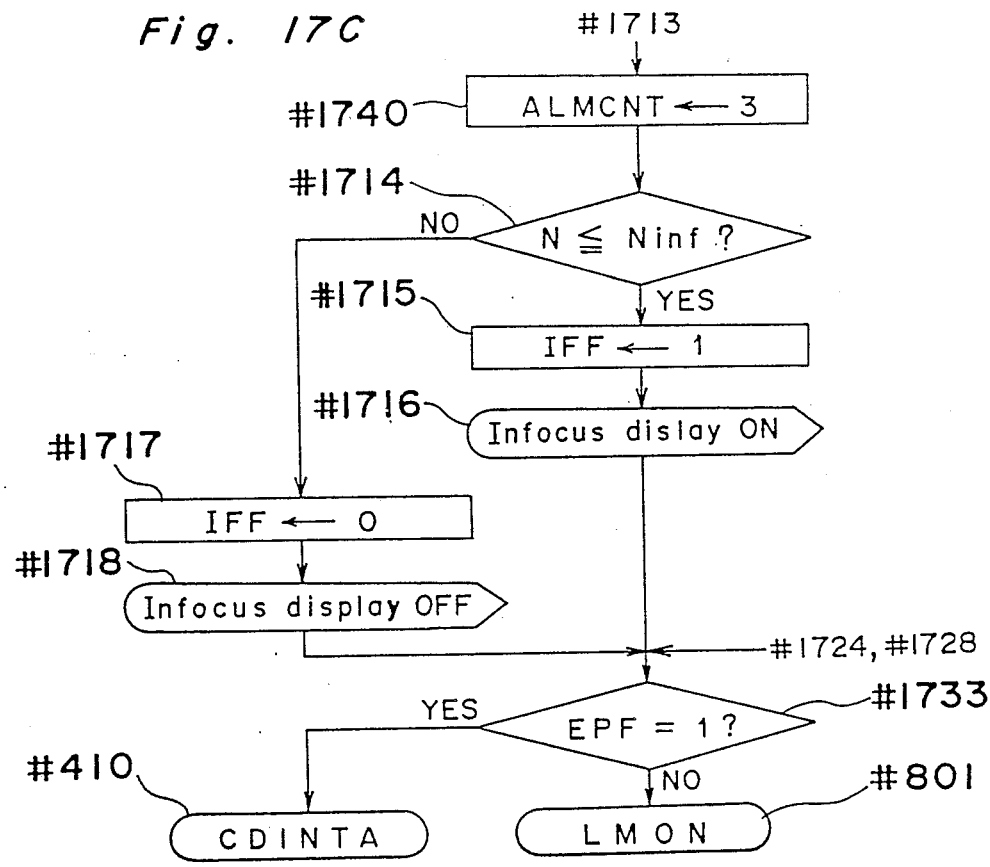

Next, it is judged at the step 1713 whether or not the auxiliary light mode flag ALMF is "1", or the auxiliary light mode is arranged, if the auxiliary light mode flag ALMF is "0", the program flow goes to the step 1740 of FIG. 17C, and then, after "3" is set in a counter value ALMCNT used when the auxiliary light is turned on, Wherein the counter value ALMCNT is described below in details, the program flow goes from the step 1713 to the step 1714. At the step 1714, value N calculated at the step 1702 is compared with the pulse count number Ninf in the infocus zone, if N≦Ninf, "1" is set in the infocus flag IFF at the step 1715, the infocus condition is displayed at the step 1716, and then, the program flow goes to the step 1733. On the other hand, if N>Ninf at the step 1714, the infocus flag IFF is reset at the step 1717, the display of the infocus condition is turned off at the step 1718, and then, the program flow goes to the step 1733.

On the other hand, if the auxiliary light mode flag ALMF is "1" at the step 1713 of FIG. 17A or it is judged that the auxiliary light mode is arranged, N is compared with Ninf at the step 1719. If N≦Ninf, or it is judged that the photograph lens is positioned in the infocus range, the program flow goes to the step 1720, "3" is set in the counter ALMCNT. The counter ALMCNT is provided for counting the times of moving the photograph lens during the focus detection with the auxiliary light. The program flow goes from the step 1720 to the step 1721, "1" is set in the infocus flag IFF, and the infocus condition is displayed at the step 1722. Next, "5" is set in the counter ALINT at the step 1723, and the lighting flag LDF is reset at the step 1724, and then, the program flow goes to the step 1733. After the lighting flag LDF is reset, the auxiliary light is inhibited from turning on even though the auxiliary light mode is arranged, as described at the step 414 of FIG. 14B. As described in the process of steps 1612, 1617 to 1626 of FIGS. 16A and 16C, the focus condition is detected on the condition that the auxiliary light is inhibited from turning on for six times of the focus detection, except for a case when the auxiliary light mode is canceled.

Figure 17D:
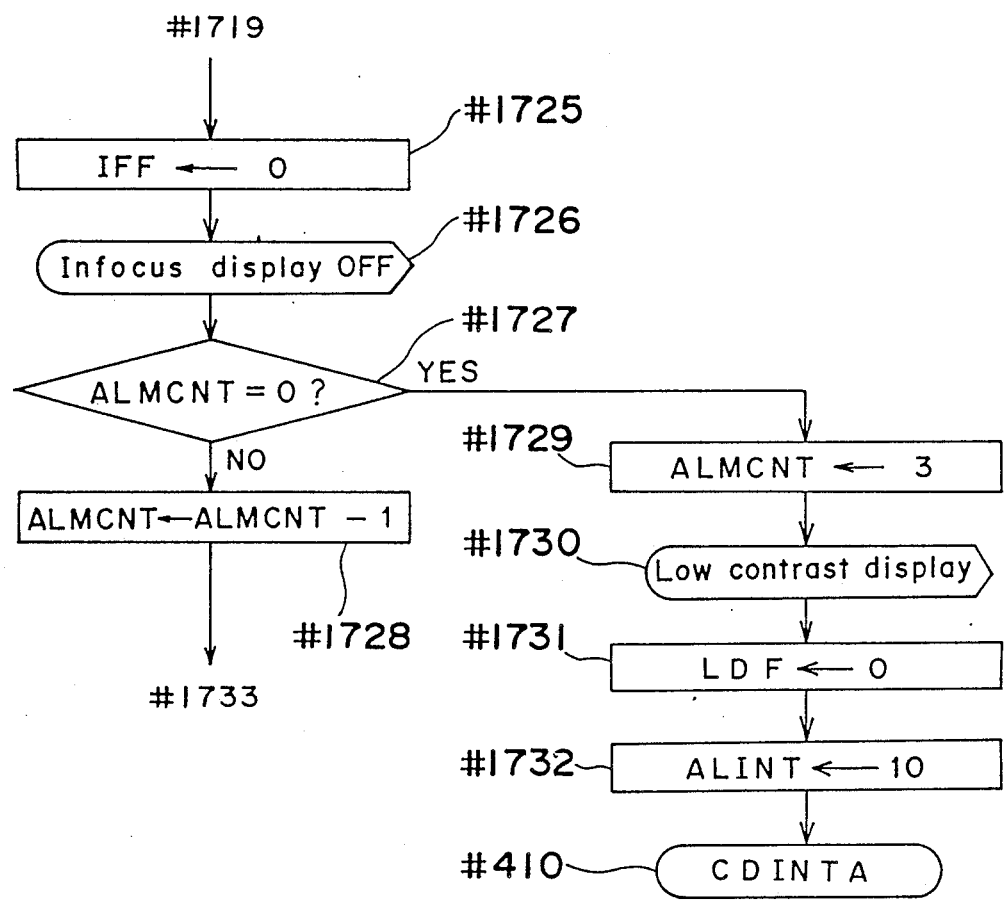

If N>Ninf at the step 1719, the infocus flag IFF is reset at the step 1725 of FIG. 17D, and the display of the infocus condition is turned off at the step 1726. Then, it is judged whether or not the counter value ALMCNT is "0" at the step 1727. The counter value ALMCNT is provided for limiting the number of times of moving the photograph lens during the auxiliary light mode after the counter value ALMCNT is initialized to "3", and if the counter value ALMCNT is "0", or the number of times of moving the photograph lens is equal to or larger than the number "3" of the limitation times, it is judged that the focus condition can not be detected. In this case, the object is not in an enough brightness and contrast condition even though the auxiliary light is turned on, or almost all the pixel of the CCD image sensor FLM output a dark signal, resulting in that there is a large dispersion in the result of the focus detection. Then, when the focus detection is not inhibited, it can not be judged the photograph lens is positioned in the infocus range even though the focus detection is repeatedly performed, resulting in that the photograph lens is unstably moved, or the power consumption is increased by repeatedly turning on the auxiliary light, moreover, there is a problem that unpleasant feeling is given by the dazzling auxiliary light to the object.

If the counter value ALMCNT is "0" at the step 1727, the counter number ALMCNT is initialized again to "3" at the step 1729, the low contrast display designating that the focus condition can not be detected is turned on at the step 1730, and then, the lighting flag IFF is reset at the step 1731, "10" is set in the counter ALMINT, the program flow goes to the CDINTA routine starting from the step 410. That is, the auxiliary light is inhibited from turning on for 11 times of the focus detection after the step 1732, and the photograph lens is not moved except for a case when the auxiliary light mode is canceled. After 11 times of the focal point detection, turning on of the auxiliary light is permitted, as described at the steps 1623 to 1626 of FIG. 16C. Moreover, moving of the photograph lens is permitted, because the counter value ALMCNT is initialized to "3" at the step 1729. As a result, even though the object is moved or changed, the AF control is properly performed again.

On the other hand, at the steep 1727 if the counter value ALMCNT is not "0", the program flow goes to the step 1728, the counter value ALMCNT is decreased by 1, and then, the program flow goes to the step 1733. At the step 1733 of FIG. 13C, it is judged whether or not the extreme position flag EPF for designating the extreme position of the photograph lens is "1", if the extreme position flag EPF is "1", or the photograph lens is positioned at the extreme position, the photograph lens is not moved, the program flow goes to the CDINT routine starting from the step 410. At a step between the steps 1733 and 410, the defocus direction is judged, and a display designating the nearest distance alarm may be turned on, and also the extreme position flag EPF may be reset by judging the defocus direction (not shown) and the extreme position of the photograph lens.

On the other hand, if the extreme position flag EPF is "0" at the step 1733, the program flow goes to a LMON routine starting from the step 801 for controlling the movement of the photograph lens.

Figure 18:
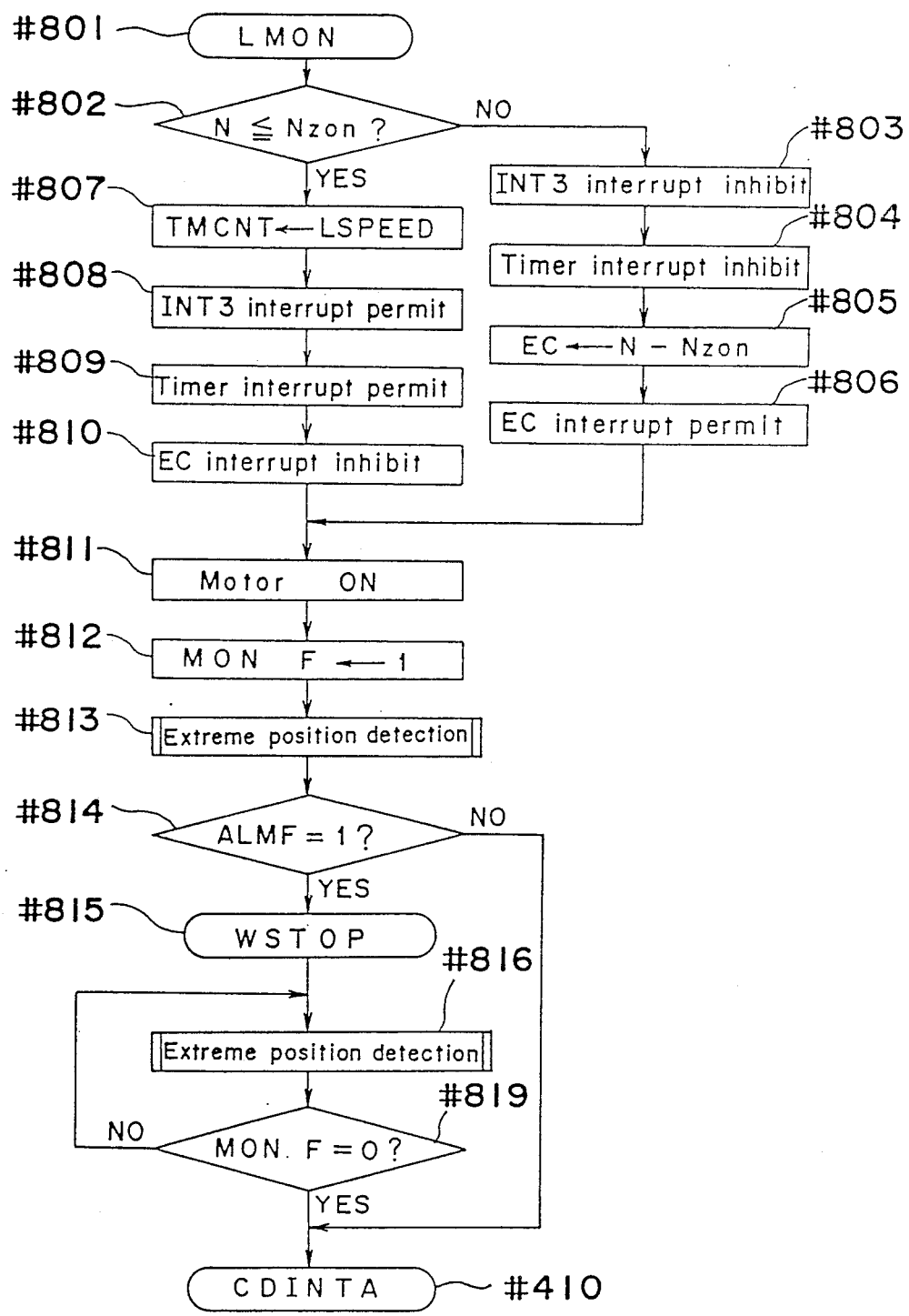

FIG. 18 shows the LMON routine for controlling the movement of the photograph lens by controlling the motor MO1. The program flow goes from the step 801 to the step 802, the encoder pulse count number N is compared with the predetermined value Nzon, wherein Nzon is arranged so that the photograph lens can not be stopped soon and overruns the braking point by the inertia force of the driving mechanism of the photograph lens even though the motor MO1 is braked. If N≦Nzon, the photograph lens is prevented from passing through the infocus position by controlling the motor MO1 so that the motor MO1 rotates at a low speed of 1,000 rpm in the second preferred embodiment. That is, a value LSPEED is set in the counter value TMCNT at the step 807 in order to making the motor MO1 rotate at a low speed by repeatedly turning on and off the motor MO1, and a timer enclosed in the microcomputer MCOM is set. Next, the interruption into the interruption terminal INT3 of the microcomputer MCOM is permitted at the step 808, and the timer interruption is permitted at the step 809. The motor MO1 is turned on and off by the timer interruption and the INT3 interruption, resulting in that the motor MO1 is controlled so that the motor MO1 rotates at a low speed. This control of the motor MO1 is described below in details. The program flow goes from the step 809 to the step 810, the interruption of the event counter is inhibited, and then, the program flow goes to the step 811.

On the other hand, if N>Nzon at the step 802, the INT3 interruption and the timer interruption are inhibited respectively at the steps 803 and 804. At the next step 805, a subtracted value (N−Nzon) is set in the event counter EC. When the event counter EC counts (N−Nzon) encoder pulses, the event counter EC outputs the interruption signal into the microcomputer MCOM. Therefore, the motor MO1 is continuously turned on and is rotated at a high speed of approximately 12,000 rpm in the second preferred embodiment until the interruption of the event counter EC occurs or until (N−Nzon) encoder pulses are counted. After the interruption of the event counter EC, the motor MO1 is controlled so that the motor MO1 rotates at a low speed and the photograph lens does not excess the infocus position The program flow goes from the step 805 to the step 806, the interruption of the event counter EC is permitted, and then, the program flow goes to the step 811.

Figure 23:
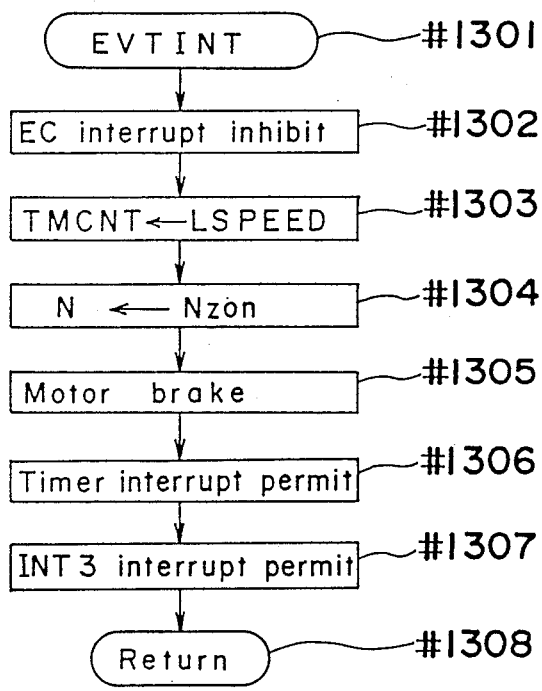
FIG. 23 is a flow chart showing an EVTINT event counter interruption operation of the control operation of the second preferred embodiment.

The EVTINT routine executed by the interruption of the event counter will be described below in details referring to FIG. 23. The program flow goes from the step 1301 to the step 1302, the interruption of the event counter is inhibited, LSPEED is set in the counter TMCNT at the step 1303 in order to control the motor MO1 at a low speed, and then, the pulse count number Nzon is set in the encoder pulse count number N at the step 1304. Next, the motor MO1 is braked and the speed of the motor MO1 is reduced at the step 1305, the timer interruption and the INT3 interruption are permitted respectively at the steps 1306 and 1307, and then, the program flow returns back to the main routine It is noted that the event counter EC counts the encoder pulse even though the interruption of the event counter is inhibited, and is used for the detection of the extreme position of the photograph lens, as described above.

Referring back to FIG. 18, turning on of the motor MO1 starts at the step 811, wherein the motor MO1 rotates at a low speed when the program flow comes to the step 811 after the process of the steps 807 to 810, on the other hand, the motor MO1 rotates at a high speed when the program flow comes to the step 811 after the process of steps 803 to 806. The program flow goes from the step 811 to the step 812, "1" is set in the monitor flag MONF, the aforementioned detection of the extreme position of the photograph lens is performed at the step 813. At the next step 814, it is judged whether or not the auxiliary light mode flag ALMF is "1", or the auxiliary light mode is arranged, if the auxiliary light mode is arranged, the program flow goes to a WSTOP routine starting from the step 815. The program flow goes from the step 815 to the step 816, the aforementioned extreme position detection is performed, and it is judged whether or not the monitor flag MONF is "0" at the step 819. If the monitor flag MONF is not "0", or the photograph lens is being moved, the extreme position detection is performed again at the step 816. On the other hand, if the monitor flag MONF is "0" or the photograph lens is stopped at the step 819, the program flow goes to the CDINT routine starting from the step 410. At the step 814, the auxiliary light mode is not arranged, the program flow goes to the CDINT routine starting from the step 410 for detecting the focus condition driving the motor MO1. That is, the focus detection is not performed except for the low contrast search in order to reduce the lighting times of the auxiliary light when the photograph lens is being moved during the auxiliary light mode.

Figure 19A:
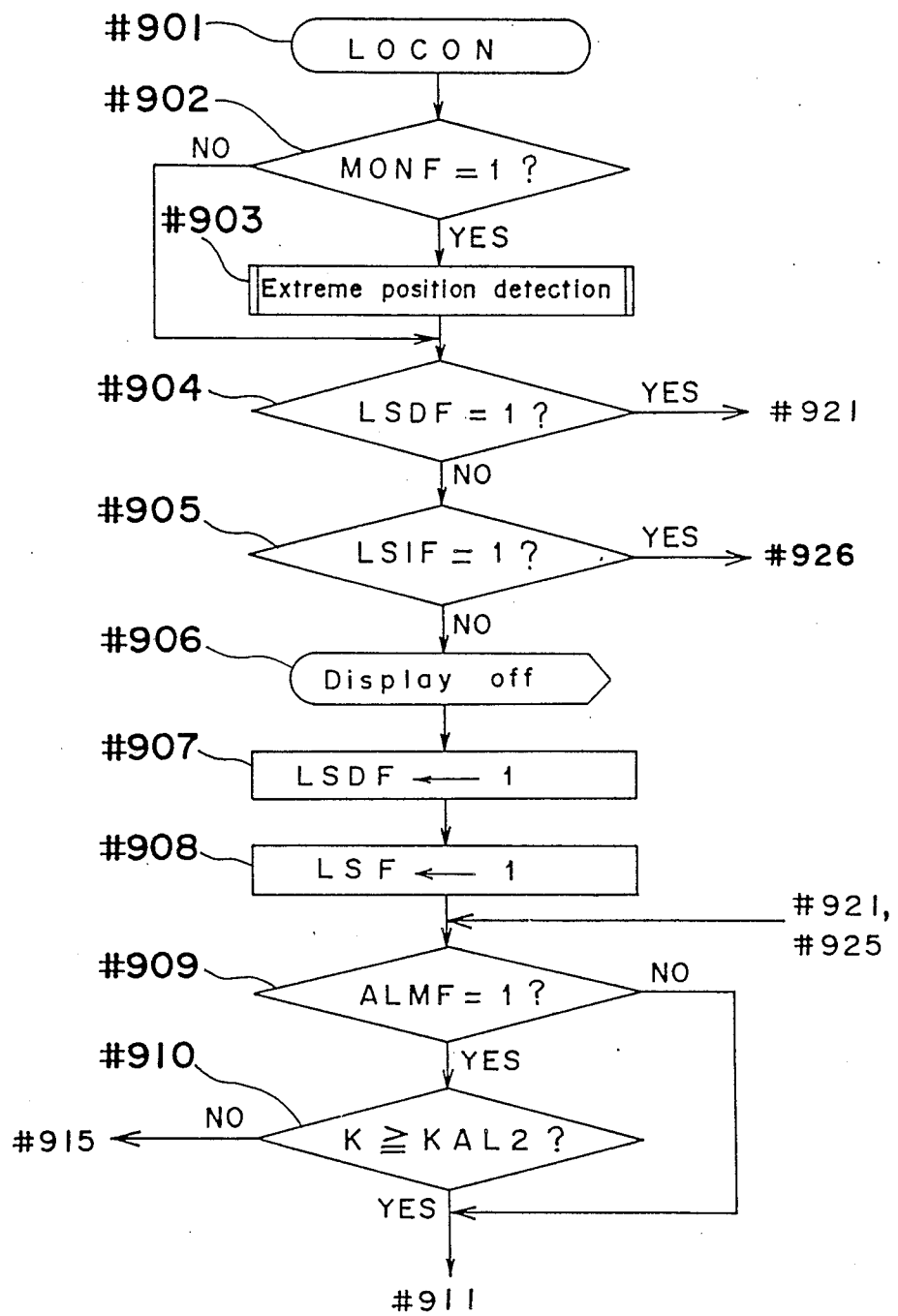

The LOCON routine starting from the step 901 will be described below in details referring to FIGS. 19A to 19C, and the program flow goes to the LOCON routine when it is judged at the steps 1614, 1615 and 1616 that the focus condition can not be detected.

The program flow goes from the step 901 to the step 902, it is judged whether or not the monitor flag MONF is "1", if the monitor flag MONF is "1", or the photograph lens is being moved, the program flow goes to the step 903, the extreme position detection of the photograph lens is performed, and then, the program flow goes to the step 904. On the other hand, if the monitor flag MONF is not "1", or the photograph lens stops, the program flow directly goes to the step 904. At the step 904, it is judged whether or not the low contrast searching flag LSDF is "1", or the low contrast searching is performed. If the low contrast flag LSDF is "0", or the low contrast search is not performed, the program flow goes to the step 905, it is judged whether or not the low contrast search inhibit flag LSIF is "1", or the low contrast search is inhibited. If the low contrast searching flag LSIF is "0", or the low contrast searching is permitted, the program flow goes to the step 906 for starting the low contrast searching. After the display is turned off at the step 906, "1" is set in the low contrast searching flag LSDF at the step 907, and "1" is set in a searching flag LSF designating the first time or the second time of the low contrast searching at the step 908. Next, it is judged whether or not the auxiliary light mode flag ALMF is "1" at the step 909, if the flag ALMF is "0", the program flow directly goes to the step 911, on the other hand, if the auxiliary light flag ALMF is "1", the conversion factor K is compared with the predetermined value KAL2 at the step 910. The step 910 is executed for preventing the lack of the infocus position detection during the low contrast search, because the moving speed of the photograph lens during the low contrast search is high resulting in that the integration time of the CCD image sensor FLM during the auxiliary light mode is longer than the integration time during the daylight mode and the cycle of the focus detection during the auxiliary light mode is longer than the cycle during the daylight mode. The moving quantity DFM of the photograph lens for one focus detection can be calculated by the following equation, as described above.

$$DFM = A \times Vlens \times TAF/K$$

where A is a constant,

Vlens is a moving speed of the photograph lens during the low contrast search, and TAP is a period time for one focus detection. As described at the steps 418 to 422 of FIG. 14B, if K≦KAL1, the integration time of the CCD image sensor FLM is limited to 40 msec at the step 420, because the lack of the infocus position may be caused when the low contrast search is performed moving the photograph lens at a speed Vlens for the integration time 80 msec during the auxiliary light mode. However, even though the integration time is limited to 40 msec when an interchangeable lens having a smaller conversion factor K (<KAL2) is mounted, the moving quantity DFM is larger than the detection available range of the focal point detection, resulting in that the lack of the infocus position detection of the object may be caused. In this case, the precision and the ability of the focus detection may be reduced by reducing the integration time of the CCD image sensor FLM. Therefore, the moving speed Vlens of the photograph lens during the low contrast search is reduced in the second preferred embodiment.

Figure 19B:
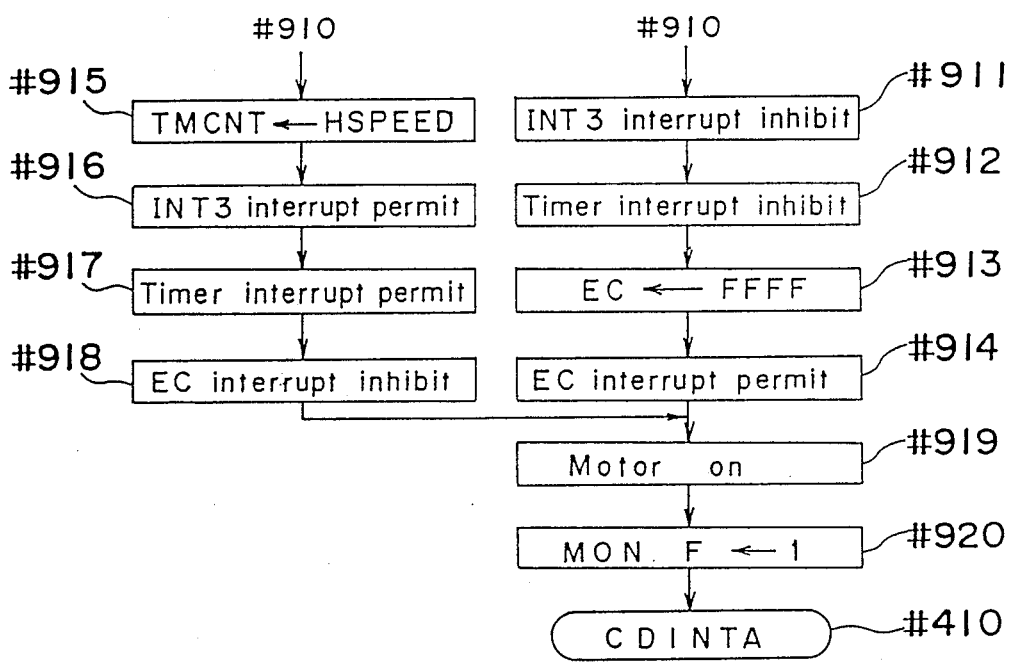

If K≧KAL2 at the step 910, the detected focus condition changes at a low speed is low and the lack of the infocus position detection is not caused even though the photograph lens is moved at a high speed, and then, the program flow goes to the step 911 of FIG. 19B, the INT3 interruption is inhibited, and the timer interruption is inhibited at the step 912. Next, the maximum value (FFFF in hexadecimal in the second preferred embodiment), which can be set in the event counter EC, is set in the event counter EC at the step 913, and the interruption of the event counter is permitted at the step 914. On the other hand, if K<KAL2 at the step 910, the moving speed of the photograph lens is reduced because the lack of the infocus position detection may be caused. That is, MSPEED is set in the counter TMCNT at the step 915, therefore, the motor MO1 is controlled so that the motor MO1 rotates at a speed of 6,000 rpm. The control of the motor MO1 will be described below in details referring to FIGS. 21A, 21B and 22. Moreover, the INT3 interruption and the timer interruption are permitted respectively at the steps 916 and 917, the interruption of the event count EC is inhibited at the step 918, and then, the program flow goes to the step 919. The motor MO1 is turned on at the step 919, "1" is set in the monitor flag MONF at the step 920, and then, the program flow goes to the CDINTA starting from the step 410 for detecting the next focus condition. On the other hand, at the step 905, if the low contrast search inhibit flag LSIF is "1", or the low contrast searching is inhibited, the program flow goes to the step 926 of FIG. 19C.

Figure 19C:
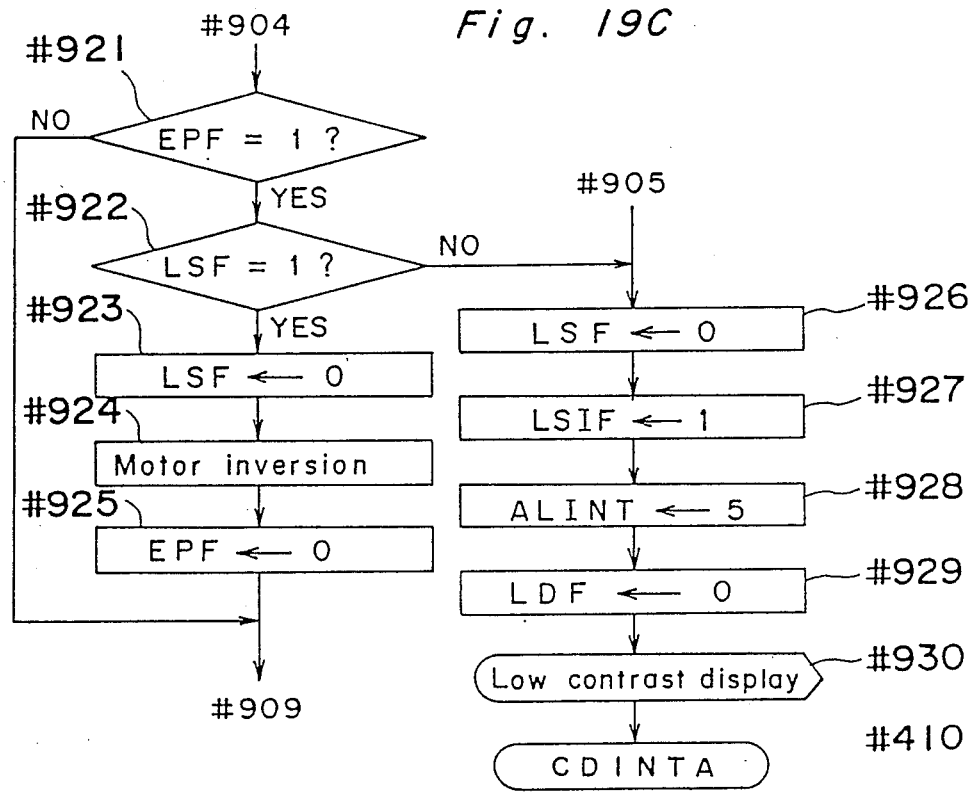

At the step 904, if the low contrast searching flag LSDF is "1", or the low contrast searching is performed, first of all, it is judged at the step 921 of FIG. 19C whether or not the extreme position flag EPF designating that the photograph lens is positioned at the extreme position is "1". If the extreme position flag EPF is "0", or the photograph lens is not positioned at the extreme position, the program flow directly goes to the step 909, the aforementioned process is performed. On the other hand, if the extreme position flag EPF is "1", or it is judged that the photograph lens is positioned at the extreme position, the program flow goes to the step 922, it is judged whether or not the searching flag LSF is "1". The searching flag LSF is used for the judgment of the first or second extreme position detection when it is detected that the photograph lens is positioned at the extreme position during the low contrast search. In the second preferred embodiment, the low contrast searching is performed until the extreme position of the photograph lens is detected twice, therefore, at the step 923, if the searching flag LSF is "1", or this is the first time that the extreme position of the photograph lens has been detected, "0" is set in the searching flag LSF at the step 923 for designating that the next extreme position detection is the second time, and then, the moving direction of the photograph lens (or the rotation direction of the motor MO1) is inverted at the step 924, "0" is set in the extreme position flag EPF at the step 925, and the program flow goes to the step 909. On the other hand, if the searching flag LSF is "0", or it is judged that this is the second time that the extreme position of the photograph lens has been detected, the program flow goes to the step 926, "0" is set in the low contrast searching flag LSF, and "1" is set in the low contrast search inhibit flag LSIF at the step 927, resulting in that the low contrast search is inhibited, wherein the low contrast search inhibit flag LSIF is reset at the step 1628 of FIG. 16D. That is, the low contrast search is permitted once it is judged that the focus condition can be detected. The program flow goes from the step 927 to the step 928, "5" is set in the counter ALINT, and "0" is set in the lighting flag LDF at the step 929, resulting in that the auxiliary light is turned off at a longer period, as described above. Next, the low contrast display designating that the focus condition can not be detected is turned on at the step 930, and then, the program flow goes to the CDINTA routine for performing the next focus detection.

Next, the INT3 interruption routine for controlling the movement of the motor MO1 will be described below in details referring to FIGS. 21A and 21B. The program flow goes from the step 1101 to the step 1102, it is judged whether or not the low contrast search during the auxiliary light mode is performed at the steps 1102 and 1103. This judgment is performed in order to control the motor MO1 so that the photograph lens is moved at a low speed in case K<KAL2. If the auxiliary light mode flag ALMF is not "1", or if the auxiliary light mode flag ALMF is "1" and the low contrast searching flag LSDF is not "1", the program flow goes to the step 1104, a subtracted value (N−1) is set in the encoder pulse count number N, and then, it is judged whether or not the encoder pulse count number N is "0" at the step 1105. If N=0, the motor MO1 is braked and is stopped at the step 1106, because the photograph lens reaches the infocus position. Next, "0" is set in the monitor flag MONF at the step 1107, the timer interruption and the INT3 interruption are inhibited respectively at the steps 1108 and 1109, and then, the program flow returns back to the main routine at the step 1118.

On the other hand, at the step 1105, if the encoder pulse count number N is not "0", it is judged at the step 1110 whether or not the encoder pulse count number N is equal or smaller than Ninf, or the photograph lens is positioned in the infocus range. If N≦Ninf, it is judged at the step 1111 whether or not the auxiliary light mode flag ALMF is "1", or the auxiliary light mode is arranged. If the auxiliary light mode flag ALMF is not "1", "1" is set in the infocus flag IFF at the step 1112, the display of the infocus condition is turned on at the step 1113, and then, the program flow goes to the step 1114. If N≦Ninf at the step 1110 and the auxiliary light mode flag ALMF is "1" at the step 1111, the program flow goes from the step 1111 to the step 1114, the infocus detection is not performed. This process is provided for not performing the focus detection when the photograph lens is being moved, except for the low contrast search. On the other hand, if it is judged that the low contrast search is performed during the auxiliary light mode at the steps 1102 and 1103, the program flow goes to the step 1114. On the other hand, if N>Ninf at the step 1110, the program flow goes to the step 1114.

The process of the steps 1114 to 1117 is provided for controlling the motor MO1 so that the photograph lens is moved at a low speed in association with the timer interruption, and the process of steps 1114 to 1117 will be described below in details with the timer interruption process routine INTM1 shown in FIG. 22.

Figure 21A:
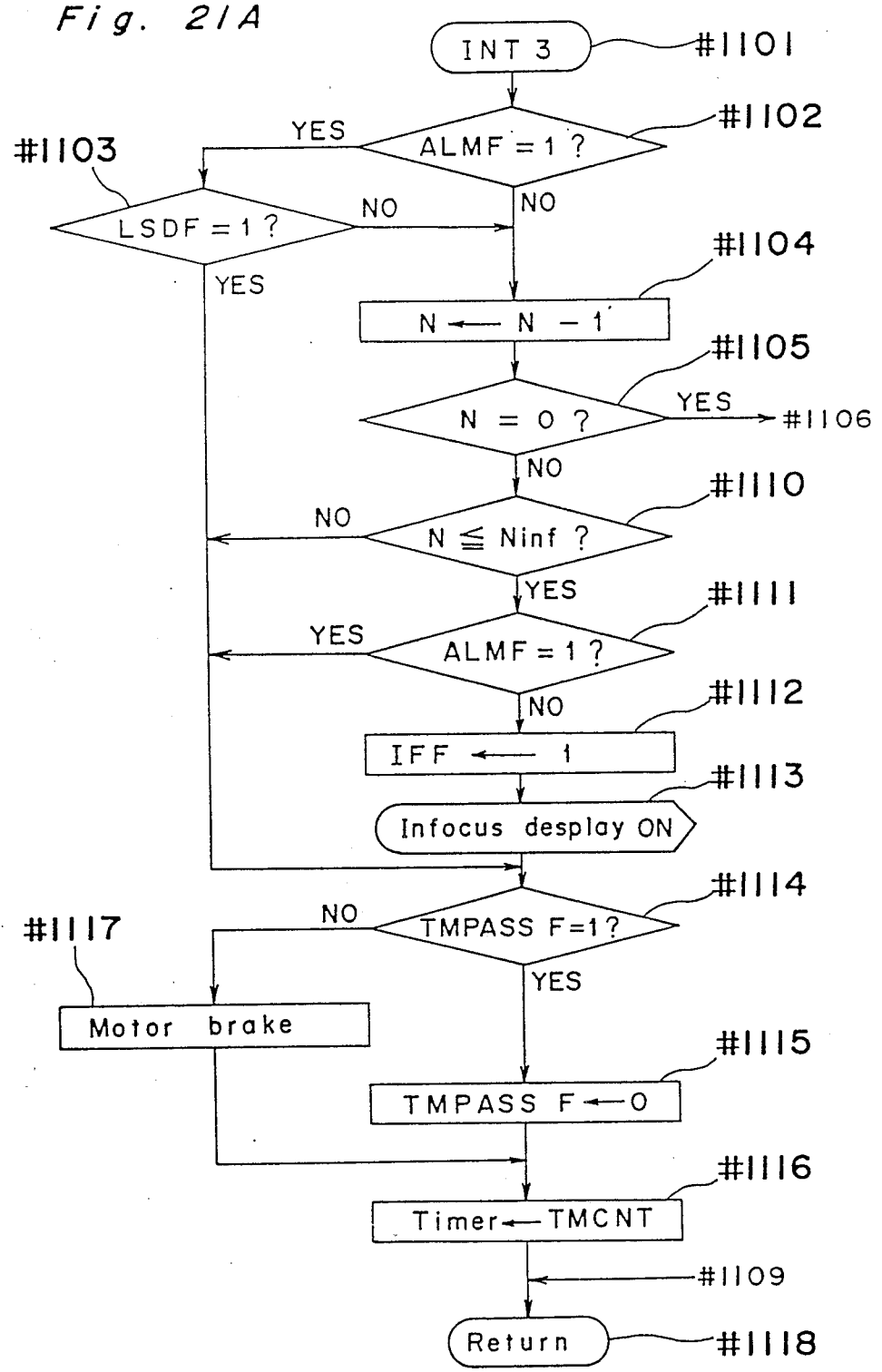
FIGS. 21A and 21B are flow charts showing an INT3 interruption operation of the control operation of the second preferred embodiment.
Figure 21B:
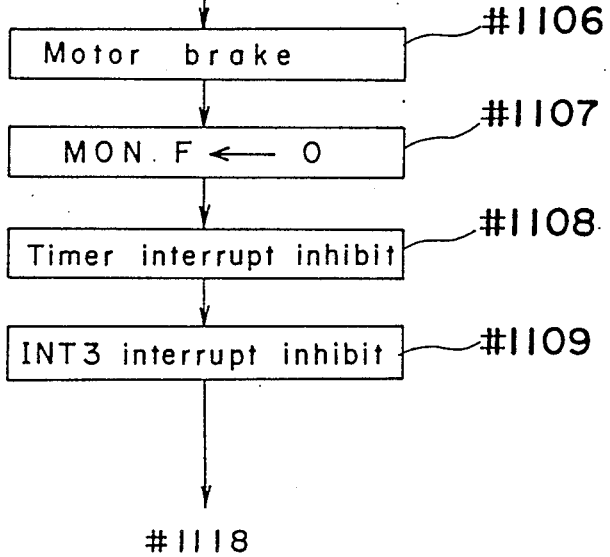
Figure 22:
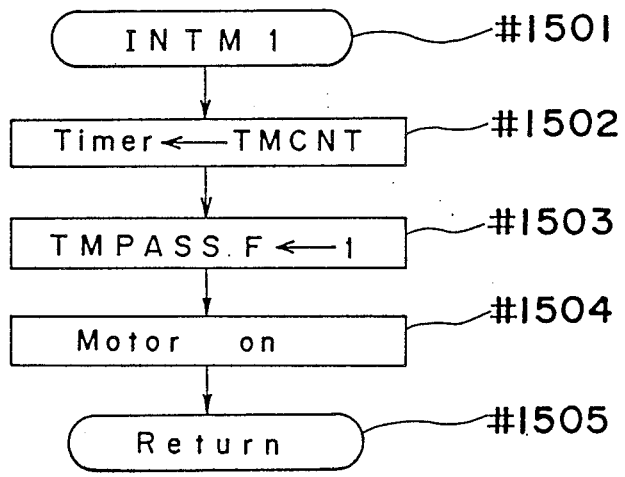
FIG. 22 is a flow chart showing an INTM1 timer interruption operation of the control operation of the second preferred embodiment.

First of all, it is judged whether or not a TMPASSF is "1" at the step 1114, wherein the flag TMPASSF is set to "1" at the step 1503 of FIG. 22 by the timer interruption, on the other hand, the flag TMPASSF is reset to "0" at the step 1115 of FIG. 21A. If the INT3 interruption is inputted into the microcomputer MCOM when the count time of the timer is within a predetermined counting time, or before the timer interruption, it is arranged that the flag TMPASSF is set to "0", it is judged that the speed of the motor MO1 is higher than a predetermined speed, and then, the motor MO1 is braked at the step 1117 and the program flow goes to the step 1116. That is, the motor MO1 is controlled so that two and more encoder pulses are not generated for the predetermined count time of the timer. If the flag TMPASSF is "1" at the step 1114, it is judged that the speed of the motor MO1 is lower than a predetermined speed, and the flag TMPASSF is reset to "0" at the step 1115, and then, the program flow goes to the step 1116. That is, the motor MO1 is controlled so that the motor MO1 is continuously turned on after the step 1504 and one and more encoder pulses are generated for the predetermined counting time of the timer. At the step 1116, TMCNT is set in the timer counter, and the timer starts counting for a time determined by TMCNT, and then, the program flow returns back to the main routine at the step 1118.

Figure 25:
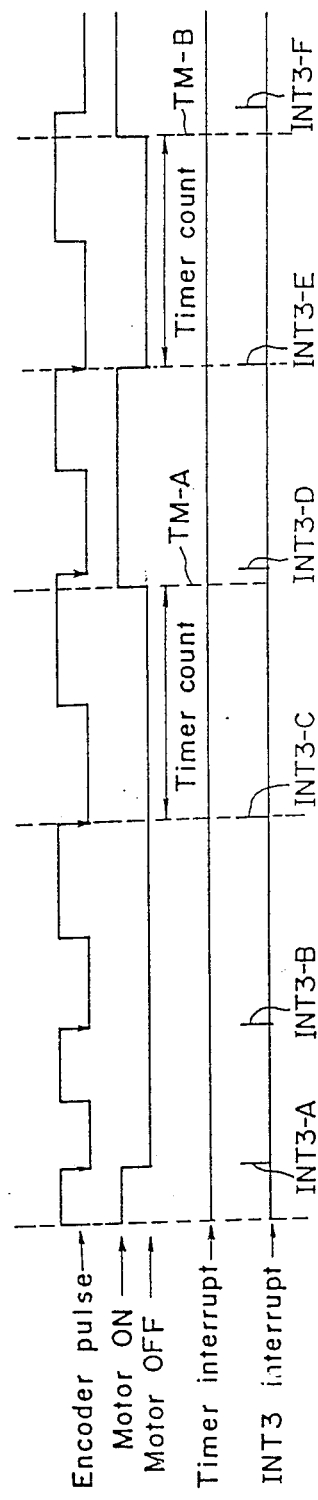
FIG. 25 is a timing chart showing timings of interruptions of the control operation shown in FIG. 22.
Figure 26:
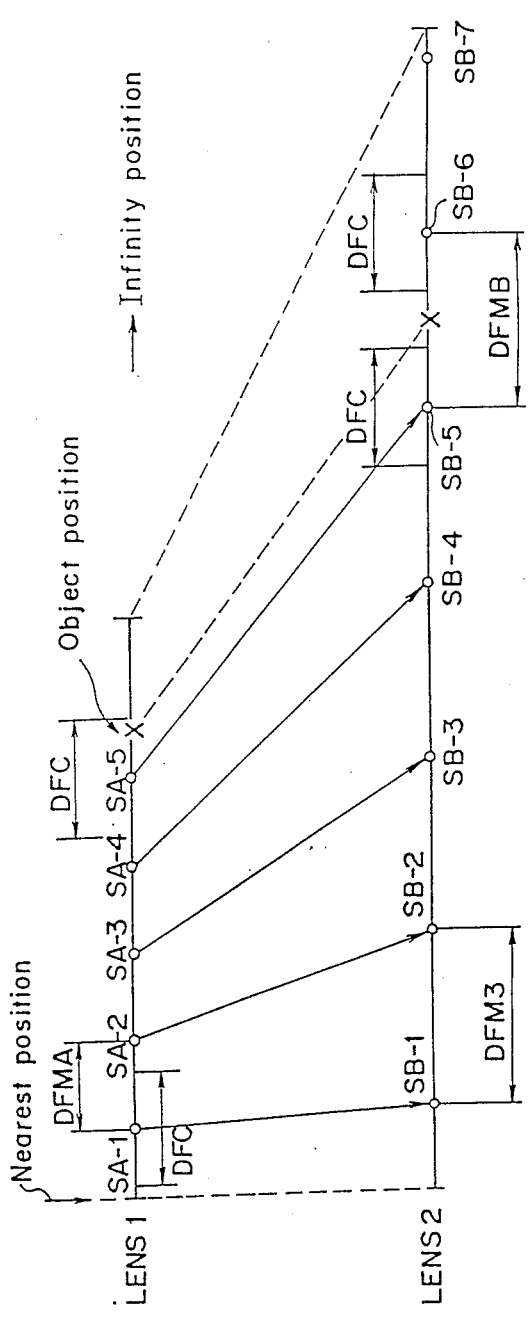
FIG. 26 is a schematic diagram for explaining a lack of the focus detection during the low contrast searching of the prior art.

In the timer interruption routine of FIG. 22, TMCNT is set in the timer at the step 1502, and the timer starts counting a time, "1" is set in the flag TMPASSF at the step 1503, the motor MO1 is turned on at the step 1504, and then, the program flow returns back to the main routine. As described above, the motor MO1 is controlled so that one encoder pulse is generated for the predetermined counting time of the timer, and the control of the motor MO1 will be described below in details referring to FIG. 25.

After the timer interruption and the INT3 interruption are permitted, if the speed of the motor MO1 is too high, the INT3 interruptions denoted by INT3-A, INT3-B and INT3-C are inputted before the predetermined counting time passes. The timer is initialized at each of times INT3-A, INT3-B and INT-C, and starts counting time, therefore, the flag TMPASS is not set, resulting in that it is judged at the step 1114 of FIG. 21A that flag TMPASS is "0", and the motor MO1 is braked. When the speed of the motor MO1 is reduced by the brake, the INT3 interruption is not inputted even though the predetermined counting time of the timer passes, and the timer interruption is inputted. TM-A denotes a timer interruption, and the motor MO1 is turned on so that the motor MO1 is accelerated. In the INT3-D interruption occurred after the timer interruption, the motor MO1 is not braked and is continuously accelerated because the flag TMPASS is set to "1". A INT3-E interruption occurs before the timer counts the predetermined time from an INT3-D because the motor MO1 is accelerated as described above. In this case, the motor MO1 is braked and the speed of the motor MO1 is reduced because the flag TMPASS is reset by the INT3-D interruption. When the speed of the motor MO1 is reduced, a timer interruption TM-B occurs before an INT3-F and the motor MO1 is turned on again and the motor MO1 is accelerated. Thus, the motor MO1 is controlled by the time counted by the timer.

Moreover, in the second preferred embodiment, the auxiliary light device AL is arranged in the electric flash device FS, however, the present invention is not limited to this, the auxiliary light device may be enclosed in the main body BD of the camera.

As described above, in the second preferred embodiment, lighting of the auxiliary light is inhibited during six times of the focus detections after the infocus condition is judged during the auxiliary light mode, resulting in that the automatic focus control operation can be performed in accordance with the movement of the object even though the object is in a low brightness or contrast condition, the power consumption can be reduced by no meaning lighting of the auxiliary light, and the times of dazzling to the object can be reduced.

Moreover, when lighting of the auxiliary light is inhibited during the auxiliary light mode and it is judged that the reliability of the focus detection is high, the AF control operation is performed in accordance with the result of the focus detection, and the auxiliary light mode is canceled. Therefore, as soon as the object is in a high brightness condition, the control operation goes to the daylight mode, and the power consumption can be reduced. Furthermore, when lighting of the auxiliary light is inhibited during the auxiliary light mode and it is judged that the auxiliary light mode is not canceled, the AF control operation can be performed properly and stably because the movement of the photograph lens is inhibited. The focus detection is continued after the judgment of the infocus condition, resulting in that the response of the AF control operation for a moving object can be improved.

As described above, in the second preferred embodiment, if the defocus variation during the movement of the photograph lens is high, the integration time is reduced and the cycle period for the focus detection is reduced, resulting in that the probability of the detection of the focus position is higher than the prior art. Additionally, the reduction of the moving speed of the photograph lens is limited to a minimum speed, resulting in that the automatic focus control device having a high moving speed of the photograph lens can be provided without reducing the precision of the automatic focus control. On the other hand, if the defocus variation is low, a longer integration time of the CCD image sensor FLM can be set than the aforementioned integration time because there is a margin of the time, resulting in that the detection signal having an improved signal/noise can be obtained when the focus condition is detected, and the precision of the automatic focus control can be further improved. Thus, a suitable integration time of the CCD image sensor FLM can be arranged in accordance with the defocus speed during the movement of the photograph lens, therefore, a balanced automatic focus control can be obtained at the point of the probability of the infocus detection and the precision thereof.

Furthermore, the integration time of the CCD image sensor PLM is controlled, so that the defocus variation for one unit time for the focus detection during the movement of the photograph lens at the low contrast search is within the detection available range, resulting in that the lack of detecting the infocus position can be prevented, and the probability of the infocus detection can be further improved. Moreover, at the auxiliary light mode, the object is often in a low brightness condition, therefore, a longer integration time of the CCD image sensor FLM is arranged. During the low contrast search at the aforementioned auxiliary light mode, if a constant integration time of the CCD image sensor FLM is arranged, in particular, the probability of the lack of detecting the infocus position is increased. Therefore, the control of the integration time according to the present invention is particularly effective in the low contrast search at the auxiliary light mode.

TABLE 1

| AFMTB | AFMTR | AFMTF | Control of Motor MO1 |
|---|---|---|---|
| 1 | 0 | 0 | Brake |
| 0 | 1 | 0 | Clockwise rotation |
| 0 | 0 | 1 | Counterclockwise rotation |
| 0 | 0 | 0 | Stop |

TABLE 2

| MM | MN | Control of Motor MO2 |
|---|---|---|
| 0 | 1 | Brake |
| 1 | 0 | Clockwise rotation |
| 0 | 0 | Counterclockwise rotation |
| 1 | 1 | Stop |

TABLE 3

| Condition | Mode | Operation | Terminal |
|---|---|---|---|
| S3 OFF | One shot | Only one exposure during switch S2 on | P60←H |
| S3 ON | Continuous shot | Continuous exposure during switch S2 on | P60←L |
| S4 OFF | AF priority | Inhibit exposure until infocus attainment even though switch S2 on | P61←H |
| S4 ON | Release priority | Exposure start independent of focus condition if switch S2 on | P61←L |
| S5 OFF | One shot AF | Inhibit automatic focus operation locking lens if infocus is attained after automatic focus operation start | P62←H |
| S5 ON | Continuous AF | Always automatic focus operation | P62←L |

TABLE 4

| Flag | Initial value | Condition | Content |
|---|---|---|---|
| Auxiliary light mode flag | 0 | 1 | Distance measurement with auxiliary light |
| | | 0 | Distance measurement with daylight |
| Low contrast search inhibit flag | 0 | 1 | Inhibit low contrast search |
| | | 0 | Permit low contrast search |
| High speed flag | 0 | 1 | Motor M01 rotation at high speed |
| | | 0 | Motor M01 rotation at low speed or stop |

TABLE 4-continued

| Flag | Initial value | Condition | Content |
|---|---|---|---|
| Infocus flag | 0 | 1 | Infocus position of lens |
| | | 0 | Out-of-focus position of lens |
| Low contrast searching flag | 0 | 1 | In low contrast search |
| | | 0 | Not in low contrast search |
| LS flag | 1 | 1 | First time of extreme position detection |
| | | 0 | Second time of extreme position detection |

What is claimed is:

1. An automatic focus control device for use in a camera system comprising:
    a photograph lens including a lens for the focus adjustment:
    an image sensor means having plural pixel for detecting a pencil of light rays reflected on an object to be photographed:
    a data processing means for converting the detected light quantity to data of the light quantity:
    a judging means for judging whether or not focus condition of said object can be detected in accordance with the data outputted by said data processing means:
    a calculating means for calculating a defocus value of said photograph lens in accordance with the data outputted by said data processing means, said calculating means being enabled when impossibility of the focus condition detection is judged by said judging means:
    a motor for moving said lens for the focus adjustment:
    a driving means for driving said motor in accordance with the defocus value calculated by said calculating means:
    a constant data outputting means for outputting constant data designating a relationship between a rotation number of said motor and a unit of the defocus value:
    a focus detection control means for continuously driving said motor from the time when impossibility of the focus condition detection is judged by said judging means until possibility of the focus condition detection is judged by said judging means: and
    a rotation number control means for controlling the rotation speed of said motor driven by said focus detection control means in accordance with the constant data outputted by said constant data outputting means.

2. The automatic focus control device for use in a camera system as defined in claim 1,
    wherein the constant data outputted by said constant data outputting means includes a value designating a ratio of a variation of the rotation number of said motor to a variation of the defocus value, and said rotation number control means drives said motor at a first rotation speed when the ratio is smaller than a predetermined value, on the other hand, said rotation number control means drives said motor at a second rotation speed higher than the first rotation speed when the ratio is equal to or larger than the predetermined value.

3. The automatic focus control device for use in a camera system as defined in claim 2 further comprising:

an auxiliary light device for radiating an auxiliary light to said object for detecting the focus condition; and a mode selecting means for selecting a first focus detecting mode for detecting the focus condition with said auxiliary light and a second focus detecting mode for detecting the focus condition with daylight, in accordance with the judgment of said judging means:

wherein said rotation number control means includes a switching means for switching the rotation speed of said motor in accordance with the focus detecting mode selected by said mode selecting means.

4. The automatic focus control device for use in a camera system as defined in claim 3, wherein said switching means changes the predetermined value so that a predetermined value at the first focus detecting mode is larger than a predetermined value at the second focus detecting mode.

5. An automatic focus control device for use in a camera system comprising:

a photograph lens including a lens for the focus adjustment:

an image sensor means having plural pixel for detecting a pencil of light rays reflected on an object to be photographed;

a data processing means for converting the detected light quantity to data of the light quantity:

a judging means for judging whether or not a focus condition can be detected in accordance with the data outputted by said data processing means:

a calculating means for calculating a defocus value of said photograph lens in accordance with the data outputted by said data processing means, said calculating means being enabled when impossibility of the focus condition detection is judged by said judging means:

a motor for moving said lens for the focus adjustment:

a driving means for driving said motor in accordance with the defocus value calculated by said calculating means:

a focus detection control means for continuously driving said motor from the time when impossibility of the focus condition detection is judged by said judging means until possibility of the focus condition detection is judged by said judging means: and a rotation number control means for controlling the rotation speed of said motor in accordance with a defocus variation during the movement of said lens for the focus adjustment.

6. The automatic focus control device for use in a camera system as defined in claim 5, wherein said rotation number control means drives said motor at a first rotation speed when the defocus deviation is smaller than a predetermined value, on the other hand, said rotation number control means drives said motor at a second rotation speed lower than the first rotation speed when the defocus deviation is equal to or larger than the predetermined value.

7. An automatic focus control device for use in a camera system comprising:

a photograph lens including a lens for the focus adjustment:

a storage type image sensor means having plural charge storage type of pixel for detecting a pencil of light rays reflected on an object to be photographed:

a data processing means for converting the detected light quantity to data of the light quantity:

a judging means for judging whether or not focus condition of said object can be detected in accordance with the data outputted by said data processing means:

a calculating means for calculating a defocus value of said photograph lens in accordance with the data outputted by said data processing means, said calculating means being enabled when impossibility of the defocus condition detection is judged by said judging means:

a motor for moving said lens for the focus adjustment:

a driving means for driving said motor in accordance with the defocus value calculated by said calculating means;

a constant data outputting means for outputting constant data designating a relationship between a rotation number of said motor and a unit of the defocus value:

a focus detection control means for continuously driving said motor from the time when impossibility of the focus condition detection is judged by said judging means until possibility of the focus condition detection is judged by said judging means;

an integration time control means for controlling an integration time of said image sensor within a predetermined maximum integration time in accordance with the brightness of said object: and an integration time limiting means for changing the predetermined maximum integration time in accordance with the constant data outputted by said constant data outputting means.

8. The automatic focus control device for use in a camera system as defined in claim 7, wherein the constant data outputted by said constant data outputting means includes a value designating a ratio of a variation of the rotation number of said motor to a variation of the defocus value, and a first maximum integration time is set as the predetermined maximum integration time when the ratio is smaller than a predetermined value, on the other hand, a second maximum integration time longer than the first maximum integration time is set as the predetermined maximum integration time when the ratio is equal to or larger than the predetermined value.

9. The automatic focus control device for use in a camera system as defined in claim 8 further comprising:

a rotation number control means for controlling the rotation speed of said motor driven by said focus detection control means in accordance with the constant data outputted by said constant data outputting means, said rotation number control means driving said motor at a first rotation speed when the ratio is smaller than a predetermined value, on the other hand, said rotation number control means drives said motor at a second rotation speed higher than the first rotation speed when the ratio is equal to or larger than the predetermined value.

10. The automatic focus control device for use in a camera system as defined in claim 7 further comprising:

an auxiliary light device for radiating an auxiliary light to said object for the focus condition detection, said auxiliary light being enabled when impossibility of focus condition detection is judged by said judging means.

11. An automatic focus control device for use in a camera system comprising:
 a photograph lens including a lens for the focus adjustment:
 a storage type of image sensor means having plural charge storage type of pixel for detecting a pencil of light rays reflected on an object to be photographed:
 a data processing means for converting the detected light quantity to data of the light quantity:
 a judging means for judging whether or not a focus condition of said object can be detected in accordance with the data outputted by said data processing means:
 a calculating means for calculating a defocus value of said photograph lens in accordance with the data outputted by said data processing means, said calculating means being enabled when impossibility of the focus condition detection is judged by said judging means:
 a motor for moving said lens for the focus adjustment:
 a driving means for driving said motor in accordance with the defocus value calculated by said calculating means:
 a focus detection control means for continuously driving said motor from the time when impossibility of focus condition detection is judged by said judging means until possibility of the focus condition detection is judged by said judging means:
 an integration time control means for controlling an integration time of said image sensor within a predetermined maximum integration time in accordance with a brightness of said object: and
 an integration time limiting means for changing the predetermined maximum integration time in accordance with defocus variation during the movement of said lens for the focus adjustment.

12. The automatic focus control device for use in a camera system as defined in claim 11, wherein a first maximum integration time is set as the predetermined maximum integration time when the defocus variation is smaller than a predetermined value, on the other hand, a second maximum integration time longer than the first maximum integration time is set as the predetermined maximum integration time when the defocus variation is equal to or larger than the second predetermined value.

13. The automatic focus control device for use in a camera system as defined in claim 12 further comprising:
 an auxiliary light device for radiating an auxiliary light to said object for the focus condition detection, said auxiliary light being enabled when impossibility of the focus condition detection is judged by said judging means.

14. In an improved camera having a housing member with a mounting for a photograph lens, the improvement comprising an automatic focus control device including:
 an image sensor means for detecting images and converting them into electrical signals;
 means for providing images of an object on the image sensor means;
 means for processing the electrical signals to provide data on the focus condition of the photographic lens relative to the object;
 means for determining if the focus condition can be detected by the output data;
 calculating means for calculating the focus condition and providing an output of a defocus value even if the means for determining indicates that the focus condition cannot be detected;
 means for moving the photographic lens in response to an output of the calculating means, and
 means for providing predetermined data designating a relationship between the moving means and an output defocus value, the means for moving further includes means for continuing the movement of the lens in response to the defocus value of the calculating means and the predetermined data until the determining means indicates that a focus condition can be detected by the output data.

15. The invention of claim 14 wherein the means for moving includes a motor and the means for providing predetermined data includes data indicating a ratio of a variation of a rotation of the motor output to a variation of the defocus value and the means for moving drives the motor at a first rotational speed when the ratio is smaller than a predetermined value and at a second rotational speed, higher than the first rotational speed, when the ratio is equal to or larger than the predetermined value.

* * * * *

UNITED STATES PATENT OFFICE
CERTIFICATE OF CORRECTION

Patent No. 4,969,006   Dated November 6, 1990

Inventor(s) Kenji Ishibashi et al.

It is certified that error appears in the above-identified patent and that said Letters Patent is hereby corrected as shown below:

ON TITLE PAGE:

[30] Foreign Application Priority Data, line 2, delete "April 4, 1986" and insert --April 2, 1986--.

Signed and Sealed this

Twenty-third Day of June, 1992

Attest:

DOUGLAS B. COMER

*Attesting Officer*   Acting Commissioner of Patents and Trademarks